(12) United States Patent
Avgousti et al.

(10) Patent No.: US 8,999,663 B2
(45) Date of Patent: Apr. 7, 2015

(54) METHOD FOR OBTAINING A LIPID-CONTAINING COMPOSITION FROM MICROBIAL BIOMASS

(75) Inventors: Marios Avgousti, Kennett Square, PA (US); Timothy Allan Bell, Wilmington, DE (US); Richard E. Bockrath, Wilmington, DE (US); Oliver Walter Gutsche, Wilmington, DE (US); Keith W. Hutchenson, Lincoln University, PA (US); Shu-Chien Liang, Newark, DE (US); Robert D. Orlandi, Landenberg, PA (US)

(73) Assignee: E I du Pont de Nemours and Company, Wilmington, DE (US)

( * ) Notice: Subject to any disclaimer, the term of this patent is extended or adjusted under 35 U.S.C. 154(b) by 470 days.

(21) Appl. No.: 13/370,971

(22) Filed: Feb. 10, 2012

(65) Prior Publication Data

US 2013/0046105 A1     Feb. 21, 2013

Related U.S. Application Data

(60) Provisional application No. 61/441,849, filed on Feb. 11, 2011, provisional application No. 61/441,836, filed on Feb. 11, 2011, provisional application No. 61/441,842, filed on Feb. 11, 2011, provisional application No. 61/441,854, filed on Feb. 11, 2011, provisional application No. 61/487,019, filed on May 17, 2011.

(51) Int. Cl.
*C12P 7/64* (2006.01)
*A23K 1/00* (2006.01)
*A23K 1/16* (2006.01)

(52) U.S. Cl.
CPC ............... *A23K 1/007* (2013.01); *A23K 1/003* (2013.01); *A23K 1/164* (2013.01)

(58) Field of Classification Search
CPC ............. C11B 1/00; C11B 1/10; C11B 3/00; C11B 3/12; C11B 3/16; C11B 3/006; C11B 7/00; C11B 7/0008; C11B 7/0075; C11C 1/00; C11C 1/02; C11C 1/045; C11C 3/00; C11C 3/04; C11C 3/08; C12P 1/00; C12P 7/00; C12P 7/64; C12P 7/6409; C12P 7/6418; C12P 33/00; B01D 3/00; B01D 3/10
See application file for complete search history.

(56) References Cited

U.S. PATENT DOCUMENTS

| | | | |
|---|---|---|---|
| 4,675,132 A | 6/1987 | Stout et al. | |
| 6,022,552 A | 2/2000 | Brown et al. | |
| 6,166,230 A | 12/2000 | Bijl et al. | |
| 6,258,964 B1 | 7/2001 | Nakajima et al. | |
| 6,270,025 B1 | 8/2001 | Geigle et al. | |
| 6,727,373 B2 | 4/2004 | Bijl et al. | |
| 7,531,678 B2 | 5/2009 | Choo et al. | |
| 7,695,626 B2 | 4/2010 | Dueppen et al. | |
| 2005/0027004 A1* | 2/2005 | Kyle et al. | 514/560 |
| 2009/0053342 A1* | 2/2009 | Streekstra et al. | 424/780 |
| 2009/0227678 A1 | 9/2009 | Bijl et al. | |
| 2010/0170144 A1* | 7/2010 | Day et al. | 44/388 |
| 2010/0311831 A1* | 12/2010 | Wang | 514/547 |
| 2010/0317735 A1* | 12/2010 | Hong et al. | 514/560 |

FOREIGN PATENT DOCUMENTS

| EP | 0442184 A1 | 8/1991 |
|---|---|---|
| WO | 2011080503 A2 | 7/2011 |

OTHER PUBLICATIONS

Dictionary of Food Science and Technology.Hexane. Wiley-Blackwell Publisher. Second edition published 2009. Copyright 2009 International Food Information Service. Editorial Offices, Ames, Iowa. p. 210.*
Oxford Dictionary of Biochemistry and Molecular Biology.Pellet. Oxford University Press Publisher. Second edition published 2006. Copyright 2006 The General Editors. New York, New York. p. 501.*
Oxford Dictionary of Biochemistry and Molecular Biology. Triglyceride. Oxford University Press Publisher. Second edition published 2006. Copyright 2006 The General Editors. New York, New York. p. 678.*
Lin et al., Short-Path Distillation of Palm Olein and Characterization of Products, Eur. J. Lipid Sci. Technol. vol. 111 (2009) pp. 142-147.
Liang et al., Fractionation of Squid Visceral Oil Ethyl Esters by Short-Path Distillation, JAOCS, vol. 77, No. 7 (2000), pp. 773-777.
Krukonis et al., Concentration of Eicosapentaenoic Acid by Superciritical Fluid Extraction: A Design Study of a Continuous Production Process, Flick et al., Editors, Advances in Seafood Biochemistry, Technomic Publication, Lancaster USA (1992), pp. 169-179.
Breivik et al., Preparation of Highly Purified Concentrates of Eicosapentaenoic Acid and Docosahexaenoic Acid, JAOCS, vol. 74, No. 11 (1997), pp. 1425-1429.
Bioriginal, Innovate EFA Solutions, Molecular Distillation or Oil Refining: The Facts on Fish Oil, Undated, pp. 1-2.
Puah et al., Feature: Clearner Production Technologies for the Palm Oil Industry, Lipid Technology, vol. 19, No. 2 (2007), pp. 31-34.
* cited by examiner (Continued)

*Primary Examiner* — John S Brusca
*Assistant Examiner* — Sharon M Papciak

(57) ABSTRACT

Methods are provided for pelletizing a microbial biomass, extracting a refined lipid composition from the pelletized biomass under supercritical conditions and distilling the refined lipid composition, at least once under short path distillation conditions, to obtain a lipid-containing fraction. Also disclosed are methods of making lipid-containing oil concentrates therefrom, by transesterifying and enriching the lipid-containing fraction.

20 Claims, 6 Drawing Sheets

SEQUENCE LISTING

```
<160> NUMBER OF SEQ ID NOS: 8

<210> SEQ ID NO 1
<211> LENGTH: 4313
<212> TYPE: DNA
<213> ORGANISM: Artificial Sequence
<220> FEATURE:
<223> OTHER INFORMATION: Plasmid pZKUM

<400> SEQUENCE: 1
taatcgagct tggcgtaatc atggtcatag ctgtttcctg tgtgaaattg ttatccgctc      60
acaattccac acaacatacg agccggaagc ataaagtgta aagcctgggg tgcctaatga     120
gtgagctaac tcacattaat tgcgttgcgc tcactgcccg ctttccagtc gggaaacctg     180
tcgtgccagc tgcattaatg aatcggccaa cgcgcgggga gaggcggttt gcgtattggg     240
cgctcttccg cttcctcgct cactgactcg ctgcgctcgg tcgttcggct gcggcgagcg     300
gtatcagctc actcaaaggc ggtaatacgg ttatccacag aatcagggga taacgcagga     360
aagaacatgt gagcaaaagg ccagcaaaag gccaggaacc gtaaaaaggc cgcgttgctg     420
```

```
gcgttttcc ataggctccg ccccctgac gagcatcaca aaaatcgacg ctcaagtcag    480
aggtggcgaa acccgacagg actataaaga taccaggcgt ttccccctgg aagctccctc    540
gtgcgctctc ctgttccgac cctgccgctt accggatacc tgtccgcctt tctcccttcg    600
ggaagcgtgg cgctttctca tagctcacgc tgtaggtatc tcagttcggt gtaggtcgtt    660
cgctccaagc tgggctgtgt gcacgaaccc cccgttcagc ccgaccgctg cgccttatcc    720
ggtaactatc gtcttgagtc caacccggta agacacgact tatcgccact ggcagcagcc    780
actggtaaca ggattagcag agcgaggtat gtaggcggtg ctacagagtt cttgaagtgg    840
tggcctaact acggctacac tagaaggaca gtatttggta tctgcgctct gctgaagcca    900
gttaccttcg gaaaaagagt tggtagctct tgatccggca aacaaccac cgctggtagc    960 ggtggttttt tgtttgcaa gcagcagatt acgcgcagaa aaaaggatc tcaagaagat    1020 cctttgatct tttctacggg gtctgacgct cagtggaacg aaaactcacg ttaagggatt    1080
ttggtcatga gattatcaaa aaggatcttc acctagatcc ttttaaatta aaaatgaagt    1140
tttaaatcaa tctaaagtat atatgagtaa acttggtctg acagttacca atgcttaatc    1200
agtgaggcac ctatctcagc gatctgtcta tttcgttcat ccatagttgc ctgactcccc    1260
gtcgtgtaga taactacgat acgggagggc ttaccatctg gccccagtgc tgcaatgata    1320
ccgcgagacc cacgctcacc ggctccagat ttatcagcaa taaaccagcc agccggaagg    1380
gccgagcgca gaagtggtcc tgcaacttta tccgcctcca tccagtctat taattgttgc    1440
cgggaagcta gagtaagtag ttcgccagtt aatagtttgc gcaacgttgt tgccattgct    1500
acaggcatcg tggtgtcacg ctcgtcgttt ggtatggctt cattcagctc cggttcccaa    1560
cgatcaaggc gagttacatg atcccccatg ttgtgcaaaa aagcggttag ctccttcggt    1620
cctccgatcg ttgtcagaag taagttggcc gcagtgttat cactcatggt tatggcagca    1680
ctgcataatt ctcttactgt catgccatcc gtaagatgct tttctgtgac tggtgagtac    1740
tcaaccaagt cattctgaga atagtgtatg cggcgaccga gttgctcttg cccggcgtca    1800
atacgggata taccgcgcc acatagcaga actttaaaag tgctcatcat tggaaaacgt    1860
tcttcggggc gaaaactctc aaggatctta ccgctgttga tccagttc gatgtaaccc    1920 actcgtgcac ccaactgatc ttcagcatct tttactttca ccagcgtttc tgggtgagca    1980
aaaacaggaa ggcaaaatgc cgcaaaaaag ggaataaggg cgacacggaa atgttgaata    2040
ctcatactct ccttttca atattattga agcatttatc agggttattg tctcatgagc    2100
ggatacatat ttgaatgtat ttagaaaaat aaacaaatag gggttccgcg cacatttccc    2160
cgaaaagtgc cacctgacgc gccctgtagc ggcgcattaa gcgcggcggg tgtggtggtt    2220
acgcgcagcg tgaccgctac acttgccagc gccctagcgc ccgctccttt cgctttcttc    2280
ccttcctttc tcgccacgtt cgccggcttt ccccgtcaag ctctaaatcg ggggctccct    2340
ttagggttcc gatttagtgc tttacggcac ctcgacccca aaaaacttga ttagggtgat    2400
ggttcacgta gtgggccatc gccctgatag acggttttc gccctttgac gttggagtcc    2460
acgttcttta atagtggact cttgttccaa actggaacaa cactcaaccc tatctcggtc    2520
tattcttttg atttataagg gattttgccg atttcggcct attggttaaa aaatgagctg    2580
atttaacaaa aatttaacgc gaattttaac aaaatattaa cgcttacaat ttccattcgc    2640
cattcaggct gcgcaactgt tgggaagggc gatcggtgcg ggcctcttcg ctattacgcc    2700
agctggcgaa agggggatgt gctgcaaggc gattaagttg ggtaacgcca gggttttccc    2760
```

-continued

| | |
|---|---|
| agtcacgacg ttgtaaaacg acggccagtg aattgtaata cgactcacta tagggcgaat | 2820 |
| tgggtaccgg gccccccctc gaggtcgacg agtatctgtc tgactcgtca ttgccgcctt | 2880 |
| tggagtacga ctccaactat gagtgtgctt ggatcacttt gacgatacat tcttcgttgg | 2940 |
| aggctgtggg tctgacagct gcgttttcgg cgcggttggc cgacaacaat atcagctgca | 3000 |
| acgtcattgc tggctttcat catgatcaca tttttgtcgg caaaggcgac gcccagagag | 3060 |
| ccattgacgt tctttctaat ttggaccgat agccgtatag tccagtctat ctataagttc | 3120 |
| aactaactcg taactattac cataacatat acttcactgc cccagataag gttccgataa | 3180 |
| aaagttctgc agactaaatt tatttcagtc tcctcttcac caccaaaatg ccctcctacg | 3240 |
| aagctcgagt gctcaagctc gtggcagcca agaaaaccaa cctgtgtgct tctctggatg | 3300 |
| ttaccaccac caaggagctc attgagcttg ccgataaggt cggaccttat gtgtgcatga | 3360 |
| tcaaaaccca tatcgacatc attgacgact tcacctacgc cggcactgtg ctcccccctca | 3420 |
| aggaacttgc tcttaagcac ggtttcttcc tgttcgagga cagaaagttc gcagatattg | 3480 |
| gcaacactgt caagcaccag taccggtgtc accgaatcgc cgagtggtcc gatatcacca | 3540 |
| acgcccacgg tgtacccgga accggaatcg attgctggcc tgcgagctgg tgcgtacgag | 3600 |
| gaaactgtct ctgaacagaa gaaggaggac gtctctgact acgagaactc ccagtacaag | 3660 |
| gagttcctag tcccctctcc caacgagaag ctggccagag gtctgctcat gctggccgag | 3720 |
| ctgtcttgca agggctctct ggccactggc gagtactcca agcagaccat tgagcttgcc | 3780 |
| cgatccgacc ccgagtttgt ggttggcttc attgcccaga accgacctaa gggcgactct | 3840 |
| gaggactggc ttattctgac ccccggggtg ggtcttgacg acaagggaga cgctctcgga | 3900 |
| cagcagtacc gaactgttga ggatgtcatg tctaccggaa cggatatcat aattgtcggc | 3960 |
| cgaggtctgt acgccagaa ccgagatcct attgaggagg ccaagcgata ccagaaggct | 4020 |
| ggctgggagg cttaccagaa gattaactgt tagaggttag actatggata tgtaatttaa | 4080 |
| ctgtgtatat agagagcgtg caagtatgga gcgcttgttc agcttgtatg atggtcagac | 4140 |
| gacctgtctg atcgagtatg tatgatactg cacaacctgt gtatccgcat gatctgtcca | 4200 |
| atggggcatt tgttgtgtt tctcgatacg gagatgctgg gtacagtgct aatacgttga | 4260 |
| actacttata cttatatgag gctcgaagaa agctgacttg tgtatgactt aat | 4313 |

<210> SEQ ID NO 2
<211> LENGTH: 13565
<212> TYPE: DNA
<213> ORGANISM: Artificial Sequence
<220> FEATURE:
<223> OTHER INFORMATION: Plasmid pZKL3-9DP9N

<400> SEQUENCE: 2

| | |
|---|---|
| gtacggattg tgtatgtccc tgtacctgca tcttgatgga gagagctccg gaaagcggat | 60 |
| caggagctgt ccaattttaa ttttataaca tggaaacgag tccttggagc tagaagacca | 120 |
| tttttttcaac tgcccatatcg actatattta tctactccaa aaccgactgc ttcccaagaa | 180 |
| tcttcagcca aggcttccaa agtaaccccct cgcttcccga cacttaattg aaaccttaga | 240 |
| tgcagtcact gcgagtgaag tggactctaa catctccaac atagcgacga tattgcgagg | 300 |
| gtttgaatat aactaagatg catgatccat tacatttgta gaaatatcat aaacaacgaa | 360 |
| gcacatagac agaatgctgt tggttgttac atctgaagcc gaggtaccga tgtcattttc | 420 |
| agctgtcact gcagagacag gggtatgtca catttgaaga tcatacaacc gacgtttatg | 480 |
| aaaaccagag atatagagaa tgtattgacg gttgtggcta tgtcataagt gcagtgaagt | 540 |

```
gcagtgatta taggtatagt acacttactg tagctacaag tacatactgc tacagtaata    600
ctcatgtatg caaaccgtat tctgtgtcta cagaaggcga tacggaagag tcaatctctt    660
atgtagagcc atttctataa tcgaaggggc cttgtaattt ccaaacgagt aattgagtaa    720
ttgaagagca tcgtagacat tacttatcat gtattgtgag aggaggagatgcagctgta      780 gctactgcac atactgtact cgcccatgca gggataatgc atagcgagac ttggcagtag    840
gtgacagttg ctagctgcta cttgtagtcg ggtgggtgat agcatggcgc gccagctgca    900
ttaatgaatc ggccaacgcg cggggagagg cggtttgcgt attgggcgct cttccgcttc    960
ctcgctcact gactcgctgc gctcggtcgt tcggctgcgg cgagcggtat cagctcactc   1020
aaaggcggta atacggttat ccacagaatc aggggataac gcaggaaaga acatgtgagc   1080
aaaaggccag caaaaggcca ggaaccgtaa aaaggccgcg ttgctggcgt ttttccatag   1140
gctccgcccc cctgacgagc atcacaaaaa tcgacgctca agtcagaggt ggcgaaaccc   1200
gacaggacta taaagatacc aggcgtttcc ccctggaagc tccctcgtgc gctctcctgt   1260
tccgaccctg ccgcttaccg gatacctgtc cgcctttctc ccttcgggaa gcgtggcgct   1320
ttctcatagc tcacgctgta ggtatctcag ttcggtgtag tcgttcgct ccaagctggg    1380 ctgtgtgcac gaaccccccg ttcagcccga ccgctgcgcc ttatccggta actatcgtct   1440
tgagtccaac ccggtaagac acgacttatc gccactggca gcagccactg gtaacaggat   1500
tagcagagcg aggtatgtag gcggtgctac agagttcttg aagtggtggc ctaactacgg   1560
ctacactaga agaacagtat ttggtatctg cgctctgctg aagccagtta ccttcggaaa   1620
aagagttggt agctcttgat ccggcaaaca aaccaccgct ggtagcggtg gtttttttgt   1680
ttgcaagcag cagattacgc gcagaaaaaa aggatctcaa gaagatcctt tgatcttttc   1740
tacggggtct gacgctcagt ggaacgaaaa ctcacgttaa gggattttgg tcatgagatt   1800
atcaaaaagg atcttcacct agatcctttt aaattaaaaa tgaagtttta atcaatcta    1860 aagtatatat gagtaaactt ggtctgacag ttaccaatgc ttaatcagtg aggcacctat   1920
ctcagcgatc tgtctatttc gttcatccat agttgcctga ctccccgtcg tgtagataac   1980
tacgatacgg gagggcttac catctggccc cagtgctgca atgataccgc gagacccacg   2040
ctcaccggct ccagatttat cagcaataaa ccagccagcc ggaagggccg agcgcagaag   2100
tggtcctgca actttatccg cctccatcca gtctattaat tgttgccggg aagctagagt   2160
aagtagttcg ccagttaata gtttgcgcaa cgttgttgcc attgctacag gcatcgtggt   2220
gtcacgctcg tcgtttggta tggcttcatt cagctccggt tcccaacgat caaggcgagt   2280
tacatgatcc cccatgttgt gcaaaaaagc ggttagctcc ttcggtcctc cgatcgttgt   2340
cagaagtaag ttggccgcag tgttatcact catggttatg gcagcactgc ataattctct   2400
tactgtcatg ccatccgtaa gatgcttttc tgtgactggt gagtactcaa ccaagtcatt   2460
ctgagaatag tgtatgcggc gaccgagttg ctcttgcccg gcgtcaatac gggataatac   2520
cgcgccacat agcagaactt taaaagtgct catcattgga aaacgttctt cggggcgaaa   2580
actctcaagg atcttaccgc tgttgagatc cagttcgatg taacccactc gtgcacccaa   2640
ctgatcttca gcatctttta ctttcaccag cgtttctggg tgagcaaaaa caggaaggca   2700
aaatgccgca aaaaagggaa taagggcgac acggaaatgt tgaatactca tactcttcct   2760
ttttcaatat tattgaagca tttatcaggg ttattgtctc atgagcggat acatatttga   2820
atgtatttag aaaaataaac aaatagggg tccgcgcaca tttccccgaa aagtgccacc    2880
```

```
tgatgcggtg tgaaataccg cacagatgcg taaggagaaa ataccgcatc aggaaattgt    2940
aagcgttaat attttgttaa aattcgcgtt aaatttttgt taaatcagct catttttaa     3000 ccaataggcc gaaatcggca aaatccctta taaatcaaaa gaatagaccg ataagggtt     3060 gagtgttgtt ccagtttgga acaagagtcc actattaaag aacgtggact ccaacgtcaa    3120
agggcgaaaa accgtctatc agggcgatgg cccactacgt gaaccatcac cctaatcaag    3180
tttttttggg tcgaggtgcc gtaaagcact aaatcggaac cctaaaggga gccccgatt     3240 tagagcttga cggggaaagc cggcgaacgt ggcgagaaag gaagggaaga aagcgaaagg    3300
agcgggcgct agggcgctgg caagtgtagc ggtcacgctg cgcgtaacca ccacacccgc    3360
cgcgcttaat gcgccgctac agggcgcgtc cattcgccat tcaggctgcg caactgttgg    3420
gaagggcgat cggtgcgggc ctcttcgcta ttacgccagc tggcgaaagg gggatgtgct    3480
gcaaggcgat taagttgggt aacgccaggg ttttcccagt cacgacgttg taaaacgacg    3540
gccagtgaat tgtaatacga ctcactatag ggcgaattgg gcccgacgtc gcatgcagga    3600
atagacatct tcaataggag cattaatacc tgtgggatca ctgatgtaaa cttctcccag    3660
agtatgtgaa taaccagcgg gccatccaac aaagaagtcg ttccagtgag tgactcggta    3720
catccgtctt tcggggttga tggtaagtcc gtcgtctcct tgcttaaaga acagagcgtc    3780
cacgtagtct gcaaaagcct tgttccaag tcgaggctgc ccatagttga ttagcgttgg     3840
atcatatcca agattcttca ggttgatgcc catgaataga gcagtgacag ctcctagaga    3900
gtggccagtt acgatcaatt tgtagtcagt gttgtttcca aggaagtcga ccagacgatc    3960
ctgtacgttc accatagtct ctctgtatgc cttctgaaag ccatcatgaa cttggcagcc    4020
aggacaattg atactggcag aagggtttgt ggagtttatg tcagtagtgt taagaggagg    4080
gatactggtc atgtagggtt gttggatcgt ttggatgtca gtaatagcgt ctgcaatgga    4140
gaaagtgcct cggaaaacaa tatacttttc cttttggtg tgatcgtggg ccaaaaatcc     4200
agtaactgaa gtcgagaaga aatttcctcc aaactggtag tcaagagtca catcgggaaa    4260
atgagcgcaa gagtttccac aggtaaaatc gctctgcagg gcaaatgggc cagggctct     4320 gacacaatag gccacgttag atagccatcc gtacttgaga acaaagtcgt atgtctcctg    4380
ggtgatagga gccgttaatt aagttgcgac acatgtcttg atagtatctt gaattctctc    4440
tcttgagctt ttccataaca agttcttctg cctccaggaa gtccatgggt ggtttgatca    4500
tggttttggt gtagtggtag tgcagtggtg gtattgtgac tggggatgta gttgagaata    4560
agtcatacac aagtcagctt tcttcgagcc tcatataagt ataagtagtt caacgtatta    4620
gcactgtacc cagcatctcc gtatcgagaa acacaacaac atgccccatt ggacagatca    4680
tgcggataca caggttgtgc agtatcatac atactcgatc agacaggtcg tctgaccatc    4740
atacaagctg aacaagcgct ccatacttgc acgctctcta tatacacagt taaattacat    4800
atccatagtc taacctctaa cagttaatct tctggtaagc ctcccagcca gccttctggt    4860
atcgcttggc ctcctcaata ggatctcggt tctggccgta cagacctcgg ccgacaatta    4920
tgatatccgt tccggtagac atgacatcct caacagttcg gtactgctgt ccgagagcgt    4980
ctcccttgtc gtcaagaccc accccggggg tcagaataag ccagtcctca gagtcgccct    5040
taggtcggtt ctgggcaatg aagccaacca caaactcggg gtcggatcgg gcaagctcaa    5100
tggtctgctt ggagtactcg ccagtggcca gagagccctt gcaagacagc tcggccagca    5160
tgagcagacc tctggccagc ttctcgttgg gagaggggac taggaactcc ttgtactggg    5220
agttctcgta gtcagagacg tcctccttct tctgttcaga gacagtttcc tcggcaccag    5280
```

```
ctcgcaggcc agcaatgatt ccggttccgg gtacaccgtg ggcgttggtg atatcggacc    5340
actcggcgat tcggtgacac cggtactggt gcttgacagt gttgccaata tctgcgaact    5400
ttctgtcctc gaacaggaag aaaccgtgct taagagcaag ttccttgagg gggagcacag    5460
tgccggcgta ggtgaagtcg tcaatgatgt cgatatgggt tttgatcatg cacacataag    5520
gtccgacctt atcggcaagc tcaatgagct ccttggtggt ggtaacatcc agagaagcac    5580
acaggttggt tttcttggct gccacgagct tgagcactcg agcggcaaag gcggacttgt    5640
ggacgttagc tcgagcttcg taggagggca ttttggtggt gaagaggaga ctgaaataaa    5700
tttagtctgc agaactttt atcggaacct tatctgggc agtgaagtat atgttatggt       5760
aatagttacg agttagttga acttatagat agactggact atacggctat cggtccaaat    5820
tagaaagaac gtcaatggct ctctgggcgt cgcctttgcc gacaaaaatg tgatcatgat    5880
gaaagccagc aatgacgttg cagctgatat tgttgtcggc caaccgcgcc gaaaacgcag    5940
ctgtcagacc cacagcctcc aacgaagaat gtatcgtcaa agtgatccaa gcacactcat    6000
agttggagtc gtactccaaa ggcggcaatg acgagtcaga cagatactcg tcgaccttt     6060
ccttgggaac caccaccgtc agcccttctg actcacgtat tgtagccacc gacacaggca    6120
acagtccgtg gatagcagaa tatgtcttgt cggtccattt ctcaccaact ttaggcgtca    6180
agtgaatgtt gcagaagaag tatgtgcctt cattgagaat cggtgttgct gatttcaata    6240
aagtcttgag atcagtttgg ccagtcatgt tgtgggggt aattggattg agttatcgcc      6300
tacagtctgt acaggtatac tcgctgccca ctttatactt tttgattccg ctgcacttga    6360
agcaatgtcg tttaccaaaa gtgagaatgc tccacagaac acaccccagg gtatggttga    6420
gcaaaaaata aacactccga tacggggaat cgaaccccgg tctccacggt tctcaagaag    6480
tattcttgat gagagcgtat cgatggttaa tgctgctgtg tgctgtgtgt gtgtgttgtt    6540
tggcgctcat tgttgcgtta tgcagcgtac accacaatat tggaagctta ttagcctttc    6600
tatttttcg tttgcaaggc ttaacaacat tgctgtggag agggatgggg atatggaggc     6660
cgctggaggg agtcggagag gcgttttgga gcggcttggc ctggcgccca gctcgcgaaa    6720
cgcacctagg acccttggc acgccgaaat gtgccacttt tcagtctagt aacgccttac     6780
ctacgtcatt ccatgcgtgc atgttttcgc ctttttccc ttgcccttga tcgccacaca     6840
gtacagtgca ctgtacagtg gaggtttgg ggggtctta gatgggagct aaaagcggcc      6900
tagcggtaca ctagtgggat tgtatggagt ggcatggagc ctaggtggag cctgacagga    6960
cgcacgaccg gctagcccgt gacagacgat gggtggctcc tgttgtccac cgcgtacaaa    7020
tgtttgggcc aaagtcttgt cagccttgct tgcgaaccta attcccaatt ttgtcacttc    7080
gcacccccat tgatcgagcc ctaaccctg cccatcaggc aatccaatta agctcgcatt     7140
gtctgccttg tttagtttgg ctcctgcccg tttcggcgtc cacttgcaca aacacaaaca    7200
agcattatat ataaggctcg tctctccctc ccaaccacac tcactttttt gcccgtcttc    7260
ccttgctaac acaaaagtca agaacacaaa caaccacccc aacccccta cacacaagac     7320
atatctacag caatggccat ggccaaaagc aaacgacggt cggaggctgt ggaagagcac    7380
gtgaccggct cggacgaggg cttgaccgat acttcgggtc acgtgagccc tgccgccaag    7440
aagcagaaga actcggagat tcatttcacc acccaggctg cccagcagtt ggatcgggag    7500
cgcaaggagg agtatctgga ctcgctgatc gacaacaagg actatctcaa gtaccgtcct    7560
cgaggctgga agctcaacaa cccgcctacc gaccgacctg tgcgaatcta cgccgatgga    7620
```

```
gtgtttgatt tgttccatct gggacacatg cgtcagctgg agcagtccaa gaaggccttc    7680
cccaacgcag tgttgattgt gggcattccc agcgacaagg agacccacaa gcggaaggga    7740
ttgaccgtgc tgagtgacgt ccagcggtac gagacggtgc gacactgcaa gtgggtggac    7800
gaggtggtgg aggatgctcc ctggtgtgtc accatggact ttctggaaaa acacaaaatc    7860
gactacgtgg cccatgacga tctgccctac gcttccggca acgacgatga tatctacaag    7920
cccatcaagg agaagggcat gtttctggcc acccagcgaa ccgagggcat ttccacctcg    7980
gacatcatca ccaagattat ccgagactac gacaagtatt taatgcgaaa ctttgcccgg    8040
ggtgctaacc gaaaggatct caacgtctcg tggctcaaga gaacgagct ggacttcaag     8100 cgtcatgtgg ccgagttccg aaactcgttc aagcgaaaga aggtcggtaa ggatctctac    8160
ggcgagattc gcggtctgct gcagaatgtg ctcatttgga acggcgacaa ctccggcact    8220
tccactcccc agcgaaagac gctgcagacc aacgccaaga agatgtacat gaacgtgctc    8280
aagactctgc aggctcctga cgctgttgac gtggactcct cggagaacgt gtctgagaac    8340
gtcactgatg aggaggagga agacgacgac gaggttgatg aggacgaaga agccgacgac    8400
gacgacgaag acgacgaaga cgaggaagac gacgagtagg cggccgcatt gatgattgga    8460
aacacacaca tgggttatat ctaggtgaga gttagttgga cagttatata ttaaatcagc    8520
tatgccaacg gtaacttcat tcatgtcaac gaggaaccag tgactgcaag taatatagaa    8580
tttgaccacc ttgccattct cttgcactcc tttactatat ctcatttatt tcttatatac    8640
aaatcacttc ttcttcccag catcgagctc ggaaacctca tgagcaataa catcgtggat    8700
ctcgtcaata gagggctttt tggactcctt gctgttggcc accttgtcct tgctgtttaa    8760
acacgcagta ggatgtcctg cacgggtctt tttgtggggt gtggagaaag gggtgcttgg    8820
agatggaagc cggtagaacc gggctgcttg tgcttggaga tggaagccgg tagaaccggg    8880
ctgcttgggg ggatttgggg ccgctgggct ccaaagaggg gtaggcattt cgttgggtt    8940 acgtaattgc ggcatttggg tcctgcgcgc atgtcccatt ggtcagaatt agtccggata    9000
ggagacttat cagccaatca cagcgccgga tccacctgta ggttgggttg ggtgggagca    9060
cccctccaca gagtagagtc aaacagcagc agcaacatga tagttggggg tgtgcgtgtt    9120
aaaggaaaaa aaagaagctt gggttatatt cccgctctat ttagaggttg cgggatagac    9180
gccgacggag ggcaatggcg ctatggaacc ttgcggatat ccatacgccg cggcggactg    9240
cgtccgaacc agctccagca gcgtttttc cgggccattg agccgactgc gaccccgcca    9300
acgtgtcttg gcccacgcac tcatgtcatg ttggtgttgg gaggccactt tttaagtagc    9360
acaaggcacc tagctcgcag caaggtgtcc gaaccaaaga agcggctgca gtggtgcaaa    9420
cggggcggaa acggcgggaa aaagccacgg gggcacgaat tgaggcacgc cctcgaattt    9480
gagacgagtc acggccccat tcgcccgcgc aatggctcgc caacgcccgg tcttttgcac    9540
cacatcaggt taccccaagc caaacctttg tgttaaaaag cttaacatat tataccgaac    9600
gtaggtttgg gcgggcttgc tccgtctgtc caaggcaaca tttatataag ggtctgcatc    9660
gccggctcaa ttgaatcttt tttcttcttc tcttctctat attcattctt gaattaaaca    9720
cacatcaaca tggccatcaa agtcggtatt aacggattcg ggcgaatcgg acgaattgtg    9780
agtaccatag aaggtgatgg aaacatgacc caacagaaac agatgacaag tgtcatcgac    9840
ccaccagagc ccaattgagc tcatactaac agtcgacaac ctgtcgaacc aattgatgac    9900
tccccgacaa tgtactaaca caggtcctgc ccatggtgaa aaacgtggac caagtggatc    9960
tctcgcaggt cgacaccatt gcctccggcc gagatgtcaa ctacaaggtc aagtacacct   10020
```

```
ccggcgttaa gatgagccag ggcgcctacg acgacaaggg ccgccacatt tccgagcagc  10080
ccttcacctg ggccaactgg caccagcaca tcaactggct caacttcatt ctggtgattg  10140
cgctgcctct gtcgtccttt gctgccgctc ccttcgtctc cttcaactgg aagaccgccg  10200
cgtttgctgt cggctattac atgtgcaccg gtctcggtat caccgccggc taccaccgaa  10260
tgtgggccca tcgagcctac aaggccgctc tgcccgttcg aatcatcctt gctctgtttg  10320
gaggaggagc tgtcgagggc tccatccgat ggtgggcctc gtctcaccga gtccaccacc  10380
gatggaccga ctccaacaag gacccttacg acgcccgaaa gggattctgg ttctcccact  10440
ttggctggat gctgcttgtg cccaaccccca agaacaaggg ccgaactgac atttctgacc  10500
tcaacaacga ctgggttgtc cgactccagc acaagtacta cgtttacgtt ctcgtcttca  10560
tggccattgt tctgcccacc ctcgtctgtg gctttggctg gggcgactgg aagggaggtc  10620
ttgtctacgc cggtatcatg cgatacacct tgtgcagca ggtgactttc tgtgtcaact  10680
cccttgccca ctggattgga gagcagccct cgacgaccg acgaactccc cgagaccacg  10740
ctcttaccgc cctggtcacc tttggagagg gctaccacaa cttccaccac gagttcccct  10800
cggactaccg aaacgccctc atctggtacc agtacgaccc caccaagtgg ctcatctgga  10860
ccctcaagca ggttggtctc gcctgggacc tccagacctt ctcccagaac gccatcgagc  10920
agggtctcgt gcagcagcga cagaagaagc tggacaagtg gcgaaacaac ctcaactggg  10980
gtatccccat tgagcagctg cctgtcattg agtttgagga gttccaagag caggccaaga  11040
cccgagatct ggttctcatt tctggcattg tccacgacgt gtctgccttt gtcgagcacc  11100
accctggtgg aaaggccctc attatgagcg ccgtcggcaa ggacggtacc gctgtcttca  11160
acggaggtgt ctaccgacac tccaacgctg gccacaacct gcttgccacc atgcgagttt  11220
cggtcattcg aggcggcatg gaggttgagg tgtggaagac tgcccagaac gaaaagaagg  11280
accagaacat tgtctccgat gagagtggaa accgaatcca ccgagctggt ctccaggcca  11340
cccgggtcga gaaccccggt atgtctggca tggctgctta ggcggccgca tgagaagata  11400
aatatataaa tacattgaga tattaaatgc gctagattag agagcctcat actgctcgga  11460
gagaagccaa gacgagtact caaaggggat tacaccatcc atatccacag acacaagctg  11520
gggaaaggtt ctatatacac tttccggaat accgtagttt ccgatgttat caatggggc  11580 agccaggatt tcaggcactt cggtgtctcg gggtgaaatg cgttcttgg cctccatcaa  11640 gtcgtaccat gtcttcattt gcctgtcaaa gtaaacaga agcagatgaa gaatgaactt  11700
gaagtgaagg aatttaaata gttggagcaa gggagaaatg tagagtgtga aagactcact  11760
atggtccggg cttatctcga ccaatagcca aagtctggag tttctgagag aaaaaggcaa  11820
gatacgtatg taacaaagcg acgcatggta caataatacc ggaggcatgt atcatagaga  11880
gttagtggtt cgatgatggc actggtgcct ggtatgactt tatacggctg actacatatt  11940
tgtcctcaga catacaatta cagtcaagca cttacccttg gacatctgta ggtaccccc   12000 ggccaagacg atctcagcgt gtcgtatgtc ggattggcgt agctccctcg ctcgtcaatt  12060
ggctcccatc tactttcttc tgcttggcta cacccagcat gtctgctatg gctcgttttc  12120
gtgccttatc tatcctccca gtattaccaa ctctaaatga catgatgtga ttgggtctac  12180
actttcatat cagagataag gagtagcaca gttgcataaa aagcccaact ctaatcagct  12240
tcttcctttc ttgtaattag tacaaaggtg attagcgaaa tctggaagct tagttggccc  12300
taaaaaaatc aaaaaaagca aaaacgaaa aacgaaaaac cacagttttg agaacaggga  12360
```

-continued

```
ggtaacgaag gatcgtatat atatatatat atatatatac ccacggatcc cgagaccggc    12420
ctttgattct tccctacaac caaccattct caccaccta attcacaacc atggaggtcg      12480
tgaacgaaat cgtctccatt ggccaggagg ttcttcccaa ggtcgactat gctcagctct    12540
ggtctgatgc ctcgcactgc gaggtgctgt acctctccat cgccttcgtc atcctgaagt    12600
tcacccttgg tcctctcgga cccaagggtc agtctcgaat gaagtttgtg ttcaccaact    12660
acaacctgct catgtccatc tactcgctgg gctccttcct ctctatggcc tacgccatgt    12720
acaccattgg tgtcatgtcc gacaactgcg agaaggcttt cgacaacaat gtcttccgaa    12780
tcaccactca gctgttctac ctcagcaagt tcctcgagta cattgactcc ttctatctgc    12840
ccctcatggg caagcctctg acctggttgc agttctttca ccatctcgga gctcctatgg    12900
acatgtggct gttctacaac taccgaaacg aagccgtttg gatctttgtg ctgctcaacg    12960
gcttcattca ctggatcatg tacggctact attggacccg actgatcaag ctcaagttcc    13020
ctatgcccaa gtccctgatt acttctatgc agatcattca gttcaacgtt ggcttctaca    13080
tcgtctggaa gtaccggaac attccctgct accgacaaga tggaatgaga atgtttggct    13140
ggtttttcaa ctacttctac gttggtactg tcctgtgtct gttcctcaac ttctacgtgc    13200
agacctacat cgtccgaaag cacaagggag ccaaaaagat tcagtgagcg gccgcaagtg    13260
tggatgggga agtgagtgcc cggttctgtg tgcacaattg gcaatccaag atggatggat    13320
tcaacacagg gatatagcga gctacgtggt ggtgcgagga tatagcaacg gatattatg     13380 tttgacactt gagaatgtac gatacaagca ctgtccaagt acaatactaa acatactgta    13440
catactcata ctcgtacccg gcaacggttt cacttgagtg cagtggctag tgctcttact    13500
cgtacagtgt gcaatactgc gtatcatagt ctttgatgta tatcgtattc attcatgtta    13560
gttgc                                                                13565
```

<210> SEQ ID NO 3
<211> LENGTH: 777
<212> TYPE: DNA
<213> ORGANISM: Euglena gracilis
<220> FEATURE:
<221> NAME/KEY: CDS
<222> LOCATION: (1)..(777)
<223> OTHER INFORMATION: mutant delta-9 elongase "EgD9eS-L35G"

<400> SEQUENCE: 3

```
atg gag gtc gtg aac gaa atc gtc tcc att ggc cag gag gtt ctt ccc        48
Met Glu Val Val Asn Glu Ile Val Ser Ile Gly Gln Glu Val Leu Pro
 1               5                  10                  15 aag gtc gac tat gct cag ctc tgg tct gat gcc tcg cac tgc gag gtg        96
Lys Val Asp Tyr Ala Gln Leu Trp Ser Asp Ala Ser His Cys Glu Val
             20                  25                  30 ctg tac ggg tcc atc gcc ttc gtc atc ctg aag ttc acc ctt ggt cct       144
Leu Tyr Gly Ser Ile Ala Phe Val Ile Leu Lys Phe Thr Leu Gly Pro
         35                  40                  45 ctc gga ccc aag ggt cag tct cga atg aag ttt gtg ttc acc aac tac       192
Leu Gly Pro Lys Gly Gln Ser Arg Met Lys Phe Val Phe Thr Asn Tyr
     50                  55                  60 aac ctg ctc atg tcc atc tac tcg ctg ggc tcc ttc ctc tct atg gcc       240
Asn Leu Leu Met Ser Ile Tyr Ser Leu Gly Ser Phe Leu Ser Met Ala
 65                  70                  75                  80 tac gcc atg tac acc att ggt gtc atg tcc gac aac tgc gag aag gct       288
Tyr Ala Met Tyr Thr Ile Gly Val Met Ser Asp Asn Cys Glu Lys Ala
                 85                  90                  95 ttc gac aac aat gtc ttc cga atc acc act cag ctg ttc tac ctc agc       336
Phe Asp Asn Asn Val Phe Arg Ile Thr Thr Gln Leu Phe Tyr Leu Ser
```

```
                Phe Asp Asn Asn Val Phe Arg Ile Thr Thr Gln Leu Phe Tyr Leu Ser
                                100                 105                 110 aag ttc ctc gag tac att gac tcc ttc tat ctg ccc ctc atg ggc aag              384
Lys Phe Leu Glu Tyr Ile Asp Ser Phe Tyr Leu Pro Leu Met Gly Lys
            115                 120                 125 cct ctg acc tgg ttg cag ttc ttt cac cat ctc gga gct cct atg gac              432
Pro Leu Thr Trp Leu Gln Phe Phe His His Leu Gly Ala Pro Met Asp
130                 135                 140 atg tgg ctg ttc tac aac tac cga aac gaa gcc gtt tgg atc ttt gtg              480
Met Trp Leu Phe Tyr Asn Tyr Arg Asn Glu Ala Val Trp Ile Phe Val
145                 150                 155                 160 ctg ctc aac ggc ttc att cac tgg atc atg tac ggc tac tat tgg acc              528
Leu Leu Asn Gly Phe Ile His Trp Ile Met Tyr Gly Tyr Tyr Trp Thr
                165                 170                 175 cga ctg atc aag ctc aag ttc cct atg ccc aag tcc ctg att act tct              576
Arg Leu Ile Lys Leu Lys Phe Pro Met Pro Lys Ser Leu Ile Thr Ser
            180                 185                 190 atg cag atc att cag ttc aac gtt ggc ttc tac atc gtc tgg aag tac              624
Met Gln Ile Ile Gln Phe Asn Val Gly Phe Tyr Ile Val Trp Lys Tyr
        195                 200                 205 cgg aac att ccc tgc tac cga caa gat gga atg aga atg ttt ggc tgg              672
Arg Asn Ile Pro Cys Tyr Arg Gln Asp Gly Met Arg Met Phe Gly Trp
    210                 215                 220 ttt ttc aac tac ttc tac gtt ggt act gtc ctg tgt ctg ttc ctc aac              720
Phe Phe Asn Tyr Phe Tyr Val Gly Thr Val Leu Cys Leu Phe Leu Asn
225                 230                 235                 240 ttc tac gtg cag acc tac atc gtc cga aag cac aag gga gcc aaa aag              768
Phe Tyr Val Gln Thr Tyr Ile Val Arg Lys His Lys Gly Ala Lys Lys
                245                 250                 255 att cag tga                                                                  777
Ile Gln <210> SEQ ID NO 4
<211> LENGTH: 258
<212> TYPE: PRT
<213> ORGANISM: Euglena gracilis

<400> SEQUENCE: 4

Met Glu Val Val Asn Glu Ile Val Ser Ile Gly Gln Glu Val Leu Pro
1               5                   10                  15

Lys Val Asp Tyr Ala Gln Leu Trp Ser Asp Ala Ser His Cys Glu Val
                20                  25                  30

Leu Tyr Gly Ser Ile Ala Phe Val Ile Leu Lys Phe Thr Leu Gly Pro
            35                  40                  45

Leu Gly Pro Lys Gly Gln Ser Arg Met Lys Phe Val Phe Thr Asn Tyr
        50                  55                  60

Asn Leu Leu Met Ser Ile Tyr Ser Leu Gly Phe Leu Ser Met Ala
65                  70                  75                  80

Tyr Ala Met Tyr Thr Ile Gly Val Met Ser Asp Asn Cys Glu Lys Ala
                85                  90                  95

Phe Asp Asn Asn Val Phe Arg Ile Thr Thr Gln Leu Phe Tyr Leu Ser
            100                 105                 110

Lys Phe Leu Glu Tyr Ile Asp Ser Phe Tyr Leu Pro Leu Met Gly Lys
        115                 120                 125

Pro Leu Thr Trp Leu Gln Phe Phe His His Leu Gly Ala Pro Met Asp
    130                 135                 140

Met Trp Leu Phe Tyr Asn Tyr Arg Asn Glu Ala Val Trp Ile Phe Val
145                 150                 155                 160
```

-continued

```
Leu Leu Asn Gly Phe Ile His Trp Ile Met Tyr Gly Tyr Tyr Trp Thr
            165                 170                 175

Arg Leu Ile Lys Leu Lys Phe Pro Met Pro Lys Ser Leu Ile Thr Ser
        180                 185                 190

Met Gln Ile Ile Gln Phe Asn Val Gly Phe Tyr Ile Val Trp Lys Tyr
        195                 200                 205

Arg Asn Ile Pro Cys Tyr Arg Gln Asp Gly Met Arg Met Phe Gly Trp
        210                 215                 220

Phe Phe Asn Tyr Phe Tyr Val Gly Thr Val Leu Cys Leu Phe Leu Asn
225                 230                 235                 240

Phe Tyr Val Gln Thr Tyr Ile Val Arg Lys His Lys Gly Ala Lys Lys
            245                 250                 255

Ile Gln

<210> SEQ ID NO 5
<211> LENGTH: 1449
<212> TYPE: DNA
<213> ORGANISM: Yarrowia lipolytica
<220> FEATURE:
<221> NAME/KEY: CDS
<222> LOCATION: (1)..(1449)
<223> OTHER INFORMATION: delta-9 desaturase; GenBank Accession No.
      XM_501496

<400> SEQUENCE: 5 atg gtg aaa aac gtg gac caa gtg gat ctc tcg cag gtc gac acc att      48
Met Val Lys Asn Val Asp Gln Val Asp Leu Ser Gln Val Asp Thr Ile
1               5                   10                  15 gcc tcc ggc cga gat gtc aac tac aag gtc aag tac acc tcc ggc gtt      96
Ala Ser Gly Arg Asp Val Asn Tyr Lys Val Lys Tyr Thr Ser Gly Val
            20                  25                  30 aag atg agc cag ggc gcc tac gac gac aag ggc cgc cac att tcc gag     144
Lys Met Ser Gln Gly Ala Tyr Asp Asp Lys Gly Arg His Ile Ser Glu
        35                  40                  45 cag ccc ttc acc tgg gcc aac tgg cac cag cac atc aac tgg ctc aac     192
Gln Pro Phe Thr Trp Ala Asn Trp His Gln His Ile Asn Trp Leu Asn
    50                  55                  60 ttc att ctg gtg att gcg ctg cct ctg tcg tcc ttt gct gcc gct ccc     240
Phe Ile Leu Val Ile Ala Leu Pro Leu Ser Ser Phe Ala Ala Ala Pro
65                  70                  75                  80 ttc gtc tcc ttc aac tgg aag acc gcc gcg ttt gct gtc ggc tat tac     288
Phe Val Ser Phe Asn Trp Lys Thr Ala Ala Phe Ala Val Gly Tyr Tyr
                85                  90                  95 atg tgc acc ggt ctc ggt atc acc gcc ggc tac cac cga atg tgg gcc     336
Met Cys Thr Gly Leu Gly Ile Thr Ala Gly Tyr His Arg Met Trp Ala
            100                 105                 110 cat cga gcc tac aag gcc gct ctg ccc gtt cga atc atc ctt gct ctg     384
His Arg Ala Tyr Lys Ala Ala Leu Pro Val Arg Ile Ile Leu Ala Leu
        115                 120                 125 ttt gga gga gga gct gtc gag ggc tcc atc cga tgg tgg gcc tcg tct     432
Phe Gly Gly Gly Ala Val Glu Gly Ser Ile Arg Trp Trp Ala Ser Ser
    130                 135                 140 cac cga gtc cac cac cga tgg acc gac tcc aac aag gac cct tac gac     480
His Arg Val His His Arg Trp Thr Asp Ser Asn Lys Asp Pro Tyr Asp
145                 150                 155                 160 gcc cga aag gga ttc tgg ttc tcc cac ttt ggc tgg atg ctg ctt gtg     528
Ala Arg Lys Gly Phe Trp Phe Ser His Phe Gly Trp Met Leu Leu Val
                165                 170                 175 ccc aac ccc aag aac aag ggc cga act gac att tct gac ctc aac aac     576
```

```
                Pro Asn Pro Lys Asn Lys Gly Arg Thr Asp Ile Ser Asp Leu Asn Asn
                            180                 185                 190 gac tgg gtt gtc cga ctc cag cac aag tac tac gtt tac gtt ctc gtc                624
Asp Trp Val Val Arg Leu Gln His Lys Tyr Tyr Val Tyr Val Leu Val
            195                 200                 205 ttc atg gcc att gtt ctg ccc acc ctc gtc tgt ggc ttt ggc tgg ggc                672
Phe Met Ala Ile Val Leu Pro Thr Leu Val Cys Gly Phe Gly Trp Gly
210                 215                 220 gac tgg aag gga ggt ctt gtc tac gcc ggt atc atg cga tac acc ttt                720
Asp Trp Lys Gly Gly Leu Val Tyr Ala Gly Ile Met Arg Tyr Thr Phe
225                 230                 235                 240 gtg cag cag gtg act ttc tgt gtc aac tcc ctt gcc cac tgg att gga                768
Val Gln Gln Val Thr Phe Cys Val Asn Ser Leu Ala His Trp Ile Gly
            245                 250                 255 gag cag ccc ttc gac gac cga cga act ccc cga gac cac gct ctt acc                816
Glu Gln Pro Phe Asp Asp Arg Arg Thr Pro Arg Asp His Ala Leu Thr
            260                 265                 270 gcc ctg gtc acc ttt gga gag ggc tac cac aac ttc cac cac gag ttc                864
Ala Leu Val Thr Phe Gly Glu Gly Tyr His Asn Phe His His Glu Phe
            275                 280                 285 ccc tcg gac tac cga aac gcc ctc atc tgg tac cag tac gac ccc acc                912
Pro Ser Asp Tyr Arg Asn Ala Leu Ile Trp Tyr Gln Tyr Asp Pro Thr
            290                 295                 300 aag tgg ctc atc tgg acc ctc aag cag gtt ggt ctc gcc tgg gac ctc                960
Lys Trp Leu Ile Trp Thr Leu Lys Gln Val Gly Leu Ala Trp Asp Leu
305                 310                 315                 320 cag acc ttc tcc cag aac gcc atc gag cag ggt ctc gtg cag cag cga               1008
Gln Thr Phe Ser Gln Asn Ala Ile Glu Gln Gly Leu Val Gln Gln Arg
            325                 330                 335 cag aag aag ctg gac aag tgg cga aac aac ctc aac tgg ggt atc ccc               1056
Gln Lys Lys Leu Asp Lys Trp Arg Asn Asn Leu Asn Trp Gly Ile Pro
            340                 345                 350 att gag cag ctg cct gtc att gag ttt gag gag ttc caa gag cag gcc               1104
Ile Glu Gln Leu Pro Val Ile Glu Phe Glu Glu Phe Gln Glu Gln Ala
            355                 360                 365 aag acc cga gat ctg gtt ctc att tct ggc att gtc cac gac gtg tct               1152
Lys Thr Arg Asp Leu Val Leu Ile Ser Gly Ile Val His Asp Val Ser
370                 375                 380 gcc ttt gtc gag cac cac cct ggt gga aag gcc ctc att atg agc gcc               1200
Ala Phe Val Glu His His Pro Gly Gly Lys Ala Leu Ile Met Ser Ala
385                 390                 395                 400 gtc ggc aag gac ggt acc gct gtc ttc aac gga ggt gtc tac cga cac               1248
Val Gly Lys Asp Gly Thr Ala Val Phe Asn Gly Gly Val Tyr Arg His
            405                 410                 415 tcc aac gct ggc cac aac ctg ctt gcc acc atg cga gtt tcg gtc att               1296
Ser Asn Ala Gly His Asn Leu Leu Ala Thr Met Arg Val Ser Val Ile
            420                 425                 430 cga ggc ggc atg gag gtt gag gtg tgg aag act gcc cag aac gaa aag               1344
Arg Gly Gly Met Glu Val Glu Val Trp Lys Thr Ala Gln Asn Glu Lys
            435                 440                 445 aag gac cag aac att gtc tcc gat gag agt gga aac cga atc cac cga               1392
Lys Asp Gln Asn Ile Val Ser Asp Glu Ser Gly Asn Arg Ile His Arg
450                 455                 460 gct ggt ctc cag gcc acc cgg gtc gag aac ccc ggt atg tct ggc atg               1440
Ala Gly Leu Gln Ala Thr Arg Val Glu Asn Pro Gly Met Ser Gly Met
465                 470                 475                 480 gct gct tag                                                                   1449
Ala Ala
```

-continued

```
<210> SEQ ID NO 6
<211> LENGTH: 482
<212> TYPE: PRT
<213> ORGANISM: Yarrowia lipolytica

<400> SEQUENCE: 6
```

| Met | Val | Lys | Asn | Val | Asp | Gln | Val | Asp | Leu | Ser | Gln | Val | Asp | Thr | Ile |
|---|---|---|---|---|---|---|---|---|---|---|---|---|---|---|---|
| 1 | | | | 5 | | | | | 10 | | | | | 15 | |

| Ala | Ser | Gly | Arg | Asp | Val | Asn | Tyr | Lys | Val | Lys | Tyr | Thr | Ser | Gly | Val |
|---|---|---|---|---|---|---|---|---|---|---|---|---|---|---|---|
| | | | 20 | | | | | 25 | | | | | 30 | | |

| Lys | Met | Ser | Gln | Gly | Ala | Tyr | Asp | Asp | Lys | Gly | Arg | His | Ile | Ser | Glu |
|---|---|---|---|---|---|---|---|---|---|---|---|---|---|---|---|
| | | | 35 | | | | | 40 | | | | | 45 | | |

| Gln | Pro | Phe | Thr | Trp | Ala | Asn | Trp | His | Gln | His | Ile | Asn | Trp | Leu | Asn |
|---|---|---|---|---|---|---|---|---|---|---|---|---|---|---|---|
| | 50 | | | | | 55 | | | | | 60 | | | | |

| Phe | Ile | Leu | Val | Ile | Ala | Leu | Pro | Leu | Ser | Ser | Phe | Ala | Ala | Ala | Pro |
|---|---|---|---|---|---|---|---|---|---|---|---|---|---|---|---|
| 65 | | | | | 70 | | | | | 75 | | | | | 80 |

| Phe | Val | Ser | Phe | Asn | Trp | Lys | Thr | Ala | Ala | Phe | Ala | Val | Gly | Tyr | Tyr |
|---|---|---|---|---|---|---|---|---|---|---|---|---|---|---|---|
| | | | | 85 | | | | | 90 | | | | | 95 | |

| Met | Cys | Thr | Gly | Leu | Gly | Ile | Thr | Ala | Gly | Tyr | His | Arg | Met | Trp | Ala |
|---|---|---|---|---|---|---|---|---|---|---|---|---|---|---|---|
| | | | 100 | | | | | 105 | | | | | 110 | | |

| His | Arg | Ala | Tyr | Lys | Ala | Ala | Leu | Pro | Val | Arg | Ile | Ile | Leu | Ala | Leu |
|---|---|---|---|---|---|---|---|---|---|---|---|---|---|---|---|
| | | | 115 | | | | | 120 | | | | | 125 | | |

| Phe | Gly | Gly | Gly | Ala | Val | Glu | Gly | Ser | Ile | Arg | Trp | Trp | Ala | Ser | Ser |
|---|---|---|---|---|---|---|---|---|---|---|---|---|---|---|---|
| | 130 | | | | | 135 | | | | | 140 | | | | |

| His | Arg | Val | His | His | Arg | Trp | Thr | Asp | Ser | Asn | Lys | Asp | Pro | Tyr | Asp |
|---|---|---|---|---|---|---|---|---|---|---|---|---|---|---|---|
| 145 | | | | | 150 | | | | | 155 | | | | | 160 |

| Ala | Arg | Lys | Gly | Phe | Trp | Phe | Ser | His | Phe | Gly | Trp | Met | Leu | Leu | Val |
|---|---|---|---|---|---|---|---|---|---|---|---|---|---|---|---|
| | | | | 165 | | | | | 170 | | | | | 175 | |

| Pro | Asn | Pro | Lys | Asn | Lys | Gly | Arg | Thr | Asp | Ile | Ser | Asp | Leu | Asn | Asn |
|---|---|---|---|---|---|---|---|---|---|---|---|---|---|---|---|
| | | | 180 | | | | | 185 | | | | | 190 | | |

| Asp | Trp | Val | Val | Arg | Leu | Gln | His | Lys | Tyr | Tyr | Val | Tyr | Val | Leu | Val |
|---|---|---|---|---|---|---|---|---|---|---|---|---|---|---|---|
| | | | 195 | | | | | 200 | | | | | 205 | | |

| Phe | Met | Ala | Ile | Val | Leu | Pro | Thr | Leu | Val | Cys | Gly | Phe | Gly | Trp | Gly |
|---|---|---|---|---|---|---|---|---|---|---|---|---|---|---|---|
| | 210 | | | | | 215 | | | | | 220 | | | | |

| Asp | Trp | Lys | Gly | Gly | Leu | Val | Tyr | Ala | Gly | Ile | Met | Arg | Tyr | Thr | Phe |
|---|---|---|---|---|---|---|---|---|---|---|---|---|---|---|---|
| 225 | | | | | 230 | | | | | 235 | | | | | 240 |

| Val | Gln | Gln | Val | Thr | Phe | Cys | Val | Asn | Ser | Leu | Ala | His | Trp | Ile | Gly |
|---|---|---|---|---|---|---|---|---|---|---|---|---|---|---|---|
| | | | | 245 | | | | | 250 | | | | | 255 | |

| Glu | Gln | Pro | Phe | Asp | Asp | Arg | Arg | Thr | Pro | Arg | Asp | His | Ala | Leu | Thr |
|---|---|---|---|---|---|---|---|---|---|---|---|---|---|---|---|
| | | | 260 | | | | | 265 | | | | | 270 | | |

| Ala | Leu | Val | Thr | Phe | Gly | Glu | Gly | Tyr | His | Asn | Phe | His | His | Glu | Phe |
|---|---|---|---|---|---|---|---|---|---|---|---|---|---|---|---|
| | | | 275 | | | | | 280 | | | | | 285 | | |

| Pro | Ser | Asp | Tyr | Arg | Asn | Ala | Leu | Ile | Trp | Tyr | Gln | Tyr | Asp | Pro | Thr |
|---|---|---|---|---|---|---|---|---|---|---|---|---|---|---|---|
| | 290 | | | | | 295 | | | | | 300 | | | | |

| Lys | Trp | Leu | Ile | Trp | Thr | Leu | Lys | Gln | Val | Gly | Leu | Ala | Trp | Asp | Leu |
|---|---|---|---|---|---|---|---|---|---|---|---|---|---|---|---|
| 305 | | | | | 310 | | | | | 315 | | | | | 320 |

| Gln | Thr | Phe | Ser | Gln | Asn | Ala | Ile | Glu | Gln | Gly | Leu | Val | Gln | Gln | Arg |
|---|---|---|---|---|---|---|---|---|---|---|---|---|---|---|---|
| | | | | 325 | | | | | 330 | | | | | 335 | |

| Gln | Lys | Lys | Leu | Asp | Lys | Trp | Arg | Asn | Asn | Leu | Asn | Trp | Gly | Ile | Pro |
|---|---|---|---|---|---|---|---|---|---|---|---|---|---|---|---|
| | | | 340 | | | | | 345 | | | | | 350 | | |

| Ile | Glu | Gln | Leu | Pro | Val | Ile | Glu | Phe | Glu | Glu | Phe | Gln | Glu | Gln | Ala |
|---|---|---|---|---|---|---|---|---|---|---|---|---|---|---|---|
| | | | 355 | | | | | 360 | | | | | 365 | | |

| Lys | Thr | Arg | Asp | Leu | Val | Leu | Ile | Ser | Gly | Ile | Val | His | Asp | Val | Ser |
|---|---|---|---|---|---|---|---|---|---|---|---|---|---|---|---|
| | 370 | | | | | 375 | | | | | 380 | | | | |

-continued

| | | | | | | | | | | | | | | |
|---|---|---|---|---|---|---|---|---|---|---|---|---|---|---|
|Ala|Phe|Val|Glu|His|His|Pro|Gly|Gly|Lys|Ala|Leu|Ile|Met|Ser|Ala|
|385| | | | |390| | | | |395| | | | |400|

| | | | | | | | | | | | | | |
|---|---|---|---|---|---|---|---|---|---|---|---|---|---|
|Val|Gly|Lys|Asp|Gly|Thr|Ala|Val|Phe|Asn|Gly|Gly|Val|Tyr|Arg|His|
| | | | |405| | | | |410| | | | |415|

| | | | | | | | | | | | | | |
|---|---|---|---|---|---|---|---|---|---|---|---|---|---|
|Ser|Asn|Ala|Gly|His|Asn|Leu|Leu|Ala|Thr|Met|Arg|Val|Ser|Val|Ile|
| | | |420| | | | |425| | | | |430| |

|Arg|Gly|Gly|Met|Glu|Val|Glu|Val|Trp|Lys|Thr|Ala|Gln|Asn|Glu|Lys|
|---|---|---|---|---|---|---|---|---|---|---|---|---|---|---|---|
| | | |435| | | | |440| | | | |445| | |

|Lys|Asp|Gln|Asn|Ile|Val|Ser|Asp|Glu|Ser|Gly|Asn|Arg|Ile|His|Arg|
|---|---|---|---|---|---|---|---|---|---|---|---|---|---|---|---|
| |450| | | | |455| | | | |460| | | | |

|Ala|Gly|Leu|Gln|Ala|Thr|Arg|Val|Glu|Asn|Pro|Gly|Met|Ser|Gly|Met|
|---|---|---|---|---|---|---|---|---|---|---|---|---|---|---|---|
|465| | | | |470| | | | |475| | | | |480|

Ala Ala

<210> SEQ ID NO 7
<211> LENGTH: 1101
<212> TYPE: DNA
<213> ORGANISM: Yarrowia lipolytica
<220> FEATURE:
<221> NAME/KEY: CDS
<222> LOCATION: (1)..(1101)
<223> OTHER INFORMATION: choline-phosphate cytidylyl-transferase;
      GenBank Accession No. XM_502978

<400> SEQUENCE: 7

```
atg gcc aaa agc aaa cga cgg tcg gag gct gtg gaa gag cac gtg acc     48
Met Ala Lys Ser Lys Arg Arg Ser Glu Ala Val Glu Glu His Val Thr
1               5                   10                  15 ggc tcg gac gag ggc ttg acc gat act tcg ggt cac gtg agc cct gcc     96
Gly Ser Asp Glu Gly Leu Thr Asp Thr Ser Gly His Val Ser Pro Ala
            20                  25                  30 gcc aag aag cag aag aac tcg gag att cat ttc acc acc cag gct gcc    144
Ala Lys Lys Gln Lys Asn Ser Glu Ile His Phe Thr Thr Gln Ala Ala
        35                  40                  45 cag cag ttg gat cgg gag cgc aag gag gag tat ctg gac tcg ctg atc    192
Gln Gln Leu Asp Arg Glu Arg Lys Glu Glu Tyr Leu Asp Ser Leu Ile
    50                  55                  60 gac aac aag gac tat ctc aag tac cgt cct cga ggc tgg aag ctc aac    240
Asp Asn Lys Asp Tyr Leu Lys Tyr Arg Pro Arg Gly Trp Lys Leu Asn
65                  70                  75                  80 aac ccg cct acc gac cga cct gtg cga atc tac gcc gat gga gtg ttt    288
Asn Pro Pro Thr Asp Arg Pro Val Arg Ile Tyr Ala Asp Gly Val Phe
                85                  90                  95 gat ttg ttc cat ctg gga cac atg cgt cag ctg gag cag tcc aag aag    336
Asp Leu Phe His Leu Gly His Met Arg Gln Leu Glu Gln Ser Lys Lys
            100                 105                 110 gcc ttc ccc aac gca gtg ttg att gtg ggc att ccc agc gac aag gag    384
Ala Phe Pro Asn Ala Val Leu Ile Val Gly Ile Pro Ser Asp Lys Glu
        115                 120                 125 acc cac aag cgg aag gga ttg acc gtg ctg agt gac gtc cag cgg tac    432
Thr His Lys Arg Lys Gly Leu Thr Val Leu Ser Asp Val Gln Arg Tyr
    130                 135                 140 gag acg gtg cga cac tgc aag tgg gtg gac gag gtg gtg gag gat gct    480
Glu Thr Val Arg His Cys Lys Trp Val Asp Glu Val Val Glu Asp Ala
145                 150                 155                 160 ccc tgg tgt gtc acc atg gac ttt ctg gaa aaa cac aaa atc gac tac    528
Pro Trp Cys Val Thr Met Asp Phe Leu Glu Lys His Lys Ile Asp Tyr
                165                 170                 175 gtg gcc cat gac gat ctg ccc tac gct tcc ggc aac gac gat gat atc    576
Val Ala His Asp Asp Leu Pro Tyr Ala Ser Gly Asn Asp Asp Asp Ile
```

| | | | | | | | | | | | | | | | |
|---|---|---|---|---|---|---|---|---|---|---|---|---|---|---|---|
| | | 180 | | | | | 185 | | | | | 190 | | | |
| tac | aag | ccc | atc | aag | gag | aag | ggc | atg | ttt | ctg | gcc | acc | cag | cga | acc | 624
| Tyr | Lys | Pro | Ile | Lys | Glu | Lys | Gly | Met | Phe | Leu | Ala | Thr | Gln | Arg | Thr |
| | | 195 | | | | | 200 | | | | | 205 | | | |

```
tac aag ccc atc aag gag aag ggc atg ttt ctg gcc acc cag cga acc      624
Tyr Lys Pro Ile Lys Glu Lys Gly Met Phe Leu Ala Thr Gln Arg Thr
        195                 200                 205 gag ggc att tcc acc tcg gac atc atc acc aag att atc cga gac tac      672
Glu Gly Ile Ser Thr Ser Asp Ile Ile Thr Lys Ile Ile Arg Asp Tyr
210                 215                 220 gac aag tat tta atg cga aac ttt gcc cgg ggt gct aac cga aag gat      720
Asp Lys Tyr Leu Met Arg Asn Phe Ala Arg Gly Ala Asn Arg Lys Asp
225                 230                 235                 240 ctc aac gtc tcg tgg ctc aag aag aac gag ctg gac ttc aag cgt cat      768
Leu Asn Val Ser Trp Leu Lys Lys Asn Glu Leu Asp Phe Lys Arg His
            245                 250                 255 gtg gcc gag ttc cga aac tcg ttc aag cga aag aag gtc ggt aag gat      816
Val Ala Glu Phe Arg Asn Ser Phe Lys Arg Lys Lys Val Gly Lys Asp
        260                 265                 270 ctc tac ggc gag att cgc ggt ctg ctg cag aat gtg ctc att tgg aac      864
Leu Tyr Gly Glu Ile Arg Gly Leu Leu Gln Asn Val Leu Ile Trp Asn
    275                 280                 285 ggc gac aac tcc ggc act tcc act ccc cag cga aag acg ctg cag acc      912
Gly Asp Asn Ser Gly Thr Ser Thr Pro Gln Arg Lys Thr Leu Gln Thr
290                 295                 300 aac gcc aag aag atg tac atg aac gtg ctc aag act ctg cag gct cct      960
Asn Ala Lys Lys Met Tyr Met Asn Val Leu Lys Thr Leu Gln Ala Pro
305                 310                 315                 320 gac gct gtt gac gtg gac tcc tcg gag aac gtg tct gag aac gtc act     1008
Asp Ala Val Asp Val Asp Ser Ser Glu Asn Val Ser Glu Asn Val Thr
            325                 330                 335 gat gag gag gag gaa gac gac gac gag gtt gat gag gac gaa gaa gcc     1056
Asp Glu Glu Glu Glu Asp Asp Asp Glu Val Asp Glu Asp Glu Glu Ala
        340                 345                 350 gac gac gac gac gaa gac gac gaa gac gag gaa gac gac gag tag         1101
Asp Asp Asp Asp Glu Asp Asp Glu Asp Glu Glu Asp Asp Glu
            355                 360                 365

<210> SEQ ID NO 8
<211> LENGTH: 366
<212> TYPE: PRT
<213> ORGANISM: Yarrowia lipolytica

<400> SEQUENCE: 8

Met Ala Lys Ser Lys Arg Arg Ser Glu Ala Val Glu Glu His Val Thr
1               5                   10                  15

Gly Ser Asp Glu Gly Leu Thr Asp Thr Ser Gly His Val Ser Pro Ala
            20                  25                  30

Ala Lys Lys Gln Lys Asn Ser Glu Ile His Phe Thr Thr Gln Ala Ala
        35                  40                  45

Gln Gln Leu Asp Arg Glu Arg Lys Glu Glu Tyr Leu Asp Ser Leu Ile
    50                  55                  60

Asp Asn Lys Asp Tyr Leu Lys Tyr Arg Pro Arg Gly Trp Lys Leu Asn
65                  70                  75                  80

Asn Pro Pro Thr Asp Arg Pro Val Arg Ile Tyr Ala Asp Gly Val Phe
                85                  90                  95

Asp Leu Phe His Leu Gly His Met Arg Gln Leu Glu Gln Ser Lys Lys
            100                 105                 110

Ala Phe Pro Asn Ala Val Leu Ile Val Gly Ile Pro Ser Asp Lys Glu
        115                 120                 125

Thr His Lys Arg Lys Gly Leu Thr Val Leu Ser Asp Val Gln Arg Tyr
```

-continued

```
            130                 135                 140
Glu Thr Val Arg His Cys Lys Trp Val Asp Glu Val Val Glu Asp Ala
145                 150                 155                 160

Pro Trp Cys Val Thr Met Asp Phe Leu Glu Lys His Lys Ile Asp Tyr
                165                 170                 175

Val Ala His Asp Asp Leu Pro Tyr Ala Ser Gly Asn Asp Asp Asp Ile
            180                 185                 190

Tyr Lys Pro Ile Lys Glu Lys Gly Met Phe Leu Ala Thr Gln Arg Thr
        195                 200                 205

Glu Gly Ile Ser Thr Ser Asp Ile Ile Thr Lys Ile Ile Arg Asp Tyr
        210                 215                 220

Asp Lys Tyr Leu Met Arg Asn Phe Ala Arg Gly Ala Asn Arg Lys Asp
225                 230                 235                 240

Leu Asn Val Ser Trp Leu Lys Lys Asn Glu Leu Asp Phe Lys Arg His
                245                 250                 255

Val Ala Glu Phe Arg Asn Ser Phe Lys Arg Lys Lys Val Gly Lys Asp
                260                 265                 270

Leu Tyr Gly Glu Ile Arg Gly Leu Leu Gln Asn Val Leu Ile Trp Asn
        275                 280                 285

Gly Asp Asn Ser Gly Thr Ser Thr Pro Gln Arg Lys Thr Leu Gln Thr
        290                 295                 300

Asn Ala Lys Lys Met Tyr Met Asn Val Leu Lys Thr Leu Gln Ala Pro
305                 310                 315                 320

Asp Ala Val Asp Val Asp Ser Ser Glu Asn Val Ser Glu Asn Val Thr
                325                 330                 335

Asp Glu Glu Glu Glu Asp Asp Glu Val Asp Glu Asp Glu Glu Ala
            340                 345                 350

Asp Asp Asp Asp Glu Asp Asp Glu Asp Glu Glu Asp Asp Glu
            355                 360                 365
```

US 8,999,663 B2

METHOD FOR OBTAINING A LIPID-CONTAINING COMPOSITION FROM MICROBIAL BIOMASS

Figure 1:
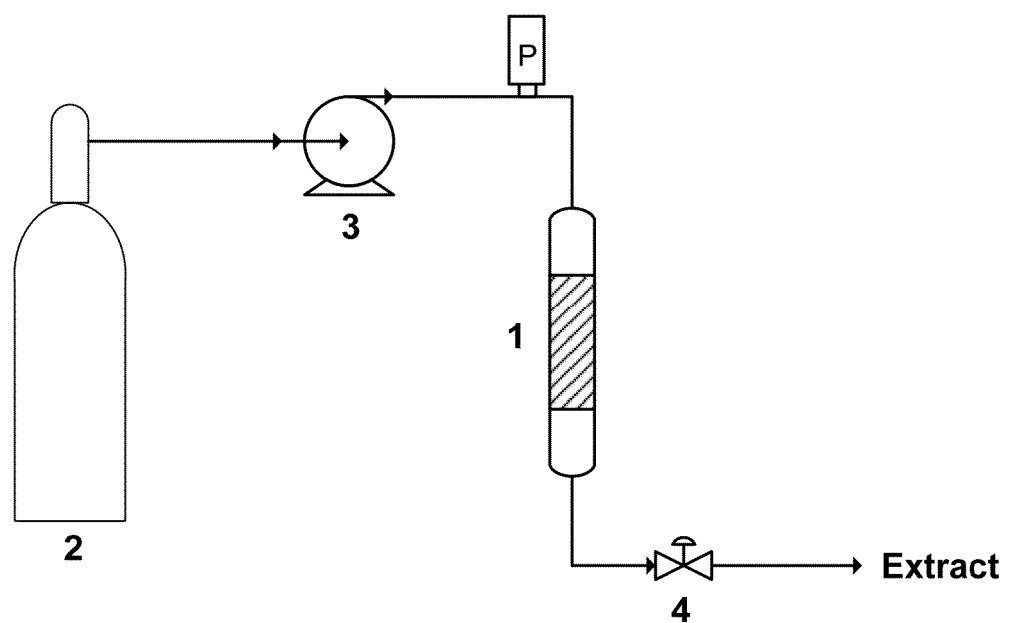

This application claims the benefit of U.S. Provisional Application No. 61/441,836, filed Feb. 11, 2011, U.S. Provisional Application No. 61/441,842, filed Feb. 11, 2011, U.S. Provisional Application No. 61/441,849, filed Feb. 11, 2011, U.S. Provisional Application No. 61/441,854, filed Feb. 11, 2011, and U.S. Provisional Application No. 61/487,019, filed May 17, 2011, which are hereby incorporated by reference in their entirety

FIELD OF THE INVENTION

The present invention relates to methods for obtaining a lipid-containing fraction from microbial biomass. In particular, methods are provided for pelletizing a microbial biomass, extracting an extracted oil from the pelletized biomass and distilling the extracted oil, at least once under short path distillation conditions, to obtain a lipid-containing fraction. This lipid-containing fraction may be further enriched.

BACKGROUND OF THE INVENTION

Microorganisms such as filamentous fungi, yeast and algae produce a variety of lipids, including fatty acyls, glycerolipids, phospholipids, sphingolipids, saccharolipids, polyketides, sterol lipids and prenol lipids. It is advantageous to extract some of these lipids from the microbial cells in which they are produced, and thus a variety of processes have been implemented.

One class of lipids commonly extracted from microbes is glycerolipids, including the fatty acid esters of glycerol ("triacylglycerols" or "TAGs"). TAGs are the primary storage unit for fatty acids, and thus may contain long chain polyunsaturated fatty acids ("PUFAs"), as well as shorter saturated and unsaturated fatty acids and longer chain saturated fatty acids. There has been growing interest in including PUFAs, such as eicosapentaenoic acid ["EPA"; omega-3] and docosahexaenoic acid ["DHA"; omega-3], in pharmaceutical and dietary products. Means to efficiently and cost-effectively extract, refine and purify lipid compositions comprising PUFAs is therefore particularly desirable.

Many typical lipid isolation procedures involve disruption of the microbial cells (e.g., via mechanical, enzymatic or chemical means), followed by oil extraction using organic or green solvents. The disruption process releases the intracellular lipids from the microbial cells, which makes it readily accessible by the solvent during extraction. After extraction, the solvent is typically removed (e.g., by evaporation, for example by application of vacuum, change of temperature or pressure, etc.).

The resulting extracted oil is enriched in lipophilic components that accumulate in the lipid bodies. In general, the major components of the lipid bodies consist of TAGs, ergosterol esters, other sterol esters, free ergosterol and phospholipids. PUFAs present in lipid bodies are mainly as components of TAGs, diacylglycerols, monoacylglycerols, phospholipids and free fatty acids. The extracted oil may then be subsequently refined, to produce a highly purified TAG fraction enriched in PUFAs. Final specifications concerning the purified TAG fraction may be application-dependent, for example, depending on whether the oil is to be used as an additive or supplement (e.g., in food compositions, infant formulas, animal feeds, etc.), in cosmetic or pharmaceutical compositions, etc. Acceptable contaminant standards are either self-imposed (wherein a particular contaminant results in an undesirable property, e.g., haziness/cloudiness, odor) or determined by external nutrition councils (e.g., A Voluntary Monograph Of The Council for Responsible Nutrition [Washington, D.C.], March 2006, specifies the maximum acid, peroxide, anisidine, TOTOX, polychlorinated dibenzo-para-dioxin and polychlorinated dibenzofuran values for omega-3 EPA, omega-3 DHA and mixtures thereof).

U.S. Pat. No. 6,727,373 discloses a microbial PUFA-containing oil with a high triglyceride content and a high oxidative stability. In addition, a method is described for the recovery of such oil from a microbial biomass derived from a pasteurized fermentation broth, wherein the microbial biomass is subjected to extrusion to form granular particles, dried, and the oil is then extracted from the dried granules using an appropriate solvent.

U.S. Pat. No. 6,258,964 discloses a method of extracting liposoluble components contained in microbial cells, wherein the method requires drying microbial cells containing liposoluble components, simultaneously disrupting and molding the dried microbial cells into pellets by use of an extruder, and extracting the contained liposoluble components by use of an organic solvent.

U.S. Pat. Appl. Pub. No. 2009/0227678 discloses a process for obtaining lipid from a composition comprising cells and water, the process comprising contacting the composition with a desiccant, and recovering the lipid from the cells.

U.S. Pat. No. 4,675,132 discloses a process for the concentration of PUFA moieties in a fish oil containing relatively low proportions of saturated and monounsaturated fatty acid moieties of the same chain length as the PUFA moieties to be concentrated, which comprises transesterifying fish oil glycerides with a lower alkanol to form a mixture of lower alkyl fatty acid esters, and extracting said esters with carbon dioxide ($CO_2$) under supercritical conditions.

A process flow diagram developed for a continuous countercurrent supercritical $CO_2$ fractionation process that produces high concentration EPA is disclosed by V. J. Krukonis et al. (*Adv. Seafood Biochem.*, Pap. Am. Chem. Soc. Annu. Meet. (1992), Meeting Date 1987, 169-179). The feedstock for the process is urea-crystallized ethyl esters of menhaden oil, and the basis for the design is a product concentration of 90% EPA (ethyl ester) at a yield of 90%.

Methods in which the distribution of TAGs, diacylglycerols, monoacylglycerols, and free fatty acids can be adjusted in a PUFA-containing lipid composition are sought. Methods for obtaining PUFA-containing lipid compositions which have improved oxidative stability are desired. Methods for obtaining PUFA-containing lipid compositions enriched in TAGs are also desired, as are economical methods for obtaining such compositions.

U.S. Pat. No. 6,166,230 (GIST-Brocades) describes a process for treating a microbial oil comprising PUFAs (e.g., from *Mortierella alpina*) with a polar solvent to extract at least one sterol (e.g., desmosterol) that is soluble in the solvent and then separating at least some of the solvent containing the sterol from the oil, wherein the oil has a sterol content of less than 1.5%.

U.S. Pat. No. 7,695,626 (Martek) describes a process for recovering neutral lipids comprising PUFAs from a microbial biomass (e.g., *Schizochytrium*), said process comprising the steps of contacting the biomass with a nonpolar solvent to recover lipid in an extraction process, refining and/or bleaching and/or deodorizing the lipid composition, adding a polar solvent to the lipid composition, cooling the mixture to selectively precipitate at least one other compound (e.g., trisaturated glycerides, phosphorus-containing materials, wax esters, saturated fatty acid containing sterol esters, sterols, squalene, hydrocarbons) and then removing this undesirable compound from the lipid composition.

Previous methods have not utilized techniques of short path distillation as an effective means to avoid exposing PUFAs, specifically highly unsaturated fatty acids, to high temperatures and remove ergosterol (ergosta-5,7,22-trien-3β-ol; CAS Registry Number 57-87-4) contaminants from microbial oils.

Inn Appl. Pub. No. WO 2011/080503 A2 discloses a chromatographic separation process for recovering a PUFA product, from a feed mixture, comprising introducing the feed mixture to a simulated or actual moving bed chromatography apparatus having a plurality of linked chromatography columns containing, as eluent, an aqueous alcohol, wherein the apparatus has a plurality of zones comprising at least a first zone and second zone, each zone having an extract stream and a raffinate stream from which liquid can be collected from said plurality of linked chromatography columns, and wherein (a) a raffinate stream containing the PUFA product together with more polar components is collected from a column in the first zone and introduced to a nonadjacent column in the second zone, and/or (b) an extract stream containing the PUFA product together with less polar components is collected from a column in the second zone and introduced to a nonadjacent column in the first zone, said PUFA product being separated from different components of the feed mixture in each zone. Various fish oil derived feedstocks were purified to produce 85 to greater than 98% EPA ethyl esters. Although Inn Appl. Pub. No. WO 2001/080503 A2 demonstrated processes to recover EPA and DHA in high purity from fish oils, the disclosure also states that suitable feed mixtures for fractionating may be obtained from "synthetic sources including oils obtained from genetically modified plants, animals and microorganisms including yeasts". Further, "genetically modified yeast is particularly suitable when the desired PUFA product is EPA".

SUMMARY OF THE INVENTION

In a first embodiment, the invention concerns a method comprising:
(a) pelletizing a microbial biomass having a moisture level and comprising oil-containing microbes;
(b) extracting the pelletized microbial biomass of step (a) to produce an extracted oil; and,
(c) distilling the extracted oil of step (b) at least once under short path distillation conditions, wherein said distillation produces a distillate fraction and a lipid-containing fraction.

In a second embodiment of the method, the oil-containing microbes are selected from the group consisting of yeast, algae, fungi, bacteria, euglenoids, stramenopiles and oomycetes. Preferably, the yeast is *Yarrowia*.

In a third embodiment of the method, the oil-containing microbes comprise at least one polyunsaturated fatty acid in the oil, wherein the polyunsaturated fatty acids are preferably selected from the group consisting of: linoleic acid, gamma-linolenic acid, eicosadienoic acid, dihomo-gamma-linolenic acid, arachidonic acid, docosatetraenoic acid, omega-6 docosapentaenoic acid, alpha-linolenic acid, stearidonic acid, eicosatrienoic acid, eicosatetraenoic acid, eicosapentaenoic acid, omega-3 docosapentaenoic acid and docosahexaenoic acid.

In a fourth embodiment of the method, the moisture level of the microbial biomass is in the range of about 1 to 10 weight percent.

In a fifth embodiment of the method, said step (a) pelletizing the microbial biomass comprises:
(1) mixing the microbial biomass and at least one grinding agent capable of absorbing oil to provide a disrupted biomass mix comprising disrupted microbial biomass;
(2) blending the disrupted biomass mix with at least one binding agent to provide a fixable mix capable of forming a solid pellet; and,
(3) forming said fixable mix into solid pellets to provide a pelletized microbial biomass.

Preferably, steps (1) mixing the microbial biomass and (2) blending at least one binding agent are performed in an extruder, are performed simultaneously, or are performed simultaneously in an extruder; and, step (3) forming said solid pellet from said fixable mix comprises a step selected from the group consisting of:
(i) extruding said fixable mix through a die to form strands;
(ii) drying and breaking said strands; and,
(iii) combinations of step (i) extruding said fixable mix through a die to form strands and step (ii) drying and breaking said strands.

In a sixth embodiment of the present method, the disrupted microbial biomass is produced in a twin screw extruder comprising: (a) a total specific energy input of about 0.04 to 0.4 KW/(kg/hr); (b) a compaction zone using bushing elements with progressively shorter pitch length; and, (c) a compression zone using flow restriction; wherein the compaction zone is prior to the compression zone within the extruder.

In a seventh embodiment of the method, the at least one grinding agent preferably has a property selected from the group consisting of:
(a) said at least one grinding agent is a particle having a Moh hardness of 2.0 to 6.0 and an oil absorption coefficient of 0.8 or higher as determined according to ASTM Method D1483-60;
(b) said at least one grinding agent is selected from the group consisting of silica and silicate; and,
(c) said at least one grinding agent is present at about 1 to 20 weight percent, based on the summation of the weights of microbial biomass, grinding agent and binding agent in the solid pellet.

The at least one binding agent preferably has a property selected from the group consisting of:
(a) said at least one binding agent is selected from water and carbohydrates selected from the group consisting of sucrose, lactose, fructose, glucose, and soluble starch; and,
(b) said at least one binding agent is present at about 0.5 to 10 weight percent, based on the summation of the weights of microbial biomass, grinding agent and binding agent in the solid pellet.

In an eighth embodiment of the method, the pellets have a property selected from the group consisting of:
(a) said pellets have an average diameter of about 0.5 to about 1.5 mm and an average length of about 2.0 to about 8.0 mm; and,
(b) said pellets comprise about 70 to about 98.5 weight percent of microbial biomass comprising oil-containing microbes, about 1 to about 20 weight percent of at least one grinding agent capable of absorbing oil and about 0.5 to 10 weight percent of at least one binding agent, based on the summation of the weights of microbial biomass, grinding agent and binding agent in the solid pellet.

In a ninth embodiment of the method, the extracting is performed with an organic solvent to produce an extracted oil and said extracted oil is degummed and optionally bleached prior to said step (c) distilling the extracted oil.

In a tenth embodiment of the method, the extracting comprises:
(1) processing the pelletized microbial biomass with a solvent comprising liquid or supercritical fluid carbon dioxide, wherein said pelletized microbial biomass comprising oil-containing microbes further comprises at least one polyunsaturated fatty acid in the oil, to obtain:
(i) an extract comprising a lipid fraction substantially free of phospholipids; and,
(ii) a residual biomass comprising phospholipids; and,
(2) fractionating the extract obtained in step (1), part (i) at least once to obtain an extracted oil having a refined lipid composition comprising at least one polyunsaturated fatty acid, wherein the refined lipid composition is enriched in triacylglycerols relative to the oil composition of pelletized microbial biomass that is not processed with a solvent.

In an eleventh embodiment of the method, the extracted oil of step (b) comprises a sterol fraction, the distillate fraction of step (c) comprises the sterol and the lipid-containing fraction of step (c) comprises a reduced amount of the sterol when compared to the amount of the sterol in the extracted oil that has not been subjected to short path distillation. The sterol fraction may comprise one or more sterols selected from the group consisting of: stigmasterol, ergosterol, brassicasterol, campesterol, β-sitosterol and desmosterol.

In a twelfth embodiment of the method, the extracted oil having a refined lipid composition comprising at least one polyunsaturated fatty acid and enriched in triacylglycerols relative to the oil composition of pelletized microbial biomass that is not processed with a solvent further comprises a sterol fraction of at least 300 mg/100 g. Upon distillation at least once under short path distillation conditions, a distillate fraction is produced comprising the sterol and a lipid-containing fraction is produced comprising triacylglycerols and a reduced amount of sterol when compared to the amount of sterol in the extracted oil having a refined lipid composition that has not been subjected to short path distillation.

In a thirteenth embodiment, the method further comprises:
(d) transesterifying the lipid-containing fraction of step (c); and,
(e) enriching the transesterified lipid-containing fraction of step (d) to obtain an oil concentrate.

In a fourteenth embodiment, the oil-containing microbes accumulate in excess of 25% of their dry cell weight as microbial oil; and, the microbial oil comprises 30 to 70 weight percent of eicosapentaenoic acid, measured as a weight percent of total fatty acids, and is substantially free of docosahexaenoic acid; and, the enriching of step (e) is by a combination of at least two processes, said first process comprising fractional distillation and said second process selected from the group consisting of: urea adduct formation, liquid chromatography, supercritical fluid chromatography, simulated moving bed chromatography, actual moving bed chromatography and combinations thereof; and, the oil concentrate is an eicosapentaenoic acid concentrate comprising at least 70 weight percent of eicosapentaenoic acid, measured as a weight percent of oil, and substantially free of docosahexaenoic acid.

Biological Deposits

The following biological materials have been deposited with the American Type Culture Collection (ATCC), 10801 University Boulevard, Manassas, Va. 20110-2209, and bear the following designations, accession numbers and dates of deposit.

| Biological Material | Accession No. | Date of Deposit |
| --- | --- | --- |
| Yarrowia lipolytica Y4128 | ATCC PTA-8614 | Aug. 23, 2007 |
| Yarrowia lipolytica Y8412 | ATCC PTA-10026 | May 14, 2009 |
| Yarrowia lipolytica Y8259 | ATCC PTA-10027 | May 14, 2009 |

The biological materials listed above were deposited under the terms of the Budapest Treaty on the International Recognition of the Deposit of Microorganisms for the Purposes of Patent Procedure. The listed deposit will be maintained in the indicated international depository for at least 30 years and will be made available to the public upon the grant of a patent disclosing it. The availability of a deposit does not constitute a license to practice the subject invention in derogation of patent rights granted by government action. *Yarrowia lipolytica* Y4305 was derived from *Y. lipolytica* Y4128, according to the methodology described in U.S. Pat. Appl. Pub. No. 2009-0093543-A1. *Y. lipolytica* Y9502 was derived from *Yarrowia lipolytica* Y8412, according to the methodology described in U.S. Pat. Appl. Pub. No. 2010-0317072-A1. Similarly, *Yarrowia lipolytica* Y8672 was derived from *Y. lipolytica* Y8259, according to the methodology described in U.S. Pat. Appl. Pub. No. 2010-0317072-A1.

BRIEF DESCRIPTION OF THE DRAWINGS AND SEQUENCE LISTING

FIG. 1 illustrates a custom high-pressure extraction apparatus flowsheet.

Figure 2:
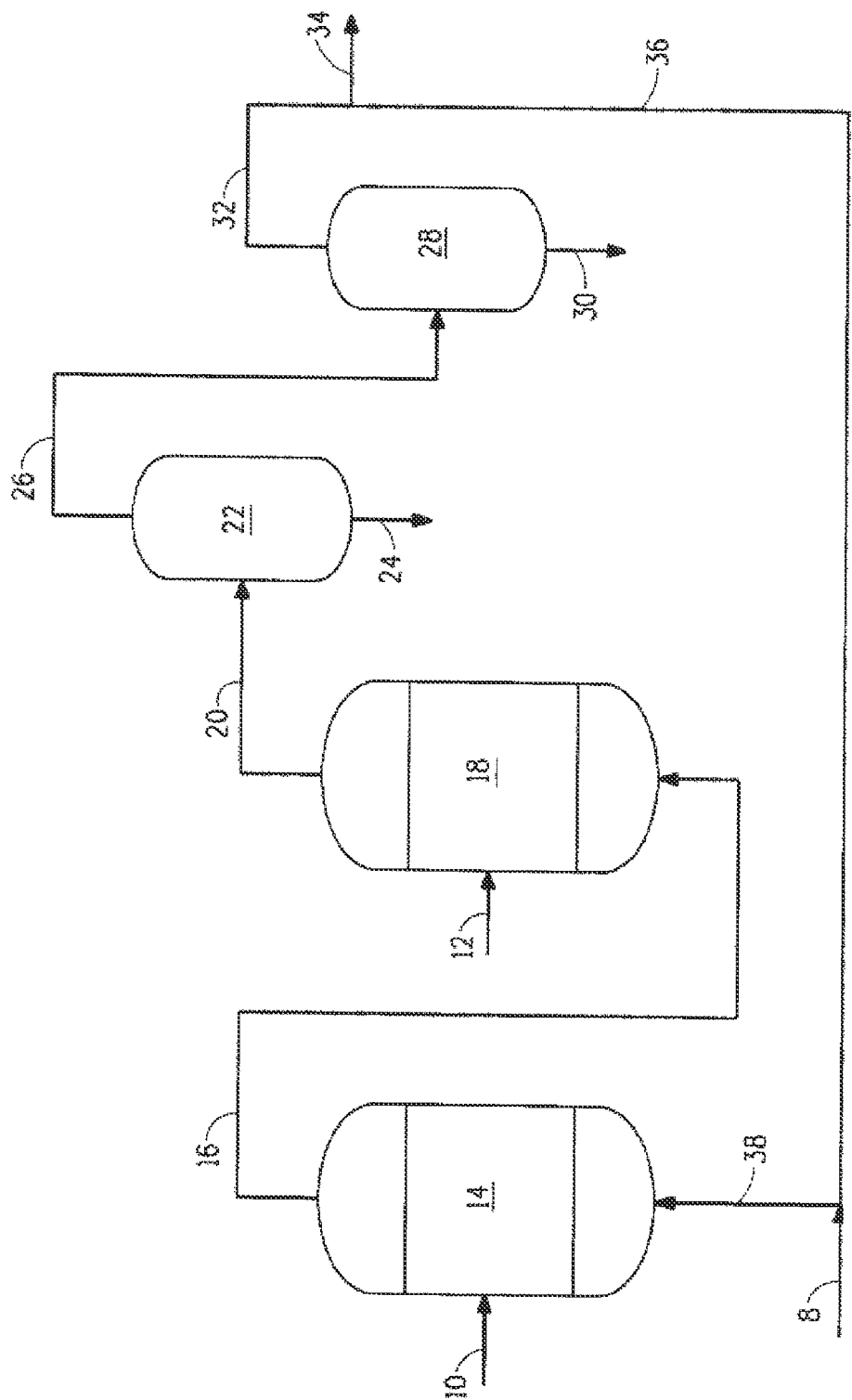

FIG. 2 schematically illustrates one embodiment of extraction in which pelletized microbial biomass is contacted with $CO_2$ to obtain an extract which is then fractionated.

Figure 3:
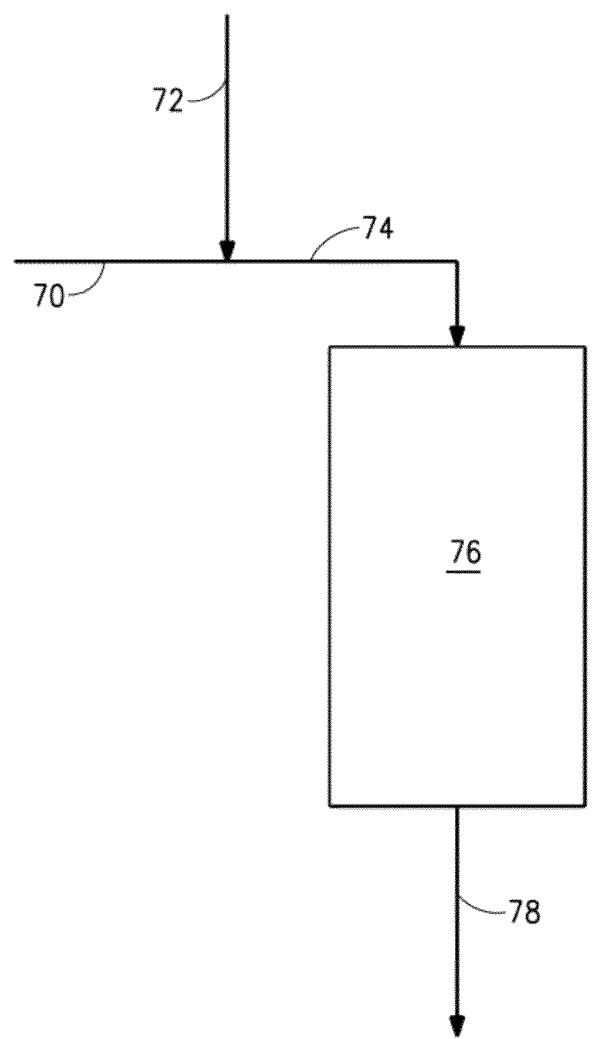

FIG. 3 schematically illustrates one embodiment of extraction, in which microbial biomass is contacted with $CO_2$ to obtain an extract.

Figure 4:
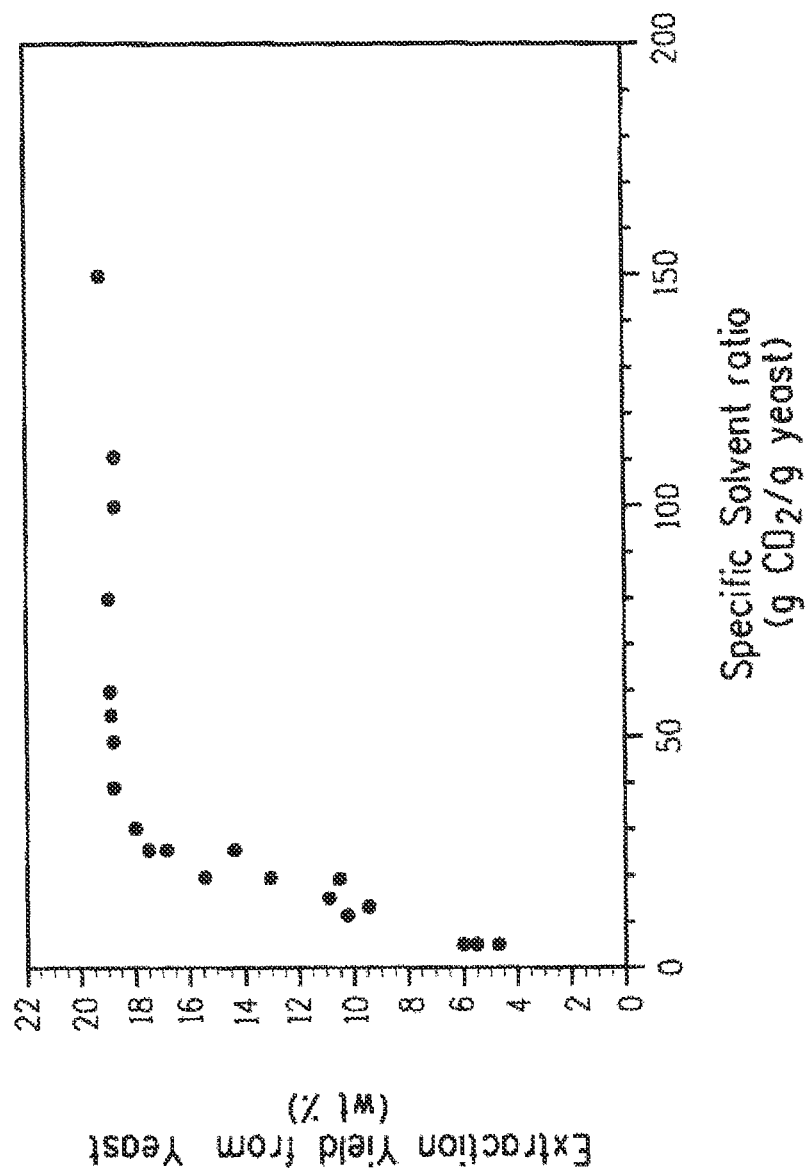

FIG. 4 is a graphical representation of the extraction curve obtained in Example 12.

Figure 5:
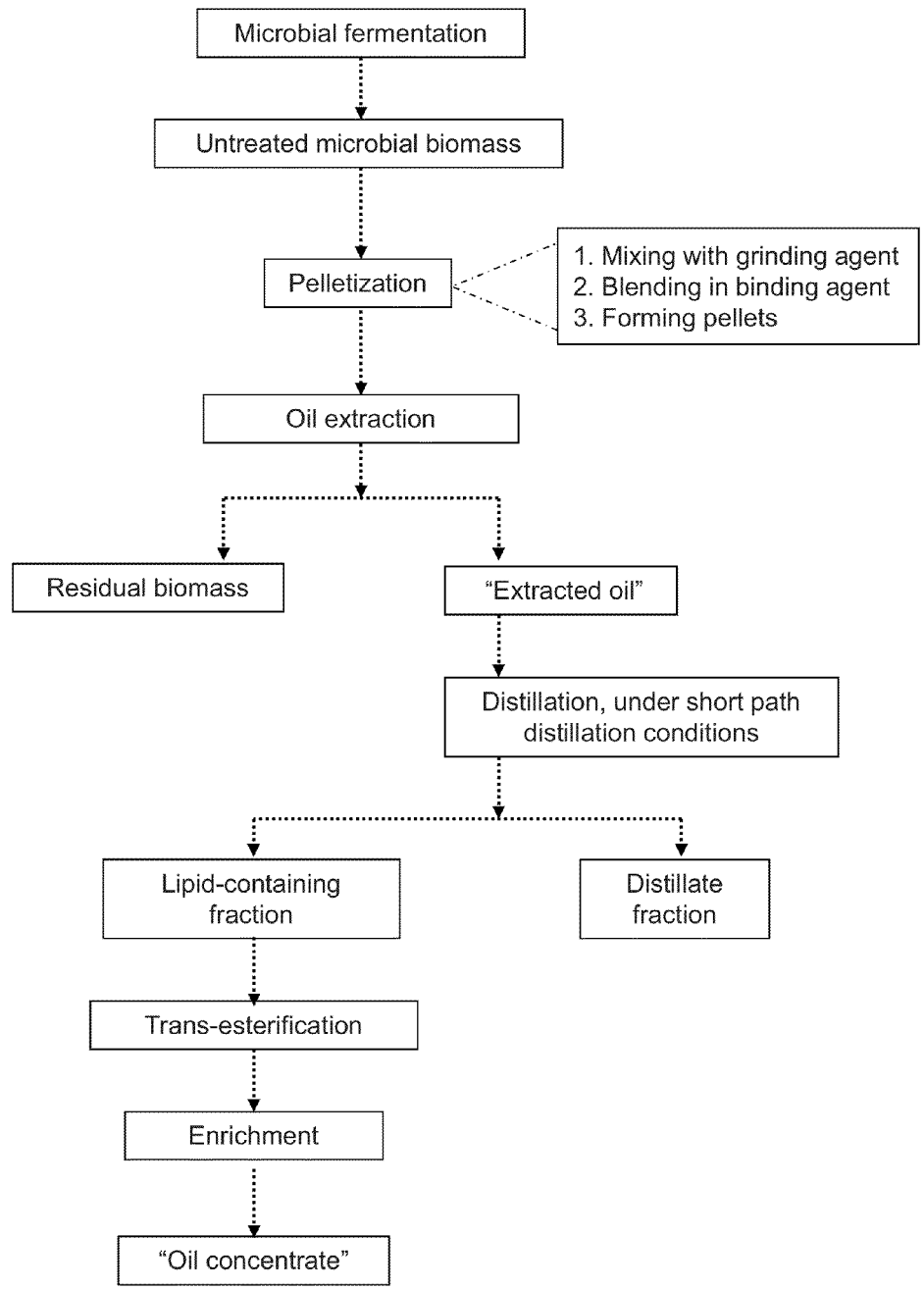

FIG. 5 provides an overview of the processes of the invention, in the form of a flowchart. Specifically, a microbial fermentation produces untreated microbial biomass, which is then pelletized. Oil extraction of the solid pellets results in residual biomass and extracted oil. Distillation of the extracted oil using short path distillation (SPD) conditions produces a distillate fraction and a lipid-containing fraction, which may optionally be further transesterified and enriched to yield an oil concentrate.

Figure 6:
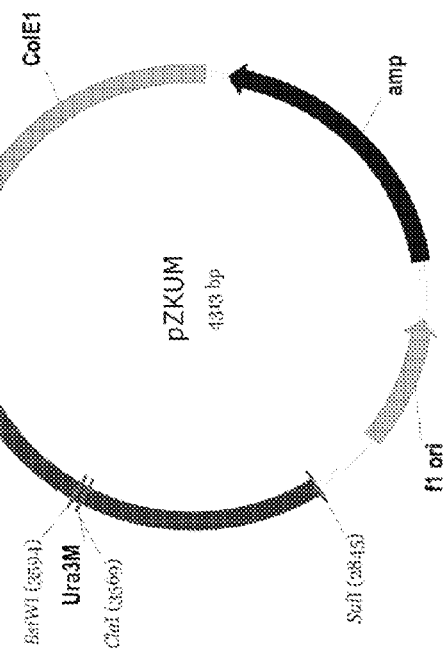
Figure 6:
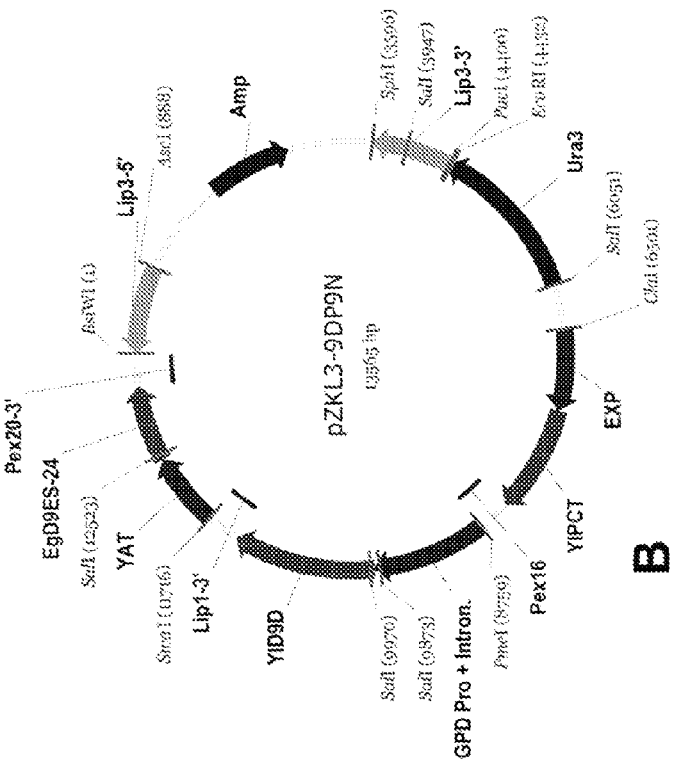

FIG. 6 provides plasmid maps for the following: (A) pZKUM; and, (B) pZKL3-9DP9N.

The following sequences comply with 37 C.F.R. §1.821-1.825 ("Requirements for Patent Applications Containing Nucleotide Sequences and/or Amino Acid Sequence Disclosures—the Sequence Rules") and are consistent with World Intellectual Property Organization (WIPO) Standard ST.25 (1998) and the sequence listing requirements of the EPO and PCT (Rules 5.2 and 49.5(a-bis), and Section 208 and Annex C of the Administrative Instructions). The symbols and format used for nucleotide and amino acid sequence data comply with the rules set forth in 37 C.F.R. §1.822.

SEQ ID Nos:1-8 are open reading frames encoding genes, proteins (or portions thereof), or plasmids, as identified in Table 1.

TABLE 1

Summary Of Nucleic Acid And Protein SEQ ID Numbers

| Description | Nucleic acid SEQ ID NO. | Protein SEQ ID NO. |
|---|---|---|
| Plasmid pZKUM | 1 (4313 bp) | — |
| Plasmid pZKL3-9DP9N | 2 (13565 bp) | — |
| Synthetic mutant delta-9 elongase, derived from *Euglena gracilis* ("EgD9Es-L35G") | 3 (777 bp) | 4 (258 AA) |
| *Yarrowia lipolytica* delta-9 desaturase gene (GenBank Accession No. XM_501496) | 5 (1449 bp) | 6 (482 AA) |
| *Yarrowia lipolytica* choline-phosphate cytidylyl-transferase gene (GenBank Accession No. XM_502978) | 7 (1101 bp) | 8 (366 AA) |

DETAILED DESCRIPTION OF THE INVENTION

The disclosures of all patent and non-patent literature cited herein are hereby incorporated by reference in their entireties.

When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

As used herein, the terms "comprises", "comprising", "includes", "including", "has", "having", "contains" or "containing", or any other variation thereof, are intended to cover a non-exclusive inclusion. For example, a composition, mixture, process, method, article, or apparatus that comprises a list of elements is not necessarily limited to only those elements but may include other elements not expressly listed or inherent to such composition, mixture, process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

Also, the indefinite articles "a" and "an" preceding an element or component of the invention are intended to be nonrestrictive regarding the number of instances (i.e., occurrences) of the element or component. Therefore, "a" or "an" should be read to include one or at least one, and the singular word form of the element or component also includes the plural unless the number is obviously meant to be singular.

As used herein the term "invention" or "present invention" is intended to refer to all aspects and embodiments of the invention as described in the claims and specification herein and should not be read so as to be limited to any particular embodiment or aspect.

The following definitions are used in this disclosure:

"Carbon dioxide" is abbreviated as "$CO_2$".

"American Type Culture Collection" is abbreviated as "ATCC".

"Polyunsaturated fatty acid(s)" is abbreviated as "PUFA(s)".

"Phospholipids" are abbreviated as "PLs".

"Triacylglycerols" are abbreviated as "TAGs".

"Free fatty acids" are abbreviated as "FFAs".

"Total fatty acids" are abbreviated as "TFAs".

"Fatty acid methyl esters" are abbreviated as "FAMEs".

"Ethyl esters" are abbreviated as "EEs".

"Dry cell weight" is abbreviated as "DCW".

"Millitorr" is abbreviated as "mTorr".

"Short path distillation" is abbreviated as "SPD".

As used herein the term "microbial biomass" refers to microbial cellular material from a microbial fermentation of oil-containing microbes, conducted to produce microbial oil. The microbial biomass may be in the form of whole cells, whole cell lysates, homogenized cells, partially hydrolyzed cellular material, and/or disrupted cells. Preferably, the microbial oil comprises at least one PUFA.

The term "untreated microbial biomass" refers to microbial biomass prior to extraction with a solvent. Optionally, untreated microbial biomass may be subjected to at least one mechanical process (e.g., by drying the biomass, disrupting the biomass, pelletizing the biomass, or a combination of these) prior to extraction with a solvent. The terms "untreated microbial biomass" and "unrefined microbial biomass" are used interchangeably herein.

The term "pelletizing" or "pelletization" refers to a process for producing a solid pellet.

The term "solid pellet" refers to a pellet having structural rigidity and resistance to changes of shape or volume. Solid pellets desirably are non-tacky at room temperature. A large plurality of the solid pellets may be packed together for many days without degradation of the pellet structure, and without binding together; thus, the large plurality desirably is a free-flowing pelletized composition. Solid pellets are formed herein from microbial biomass via a process of "pelletization" and thus may also be referred to as "pelletized microbial biomass".

The term "disrupted biomass mix" refers to the product obtained by mixing microbial biomass and at least one grinding agent. The disrupted biomass mix comprises disrupted microbial biomass.

The term "disrupted microbial biomass" refers to microbial biomass that has been subjected to a process of disruption, wherein said disruption results in a disruption efficiency of at least 50% of the microbial biomass.

The term "disruption efficiency" refers to the percent of cells walls that have been fractured or ruptured during processing, as determined qualitatively by optical visualization or as determined quantitatively according to the following formula: % disruption efficiency=(% free oil*100) divided by (% total oil), wherein % free oil and % total oil are measured for the solid pellet. Increased disruption efficiency of the microbial biomass typically leads to increased extraction yields of the microbial oil contained within the microbial biomass.

The term "percent total oil" refers to the total amount of all oil (e.g., including fatty acids from neutral lipid fractions [DAGs, MAGs, TAGs], free fatty acids, phospholipids, etc. present within cellular membranes, lipid bodies, etc.) that is present within a solid pellet sample. Percent total oil is effectively measured by converting all fatty acids within a pelletized sample that has been subjected to mechanical disruption, followed by methanolysis and methylation of acyl lipids. Thus, the sum of the fatty acids (expressed in triglyceride form) is taken to be the total oil content of the sample. In the present invention, percent total oil is preferentially determined by gently grinding a solid pellet into a fine powder using a mortar and pestle, and then weighing aliquots (in triplicate) for analysis. The fatty acids in the sample (existing primarily as triglycerides) are converted to the corresponding methyl esters by reaction with acetyl chloride/methanol at 80° C. A C15:0 internal standard is then added in known amounts to each sample for calibration purposes. Determination of the individual fatty acids is made by capillary gas chromatography with flame ionization detection (GC/FID). And, the sum of the fatty acids (expressed in triglyceride form) is taken to be the total oil content of the sample.

The term "percent free oil" refers to the amount of free and unbound oil (e.g., fatty acids expressed in triglyceride form, but not all phospholipids) that is readily available for extraction from a particular solid pellet sample. Thus, for example, an analysis of percent free oil will not include oil that is present in non-disrupted membrane-bound lipid bodies. In the present invention, percent free oil is preferentially determined by stirring a sample with n-heptane, centrifuging, and then evaporating the supernatant to dryness. The resulting residual oil is then determined gravimetrically and expressed as a weight percentage of the original sample.

The term "grinding agent" refers to an agent, capable of absorbing oil that is mixed with microbial biomass to yield disrupted biomass mix. Preferably, the at least one grinding agent is present at about 1 to 50 parts, based on 100 parts of microbial biomass. In some preferred embodiments, the grinding agent is a silica or silicate. Other preferred properties of the grinding agent are discussed infra.

The term "fixable mix" refers to the product obtained by blending at least one binding agent with disrupted biomass mix. The fixable mix is a mixture capable of forming a solid pellet upon removal of solvent (e.g., removal of water in a drying step).

The term "binding agent" refers to an agent that is blended with disrupted biomass mix to yield a fixable mix. Preferably, the at least one binding agent is present at about 0.5 to 20 parts, based on 100 parts of microbial biomass. In some preferred embodiments, the binding agent is a carbohydrate. Other preferred properties of the binding agent are discussed infra.

As used herein the term "residual biomass" refers to microbial cellular material from a microbial fermentation that is conducted to produce microbial oil, which has been extracted at least once with a solvent (e.g., an inorganic or organic solvent). When the initial microbial biomass subjected to extraction is in the form of a solid pellet, the residual biomass may be referred to as a "residual pellet".

The term "reduced" or "depleted" means having a smaller quantity, for example a quantity only slightly less than the original quantity, or for example a quantity completely lacking in the specified material, and including all quantities in between.

The term "lipids" refer to any fat-soluble (i.e., lipophilic), naturally-occurring molecule. Lipids are a diverse group of compounds that have many key biological functions, such as structural components of cell membranes, energy storage sources and intermediates in signaling pathways. Lipids may be broadly defined as hydrophobic or amphiphilic small molecules that originate entirely or in part from either ketoacyl or isoprene groups. A general overview of lipids, based on the Lipid Metabolites and Pathways Strategy (LIPID MAPS) classification system (National Institute of General Medical Sciences, Bethesda, Md.), is shown below in Table 2.

TABLE 2

Overview Of Lipid Classes

| Structural Building Block | Lipid Category | Examples Of Lipid Classes |
|---|---|---|
| Derived from condensation of ketoacyl subunits | Fatty Acyls | Includes fatty acids, eicosanoids, fatty esters and fatty amides |
| | Glycerolipids | Includes mainly mono-, di- and tri-substituted glycerols, the most well-known being the fatty acid esters of glycerol (triacylglycerols) |
| | Glycero-phospholipids or Phospho-lipids | Includes phosphatidylcholine, phosphatidylethanolamine, phosphatidylserine, phosphatidylinositols and phosphatidic acids |
| | Sphingolipids | Includes ceramides, phospho-sphingolipids (e.g., sphingomyelins), glycosphingolipids (e.g., gangliosides), sphingosine, cerebrosides |
| | Saccharolipids | Includes acylaminosugars, acylamino-sugar glycans, acyltrehaloses, acyltrehalose glycans |
| | Polyketides | Includes halogenated acetogenins, polyenes, linear tetracyclines, polyether antibiotics, flavonoids, aromatic polyketides |
| Derived from condensation of isoprene subunits | Sterol Lipids | Includes sterols (e.g., cholesterol), C18 steroids (e.g., estrogens), C19 steroids (e.g., androgens), C21 steroids (e.g., progestogens, glucocorticoids and mineralocorticoids), secosteroids, bile acids |
| | Prenol Lipids | Includes isoprenoids, carotenoids, quinones, hydroquinones, polyprenols, hopanoids |

The term "oil" refers to a lipid substance that is liquid at 25° C. and usually polyunsaturated. In oleaginous organisms, oil constitutes a major part of the total lipid. "Oil" is composed primarily of triacylglycerols (TAGs) but may also contain other neutral lipids, phospholipids (PLs) and free fatty acids (FFAs). The fatty acid composition in the oil and the fatty acid composition of the total lipid are generally similar; thus, an increase or decrease in the concentration of PUFAs in the total lipid will correspond with an increase or decrease in the concentration of PUFAs in the oil, and vice versa.

A "microbial oil" is an oil produced by a microbe. This generic term may refer to a non-concentrated microbial oil, an extracted oil, a lipid-containing fraction, a purified oil or a concentrated microbial oil, as further defined hereinbelow. After purification or enrichment of a specific fatty acid in a microbial oil, the oil can exist in various chemical forms (e.g., in the form of triacylglycerols, alkyl esters, salts or free fatty acids).

The term "extracted oil" or "crude oil" (as the terms can be used interchangeably herein) refers to an oil that has been separated from cellular materials, such as the microorganism in which the oil was synthesized. Extracted oils are obtained through a wide variety of methods, the simplest of which involves physical means alone. For example, mechanical crushing using various press configurations (e.g., screw, expeller, piston, bead beaters, etc.) can separate oil from cellular materials. Alternatively, oil extraction can occur via treatment with various organic solvents (e.g., hexane, isohexane), enzymatic extraction, osmotic shock, ultrasonic extraction, supercritical fluid extraction (e.g., $CO_2$ extraction), saponification and combinations of these methods. Often, the amount of oil that may be extracted from the microorganism is proportional to the disruption efficiency. Further purification or concentration of an extracted oil is optional.

The term "non-concentrated microbial oil" means that the extracted oil has not been substantially enriched in one or more fatty acids. Thus, the fatty acid composition of the "non-concentrated microbial oil" is substantially similar to the fatty acid composition of the microbial oil as produced by the microorganism. The non-concentrated microbial oil may be non-concentrated extracted oil or non-concentrated purified oil.

The term "extracted oil having a refined lipid composition" or "refined lipid composition" refers to a microbial oil composition that is the product of a supercritical carbon dioxide ($CO_2$) extraction as disclosed in U.S. Pat. Pub. No. 2011-0263709-A1. Thus, the refined lipid composition is an extracted oil. The refined lipid composition may comprise neutral lipids and/or FFAs while being substantially free of PLs. The refined lipid composition preferably has less than 30 ppm phosphorous, and more preferably less than 20 ppm phosphorous, as determined by the American Oil Chemists' Society (AOCS) Official Method Ca 20-99 entitled "Analysis for Phosphorus in Oil by Inductively Coupled Plasma Optical Emission Spectroscopy" (*Official Methods and Recommended Practices of the AOCS*, $6^{th}$ ed., Urbana, Ill., AOCS, 2009, incorporated herein by reference). The refined lipid composition may be enriched in TAGs relative to the oil composition of the microbial biomass and may optionally comprise a sterol fraction. The refined lipid composition may undergo further purification, such as via short path distillation as described herein, to produce a "purified oil" or "lipid-containing fraction".

The term "degumming" refers to a process that reduces the concentration of phospholipids and other impurities from an extracted oil.

The term "bleaching" refers to a process that reduces the concentration of pigments/color compounds and residual metals from an extracted oil.

The term "sterols" or "sterol fraction" refers to biological components that affect membrane permeability within cells. Sterols have been isolated from all major groups of living organisms, although there is diversity in the predominant sterol isolated. The predominant sterol in higher animals is cholesterol, while β-sitosterol is commonly the predominant sterol in higher plants (although it is frequently accompanied by campesterol and stigmasterol). Generalization concerning the predominant sterol(s) found in microbes is more difficult, as the composition depends on the particular microbial species. For example, the oleaginous yeast *Yarrowia lipolytica* predominantly comprises ergosterol, fungi of the genus *Mortierella* predominantly comprise cholesterol and desmosterol, and stramenopiles of the genus *Schizochytrium* predominantly comprise brassicasterol and stigmasterol. A summary of sterols often found in sterol-containing microbial oils is shown below in Table 3; in contrast, these sterols are not typically found in fish oils. When present in microbial oils, the sterols of Table 3 tend to precipitate out of the extracted oil due to high melting points and reduced solubility at lower storage temperatures, which result in a cloudy oil. It is highly desirable to minimize undesirable cloudiness in the extracted oil or oil products therefrom by reducing the concentration of these sterols.

TABLE 3

Sterols In Sterol-Containing Microbial Oils

| Common Name | Chemical Name | CAS Registry No. |
|---|---|---|
| Stigmasterol | Stigmasta-5,22-dien-3-ol | 83-48-7 |
| Ergosterol | Ergosta-5,7,22-trien-3β-ol | 474-67-9 |
| Brassicasterol | Ergosta-5,22-dien-3β-ol | 57-87-4 |
| Campesterol | (24R)-Ergost-5-en-3β-ol | 474-62-4 |
| β-Sitosterol | Stigmast-5-en-3-ol, | 83-46-5 |
| Desmosterol | Cholesta-5,24-dien-3β-ol | 313-04-2 |

The term "distilling" refers to a method of separating mixtures based on differences in their volatilities in a boiling liquid mixture. Distillation is a unit operation, or a physical separation process, and not a chemical reaction.

The term "short path distillation" ("SPD") refers to a separation method operating under an extremely high vacuum, in which the SPD device is equipped with an internal condenser in close proximity to the evaporator, such that volatile compounds from the material to be distilled after evaporation travel only a short distance to the condensing surface. As a result, there is minimal thermal degradation from this separation method.

The term "purified oil" refers to an extracted oil having reduced concentrations of impurities, such as phospholipids, trace metals, free fatty acids, color compounds, minor oxidation products, volatile and/or odorous compounds, and sterols (e.g., ergosterol, brassicasterol, stigmasterol, cholesterol), as compared to the concentrations of impurities in the extracted oil. Purification processes do not typically concentrate or enrich the microbial oil, such that a particular fatty acid(s) is substantially enriched, and thus purified oil is most often non-concentrated.

The terms "lipid-containing fraction" and "SPD-purified oil" are used interchangeably herein. These terms refer to an extracted microbial oil containing a TAG-fraction comprising one or more PUFAs, said oil having undergone a process of distillation at least once under SPD conditions. If a sterol fraction is present in the extracted oil, the distillation process reduces the amount of sterol in the lipid-containing fraction, as compared to the sterol content in the oil prior to short path distillation.

Although SPD can concentrate ethyl esters, methyl esters and free fatty acids, the process does not typically concentrate TAGs (e.g., unless operated at extremely high temperatures which then leads to decomposition of TAGs). Since the majority of PUFAs in the lipid-containing fraction are in the form of TAGs, and the SPD process does not typically concentrate TAGs such that a particular fatty acid(s) is substantially enriched, the lipid-containing fraction is considered to be non-concentrated most often for the purposes described herein.

The term "transesterification" refers to a chemical reaction, catalyzed by an acid or base catalyst, in which an ester of a fatty acid is converted to a different ester of the fatty acid.

"Fatty acid ethyl esters" ["FAEEs"] refer to a chemical form of lipids that are generally synthetically derived by reacting free fatty acids or their derivatives with ethanol, in a process of esterification or transesterification.

The term "enrichment" refers to a process to increase the concentration of one or more fatty acids in a microbial oil, relative to the concentration of the one or more fatty acids in the non-concentrated microbial oil. For example, as discussed herein, a microbial oil comprising 30 to 70 wt % of a desired PUFA, measured as a wt % of TFAs, is enriched or concentrated to produce an "oil concentrate".

The term "oil concentrate" refers to an oil comprising at least 70 wt % of a desired PUFA, measured as a wt % of oil. Preferably, the oil concentrate is obtained from a microbial oil comprising 30 to 70 wt % of the desired PUFA, measured as a wt % of total fatty acids, wherein said microbial oil is obtained from an oil-containing microbe that accumulates in excess of 25% of its dry cell weight as oil, as will be elaborated hereinbelow. Specifically, the ethyl or other esters of the microbial oil can be enriched in the desired PUFA and separated by methods commonly used in the art.

The term "eicosapentaenoic acid concentrate" or "EPA concentrate" is an oil concentrate and refers to an omega-3 oil comprising at least 70 wt % of EPA, measured as a wt % of oil, and substantially free of DHA. The EPA concentrate is obtained from a microbial oil comprising 30 to 70 wt % of EPA, measured as a wt % of total fatty acids, and substantially free of DHA, wherein said microbial oil is obtained from an oil-containing microbe that accumulates in excess of 25% of its dry cell weight as oil. The at least 70 wt % of EPA will be in the form of free fatty acids, triglycerides (e.g., TAGs), esters, and combinations thereof. The esters are most preferably in the form of ethyl esters.

"Neutral lipids" refer to those lipids commonly found in cells in lipid bodies as storage fats and are so called because at cellular pH, the lipids bear no charged groups. Generally, they are completely non-polar with no affinity for water. Neutral lipids generally refer to mono-, di-, and/or triesters of glycerol with fatty acids, also called monoacylglycerol (MAG), diacylglycerol (DAG) or triacylglycerol (TAG), respectively, or collectively, acylglycerols. A hydrolysis reaction must occur to release FFAs from acylglycerols.

The term "triacylglycerols" is synonymous with the term "triacylglycerides" and refers to neutral lipids composed of three fatty acyl residues esterified to a glycerol molecule. TAGs can contain long chain PUFAs and saturated fatty acids, as well as shorter chain saturated and unsaturated fatty acids. In living organisms, TAGs are the primary storage units for fatty acids since the glycerol backbone helps to stabilize PUFA molecules for storage or during transport. In contrast, free fatty acids are rapidly oxidized.

The term "total fatty acids" (TFAs) herein refer to the sum of all cellular fatty acids that can be derivatized to fatty acid methyl esters (FAMEs) by the base transesterification method (as known in the art) in a given sample, which may be the biomass or oil, for example. Thus, total fatty acids include fatty acids from neutral lipid fractions (including DAGs, MAGs and TAGs) and from polar lipid fractions (including the phosphatidylcholine and the phosphatidylethanolamine fractions) but not FFAs.

The term "total lipid content" of cells is a measure of TFAs as a percent of the dry cell weight (DCW), although total lipid content can be approximated as a measure of FAMEs as a percent of the DCW (FAMEs % DCW). Thus, total lipid content (TFAs % DCW) is equivalent to, e.g., milligrams of total fatty acids per 100 milligrams of DCW.

The concentration of a fatty acid in the total lipid is expressed herein as a weight percent of TFAs (% TFAs), e.g., milligrams of the given fatty acid per 100 milligrams of TFAs. Unless otherwise specifically stated in the disclosure herein, reference to the percent of a given fatty acid with respect to total lipids in microbial cells and in microbial oil is equivalent to concentration of the fatty acid as % TFAs (e.g., % EPA of total lipids is equivalent to EPA TFAs).

The concentration of a fatty acid ester (and/or fatty acid and/or triglyceride, respectively) in an oil concentrate is expressed as a weight percent of oil ["% oil"], e.g. milligrams of the given fatty acid ester (and/or fatty acid and/or triglyceride, respectively) per 100 milligrams of oil concentrate. This unit of measurement is used to describe the concentration of e.g., EPA in an EPA concentrate.

In some cases, it is useful to express the content of a given fatty acid(s) in a cell as its weight percent of the dry cell weight (% DCW). Thus, for example, eicosapentaenoic acid % DCW would be determined according to the following formula: (eicosapentaenoic acid % TFAs)*(TFAs DCW)]/100. The content of a given fatty acid(s) in a cell as its weight percent of the dry cell weight (% DCW) can be approximated, however, as: (eicosapentaenoic acid % TFAs)*(FAMEs % DCW)]/100.

The terms "lipid profile" and "lipid composition" are interchangeable and refer to the amount of individual fatty acids contained in a particular lipid fraction, such as in the total lipid or the oil, wherein the amount is expressed as a weight percent of TFAs. The sum of the individual fatty acids present in the mixture should be 100.

The term "fatty acids" refers to long chain aliphatic acids (alkanoic acids) of varying chain lengths, from about $C_{12}$ to $C_{22}$, although both longer and shorter chain-length acids are known. The predominant chain lengths are between $C_{16}$ and $C_{22}$. The structure of a fatty acid is represented by a simple notation system of "X:Y", where X is the total number of carbon ["C"] atoms in the particular fatty acid and Y is the number of double bonds. Additional details concerning the differentiation between "saturated fatty acids" versus "unsaturated fatty acids", "monounsaturated fatty acids" versus "polyunsaturated fatty acids" (PUFAs), and "omega-6 fatty acids" ("ω-6" or "n-6") versus "omega-3 fatty acids" ("ω-3" or "n-3") are provided in U.S. Pat. No. 7,238,482, which is hereby incorporated herein by reference.

Nomenclature used to describe PUFAs herein is given in Table 4. In the column titled "Shorthand Notation", the omega-reference system is used to indicate the number of carbons, the number of double bonds and the position of the double bond closest to the omega carbon, counting from the omega carbon, which is numbered 1 for this purpose. The remainder of the Table summarizes the common names of omega-3 and omega-6 fatty acids and their precursors, the abbreviations that will be used throughout the specification and the chemical name of each compound.

TABLE 4

Nomenclature of Polyunsaturated Fatty Acids and Precursors

| Common Name | Abbreviation | Chemical Name | Shorthand Notation |
| --- | --- | --- | --- |
| Myristic | — | tetradecanoic | 14:0 |
| Palmitic | Palmitate | hexadecanoic | 16:0 |
| Palmitoleic | — | 9-hexadecenoic | 16:1 |
| Stearic | — | octadecanoic | 18:0 |
| Oleic | — | cis-9-octadecenoic | 18:1 |
| Linoleic | LA | cis-9,12-octadecadienoic | 18:2 omega-6 |
| Gamma-Linolenic | GLA | cis-6,9,12-octadecatrienoic | 18:3 omega-6 |
| Eicosadienoic | EDA | cis-11,14-eicosadienoic | 20:2 omega-6 |
| Dihomo-Gamma-Linolenic | DGLA | cis-8,11,14-eicosatrienoic | 20:3 omega-6 |
| Arachidonic | ARA | cis-5,8,11,14-eicosatetraenoic | 20:4 omega-6 |
| Alpha-Linolenic | ALA | cis-9,12,15-octadecatrienoic | 18:3 omega-3 |
| Stearidonic | STA | cis-6,9,12,15-octadecatetraenoic | 18:4 omega-3 |

TABLE 4-continued

Nomenclature of Polyunsaturated Fatty Acids and Precursors

| Common Name | Abbreviation | Chemical Name | Shorthand Notation |
|---|---|---|---|
| Nonadeca-pentaenoic | NDPA | cis-5,8,11,14,17-nonadecapentaenoic | 19:5 omega-2 |
| Eicosa-trienoic | ETrA | cis-11,14,17-eicosatrienoic | 20:3 omega-3 |
| Eicosa-tetraenoic | ETA | cis-8,11,14,17-eicosatetraenoic | 20:4 omega-3 |
| Eicosa-pentaenoic | EPA | cis-5,8,11,14,17-eicosapentaenoic | 20:5 omega-3 |
| Heneicosa-pentaenoic | HPA | cis-6,9,12,15,18-heneicosapentaenoic | 21:5 omega-3 |
| Docosa-tetraenoic | DTA | cis-7,10,13,16-docosatetraenoic | 22:4 omega-3 |
| Docosa-pentaenoic | DPAn-6 | cis-4,7,10,13,16-docosapentaenoic | 22:5 omega-6 |
| Docosa-pentaenoic | DPAn-3 | cis-7,10,13,16,19-docosapentaenoic | 22:5 omega-3 |
| Docosa-hexaenoic | DHA | cis-4,7,10,13,16,19-docosahexaenoic | 22:6 omega-3 |

The terms EPA, DHA, NDPA and HPA, respectively, as used in the present disclosure, will refer to the respective acid or derivatives of the acid (e.g., glycerides, esters, phospholipids, amides, lactones, salts or the like), unless specifically mentioned otherwise. For example, "EPA-EE" will specifically refer to EPA ethyl ester.

NDPA and HPA are commonly found in fish oils. Concentrated EPA produced from fish oils will often contain these fatty acids as impurities in the final EPA composition (see, e.g., U.S. Pat. Appl. Pub. No. 2010-0278879 and Intl. Appl. Pub. No. WO 2010/147994 A1).

The term "substantially free of DHA" means comprising no more than about 0.05 weight percent of DHA. Thus, an EPA concentrate is substantially free of DHA when the concentration of DHA (in the form of free fatty acids, triacylglycerols, esters, and combinations thereof) is no more than about 0.05 wt % of DHA, measured as a wt % of the oil. Similarly, a microbial oil is substantially free of DHA (in the form of free fatty acids, triacylglycerols, esters, and combinations thereof) when the concentration of DHA is no more than about 0.05 wt % of DHA, measured as a wt % of TFAs.

The terms "substantially free of NDPA" and "substantially free of HPA" are comparable to the definition provided above for the term "substantially free of DHA", although the fatty acid NDPA or HPA, respectively, is substituted for DHA.

The term "high-level PUFA production" refers to production of at least about 25% PUFAs in the total lipids of the microbial host, preferably at least about 30% PUFAs in the total lipids, more preferably at least about 35% PUFAs in the total lipids, more preferably at least about 40% PUFAs in the total lipids, more preferably at least about 40-45% PUFAs in the total lipids, more preferably at least about 45-50% PUFAs in the total lipids, more preferably at least about 50-60% PUFAs, and most preferably at least about 60-70% PUFAs in the total lipids. The structural form of the PUFA is not limiting; thus, for example, the PUFAs may exist in the total lipids as FFAs or in esterified forms such as acylglycerols, phospholipids, sulfolipids or glycolipids.

The term "oil-containing microbe" refers to a microorganism capable of producing a microbial oil. Thus, an oil-containing microbe may be yeast, algae, euglenoids, stramenopiles, fungi, or combinations thereof. In preferred embodiments, the oil-containing microbe is oleaginous.

The term "oleaginous" refers to those organisms that tend to store their energy source in the form of oil (Weete, In: Fungal Lipid Biochemistry, 2nd Ed., Plenum, 1980). Generally, the cellular oil of oleaginous microorganisms follows a sigmoid curve, wherein the concentration of lipid increases until it reaches a maximum at the late logarithmic or early stationary growth phase and then gradually decreases during the late stationary and death phases (Yongmanitchai and Ward, *Appl. Environ. Microbiol.*, 57:419-25 (1991)). It is not uncommon for oleaginous microorganisms to accumulate in excess of about 25% of their dry cell weight as oil.

Examples of oleaginous organisms include, but are not limited to organisms from a genus selected from the group consisting of *Mortierella*, *Thraustochytrium*, *Schizochytrium*, *Yarrowia*, *Candida*, *Rhodotorula*, *Rhodosporidium*, *Cryptococcus*, *Trichosporon*, and *Lipomyces*.

The term "oleaginous yeast" refers to those oleaginous microorganisms classified as yeasts that can make oil. Examples of oleaginous yeast include, but are by no means limited to, the following genera: *Yarrowia, Candida, Rhodotorula, Rhodosporidium, Cryptococcus, Trichosporon* and *Lipomyces*.

The term "pharmaceutical" as used herein means a compound or substance which, if sold in the United States, would be controlled by Section 503 or 505 of the Federal Food, Drug and Cosmetic Act.

The term "substantially free of environmental pollutants" means the oil concentrate or EPA concentrate, respectively, comprises either no environmental pollutants or at most only a trace of environmental pollutants, wherein these include compounds such as polychlorinated biphenyls ["PCBs"] (CAS No. 1336-36-3), dioxins, brominated flame retardants and pesticides (e.g., toxaphenes and dichlorodiphenyltrichloroethane ["DDT"] and its metabolites).

In general, lipid accumulation in oleaginous microorganisms is triggered in response to the overall carbon to nitrogen ratio present in the growth medium. This process, leading to the de novo synthesis of free palmitate (16:0) in oleaginous microorganisms, is described in detail in U.S. Pat. No. 7,238,482. Palmitate is the precursor of longer-chain saturated and unsaturated fatty acid derivates, which are formed through the action of elongases and desaturases.

A wide spectrum of fatty acids (including saturated and unsaturated fatty acids and short-chain and long-chain fatty acids) can be incorporated into TAGs, the primary storage unit for fatty acids. In the oil-containing microbes described herein, incorporation of long chain PUFAs into TAGs is most desirable, although the structural form of the PUFA is not limiting (thus, for example, EPA may exist in the total lipids as FFAs or in esterified forms such as acylglycerols, phospholipids, sulfolipids or glycolipids). More specifically, in one embodiment the oil-containing microbes will produce the at least one PUFA selected from the group consisting of LA, GLA, EDA, DGLA, ARA, DTA, DPAn-6, ALA, STA, ETrA, ETA, EPA, DPAn-3, DHA and mixtures thereof. More preferably, the at least one PUFA has at least a $C_{20}$ chain length, such as PUFAs selected from the group consisting of EDA, DGLA, ARA, DTA, DPAn-6, ETrA, ETA, EPA, DPAn-3, DHA, and mixtures thereof.

In one embodiment, the at least one PUFA is selected from the group consisting of ARA, EPA, DPAn-6, DPAn-3, DHA and mixtures thereof. In another preferred embodiment, the at least one PUFA is selected from the group consisting of EPA fand DHA.

Most PUFAs are incorporated into TAGs as neutral lipids and are stored in lipid bodies. However, it is important to note that a measurement of the total PUFAs within an oleaginous organism should minimally include those PUFAs that are located in the phosphatidylcholine, phosphatidylethanolamine and TAG fractions.

The present invention relates to a method comprising:
(a) pelletizing a microbial biomass having a moisture level and comprising oil-containing microbes;
(b) extracting the pelletized microbial biomass of step (a) to produce an extracted oil; and,
(c) distilling the extracted oil of step (b) at least once under short path distillation conditions, wherein said distillation produces a distillate fraction and a lipid-containing fraction.

In another embodiment, the method set forth above may further comprise the following steps:
(d) transesterifying the lipid-containing fraction of step (c); and,
(e) enriching the transesterified lipid-containing fraction of step (d) to obtain an oil concentrate.

Although the present invention is drawn to a process to obtain a lipid-containing fraction or oil concentrate from pelletized microbial biomass, the related processes that may be useful to obtain the oil-containing microbes themselves are also set forth in the schematic diagram of FIG. 5. Each of the aspects of FIG. 5 will be discussed in further detail below, with bold text herein referring to specific portions of FIG. 5.

Oil-containing microbes produce microbial biomass as the microbes grow and multiply, typically via microbial fermentation. The microbial biomass may be from any microorganism, whether naturally occurring or recombinant ("genetically engineered"), capable of producing a microbial oil. Thus, for example, oil-containing microbes may be selected from the group consisting of yeast, algae, euglenoids, stramenopiles, fungi, and mixtures thereof. Preferably, the microorganism will be capable of high level PUFA production within the microbial oil.

As an example, commercial sources of ARA oil are typically produced from microorganisms in the genera *Mortierella* (filamentous fungus), *Entomophthora, Pythium* and *Porphyridium* (red alga). Most notably, Martek Biosciences Corporation (Columbia, Md.) produces an ARA-containing fungal oil (ARASCO®; U.S. Pat. No. 5,658,767) which is substantially free of EPA and which is derived from either *Mortierella alpina* or *Pythium insidiuosum*.

Similarly, EPA can be produced microbially via numerous different processes based on the natural abilities of the specific microbial organism utilized [e.g., heterotrophic diatoms *Cyclotella* sp. and *Nitzschia* sp. (U.S. Pat. No. 5,244,921); *Pseudomonas, Alteromonas* or *Shewanella* species (U.S. Pat. No. 5,246,841); filamentous fungi of the genus *Pythium* (U.S. Pat. No. 5,246,842); *Mortierella elongata, M. exigua*, or *M. hygrophila* (U.S. Pat. No. 5,401,646); and eustigmatophycean alga of the genus *Nannochloropsis* (Krienitz, L. and M. Wirth, *Limnologica,* 36:204-210 (2006))].

DHA can also be produced using processes based on the natural abilities of native microbes. See, e.g., processes developed for *Schizochytrium* species (U.S. Pat. No. 5,340,742; U.S. Pat. No. 6,582,941); *Ulkenia* (U.S. Pat. No. 6,509,178); *Pseudomonas* sp. YS-180 (U.S. Pat. No. 6,207,441); *Thraustochytrium* genus strain LFF1 (U.S. 2004/0161831 A1); *Crypthecodinium cohnii* (U.S. Pat. Appl. Pub. No. 2004/0072330 A1; de Swaaf, M. E. et al., *Biotechnol. Bioeng.,* 81(6):666-672 (2003) and *Appl. Microbiol. Biotechnol.,* 61(1):40-43 (2003)); *Emiliania* sp. (Japanese Patent Publication (Kokai) No. 5-308978 (1993)); and *Japonochytrium* sp. (ATCC #28207; Japanese Patent Publication (Kokai) No. 199588/1989)]. Additionally, the following microorganisms are known to have the ability to produce DHA: *Vibrio marinus* (a bacterium isolated from the deep sea; ATCC #15381); the micro-algae *Cyclotella cryptica* and *Isochrysis galbana*; and, flagellate fungi such as *Thraustochytrium aureum* (ATCC #34304; Kendrick, *Lipids,* 27:15 (1992)) and the *Thraustochytrium* sp. designated as ATCC #28211, ATCC #20890 and ATCC #20891. Currently, there are at least three different fermentation processes for commercial production of DHA: fermentation of C. cohnii for production of DHASCO™ (Martek Biosciences Corporation, Columbia, Md.); fermentation of *Schizochytrium* sp. for production of an oil formerly known as DHAGold (Martek Biosciences Corporation); and fermentation of *Ulkenia* sp. for production of DHActive™ (Nutrinova, Frankfurt, Germany).

Microbial production of PUFAs in microbial oils using recombinant means is expected to have several advantages over production from natural microbial sources. For example, recombinant microbes having preferred characteristics for oil production can be used, since the naturally occurring microbial fatty acid profile of the host can be altered by the introduction of new biosynthetic pathways in the host and/or by the suppression of undesired pathways, thereby resulting in increased levels of production of desired PUFAs (or conjugated forms thereof) and decreased production of undesired PUFAs. Secondly, recombinant microbes can provide PUFAs in particular forms which may have specific uses. Additionally, microbial oil production can be manipulated by controlling culture conditions, notably by providing particular substrate sources for microbially expressed enzymes, or by addition of compounds/genetic engineering to suppress undesired biochemical pathways. Thus, for example, it is possible to modify the ratio of omega-3 to omega-6 fatty acids so produced, or engineer production of a specific PUFA (e.g., EPA) without significant accumulation of other PUFA downstream or upstream products.

Thus, for example, a microbe lacking the natural ability to make EPA can be engineered to express a PUFA biosynthetic pathway by introduction of appropriate PUFA biosynthetic pathway genes, such as specific combinations of delta-4 desaturases, delta-5 desaturases, delta-6 desaturases, delta-12 desaturases, delta-15 desaturases, delta-17 desaturases, delta-9 desaturases, delta-8 desaturases, delta-9 elongases, $C_{14/16}$ elongases, $C_{16/18}$ elongases, $C_{18/20}$ elongases and $C_{20/22}$ elongases, although it is to be recognized that the specific enzymes (and genes encoding those enzymes) introduced are by no means limiting to the invention herein.

As an example, several yeast organisms have been recombinantly engineered to produce at least one PUFA. See for example, work in *Saccharomyces cerevisiae* (Dyer, J. M. et al., *Appl. Eniv. Microbiol.,* 59:224-230 (2002); Domergue, F. et al., *Eur. J. Biochem.,* 269:4105-4113 (2002); U.S. Pat. No. 6,136,574; U.S. Pat. Appl. Pub. No. 2006-0051847-A1) and the oleaginous yeast, *Yarrowia lipolytica* (U.S. Pat. No. 7,238,482; U.S. Pat. No. 7,465,564; U.S. Pat. No. 7,588,931; U.S. Pat. No. 7,932,077; U.S. Pat. No. 7,550,286; U.S. Pat. Appl. Pub. No. 2009-0093543-A1; U.S. Pat. Appl. Pub. No. 2010-0317072-A1).

In some embodiments, advantages are perceived if the microbial host cells are oleaginous. Oleaginous yeast are naturally capable of oil synthesis and accumulation, wherein the total oil content can comprise greater than about 25% of the cellular dry weight, more preferably greater than about 30% of the cellular dry weight, and most preferably greater than about 40% of the cellular dry weight. In alternate embodiments, a non-oleaginous yeast can be genetically modified to become oleaginous such that it can produce more than 25% oil of the cellular dry weight, e.g., yeast such as *Saccharomyces cerevisiae* (Intl Appl. Pub. No. WO 2006/102342).

Genera typically identified as oleaginous yeast include, but are not limited to: *Yarrowia, Candida, Rhodotorula, Rhodosporidium, Cryptococcus, Trichosporon* and *Lipomyces*. More specifically, illustrative oil-synthesizing yeasts include: *Rhodosporidium toruloides, Lipomyces starkeyii, L. lipoferus, Candida* revkaufi, *C. pulcherrima, C. tropicalis, C. utilis, Trichosporon pullans, T. cutaneum, Rhodotorula glutinus, R. graminis*, and *Yarrowia lipolytica* (formerly classified as *Candida* lipolytica).

Most preferred is the oleaginous yeast *Yarrowia lipolytica*; and, in a further embodiment, most preferred are the *Y. lipolytica* strains designated as ATCC #20362, ATCC #8862, ATCC #18944, ATCC #76982 and/or LGAM S(7)1 (Papanikolaou S., and Aggelis G., *Bioresour. Technol.*, 82(1):43-49 (2002)).

In some embodiments, it may be desirable for the oleaginous yeast to be capable of "high-level PUFA production", wherein the organism can produce at least about 5-10% of the desired PUFA (i.e., LA, ALA, EDA, GLA, STA, ETrA, DGLA, ETA, ARA, DPA n-6, EPA, DPA n-3 and/or DHA) in the total lipids. More preferably, the oleaginous yeast will produce at least about 10-70% of the desired PUFA(s) in the total lipids. Although the structural form of the PUFA is not limiting, preferably, TAGs comprise the PUFA(s).

Thus, the PUFA biosynthetic pathway genes and gene products described herein may be produced in wildtype microbial host cells or heterologous microbial host cells, particularly in the cells of oleaginous yeasts (e.g., *Yarrowia lipolytica*). Expression in recombinant microbial hosts may be useful for the production of various PUFA pathway intermediates, or for the modulation of PUFA pathways already existing in the host for the synthesis of new products heretofore not possible using the host.

Although numerous oleaginous yeast could be engineered for production of preferred omega-3/omega-6 PUFAs based on the cited teachings provided above, representative PUFA-producing strains of the oleaginous yeast *Yarrowia lipolytica* are described in Table 5. These strains possess various combinations of the following PUFA biosynthetic pathway genes: delta-4 desaturases, delta-5 desaturases, delta-6 desaturases, delta-12 desaturases, delta-15 desaturases, delta-17 desaturases, delta-9 desaturases, delta-8 desaturases, delta-9 elongases, $C_{14/16}$ elongases, $C_{16/18}$ elongases, $C_{18/20}$ elongases and $C_{20/22}$ elongases, although it is to be recognized that the specific enzymes (and genes encoding those enzymes) introduced and the specific PUFAs produced are by no means limiting to the invention herein.

TABLE 5

Lipid Profiles of Representative *Yarrowia lipolytica* Strains Engineered to Produce Omega-3/Omega-6 PUFAs

| Strain | Reference | ATCC Deposit No. | 16:0 | 16:1 | 18:0 | 18:1 | 18:2 | 18:3 (ALA) | GLA | 20:2 (EDA) | DGLA | ARA | ETA | EPA | DPA n-3 | DHA | TFAs % DCW |
|---|---|---|---|---|---|---|---|---|---|---|---|---|---|---|---|---|---|
| Wildtype | U.S. Pat. No. 7,465,564 | #76982 | 14 | 11 | 3.5 | 34.8 | 31 | 0 | 0 | — | — | — | — | — | — | — | — |
| pDMW208 | | — | 11.9 | 8.6 | 1.5 | 24.4 | 17.8 | 0 | 25.9 | — | — | — | — | — | — | — | — |
| pDMW208-D62 | | — | 16.2 | 1.5 | 0.1 | 17.8 | 22.2 | 0 | 34 | — | — | — | — | — | — | — | — |
| M4 | U.S. Pat. No. 7,932,077 | — | 15 | 4 | 2 | 5 | 27 | 0 | 35 | — | 8 | 0 | 0 | 0 | — | — | — |
| Y2034 | U.S. Pat. No. 7,588,931 | — | 13.1 | 8.1 | 1.7 | 7.4 | 14.8 | 0 | 25.2 | — | 8.3 | 11.2 | — | — | — | — | — |
| Y2047 | | PTA-7186 | 15.9 | 6.6 | 0.7 | 8.9 | 16.6 | 0 | 29.7 | — | 0 | 10.9 | — | — | — | — | — |
| Y2214 | | — | 7.9 | 15.3 | 0 | 13.7 | 37.5 | 0 | 0 | — | 7.9 | 14 | — | — | — | — | — |
| EU | U.S. Pat. No. 7,932,077 | — | 19 | 10.3 | 2.3 | 15.8 | 12 | 0 | 18.7 | — | 5.7 | 0.2 | 3 | 10.3 | — | — | 36 |
| Y2072 | | — | 7.6 | 4.1 | 2.2 | 16.8 | 13.9 | 0 | 27.8 | — | 3.7 | 1.7 | 2.2 | 15 | — | — | — |
| Y2102 | | — | 9 | 3 | 3.5 | 5.6 | 18.6 | 0 | 29.6 | — | 3.8 | 2.8 | 2.3 | 18.4 | — | — | — |
| Y2088 | | — | 17 | 4.5 | 3 | 2.5 | 10 | 0 | 20 | — | 3 | 2.8 | 1.7 | 20 | — | — | — |
| Y2089 | | — | 7.9 | 3.4 | 2.5 | 9.9 | 14.3 | 0 | 37.5 | — | 2.5 | 1.8 | 1.6 | 17.6 | — | — | — |
| Y2095 | | — | 13 | 0 | 2.6 | 5.1 | 16 | 0 | 29.1 | — | 3.1 | 1.9 | 2.7 | 19.3 | — | — | — |
| Y2090 | | — | 6 | 1 | 6.1 | 7.7 | 12.6 | 0 | 26.4 | — | 6.7 | 2.4 | 3.6 | 26.6 | — | — | 22.9 |
| Y2096 | | PTA-7184 | 8.1 | 1 | 6.3 | 8.5 | 11.5 | 0 | 25 | — | 5.8 | 2.1 | 2.5 | 28.1 | — | — | 20.8 |
| Y2201 | | PTA-7185 | 11 | 16.1 | 0.7 | 18.4 | 27 | 0 | — | 3.3 | 3.3 | 1 | 3.8 | 9 | — | — | — |
| Y3000 | U.S. Pat. No. 7,550,286 | PTA-7187 | 5.9 | 1.2 | 5.5 | 7.7 | 11.7 | 0 | 30.1 | — | 2.6 | 1.2 | 1.2 | 4.7 | 18.3 | 5.6 | — |
| Y4001 | U.S. Pat. Appl. Pub. No. 2009-0093543-A1 | — | 4.3 | 4.4 | 3.9 | 35.9 | 23 | 0 | — | 23.8 | 0 | 0 | 0 | — | — | — | — |
| Y4036 | | — | 7.7 | 3.6 | 1.1 | 14.2 | 32.6 | 0 | — | 15.6 | 18.2 | 0 | 0 | — | — | — | — |
| Y4070 | | — | 8 | 5.3 | 3.5 | 14.6 | 42.1 | 0 | — | 6.7 | 2.4 | 11.9 | — | — | — | — | — |
| Y4086 | | — | 3.3 | 2.2 | 4.6 | 26.3 | 27.9 | 6.9 | — | 7.6 | 1 | 0 | 2 | 9.8 | — | — | 28.6 |
| Y4128 | | PTA-8614 | 6.6 | 4 | 2 | 8.8 | 19 | 2.1 | — | 4.1 | 3.2 | 0 | 5.7 | 42.1 | — | — | 18.3 |
| Y4158 | | — | 3.2 | 1.2 | 2.7 | 14.5 | 30.4 | 5.3 | — | 6.2 | 3.1 | 0.3 | 3.4 | 20.5 | — | — | 27.3 |
| Y4184 | | — | 3.1 | 1.5 | 1.8 | 8.7 | 31.5 | 4.9 | — | 5.6 | 2.9 | 0.6 | 2.4 | 28.9 | — | — | 23.9 |
| Y4217 | | — | 3.9 | 3.4 | 1.2 | 6.2 | 19 | 2.7 | — | 2.5 | 1.2 | 0.2 | 2.8 | 48.3 | — | — | 20.6 |
| Y4259 | | — | 4.4 | 1.4 | 1.5 | 3.9 | 19.7 | 2.1 | — | 3.5 | 1.9 | 0.6 | 1.8 | 46.1 | — | — | 23.7 |
| Y4305 | | — | 2.8 | 0.7 | 1.3 | 4.9 | 17.6 | 2.3 | — | 3.4 | 2 | 0.6 | 1.7 | 53.2 | — | — | 27.5 |
| Y4127 | Int'l. App. Pub. No. WO 2008/073367 | PTA-8802 | 4.1 | 2.3 | 2.9 | 15.4 | 30.7 | 8.8 | — | 4.5 | 3.0 | 3.0 | 2.8 | 18.1 | — | — | — |
| Y4184 | | — | 2.2 | 1.1 | 2.6 | 11.6 | 29.8 | 6.6 | — | 6.4 | 2.0 | 0.4 | 1.9 | 28.5 | — | — | 24.8 |
| Y8404 | | — | 2.8 | 0.8 | 1.8 | 5.1 | 20.4 | 2.1 | — | 2.9 | 2.5 | 0.6 | 2.4 | 51.1 | — | — | 27.3 |

TABLE 5-continued

Lipid Profiles of Representative *Yarrowia lipolytica* Strains Engineered to Produce Omega-3/Omega-6 PUFAs

| Strain | Reference | ATCC Deposit No. | 16:0 | 16:1 | 18:0 | 18:1 | 18:2 | 18:3 (ALA) | GLA | 20:2 (EDA) | DGLA | ARA | ETA | EPA | DPA n-3 | DHA | TFAs % DCW |
|---|---|---|---|---|---|---|---|---|---|---|---|---|---|---|---|---|---|
| Y8406 | U.S. Pat. Appl. Pub. No. 2010-0317072-A1 | PTA-10025 | 2.6 | 0.5 | 2.9 | 5.7 | 20.3 | 2.8 | | 2.8 | 2.1 | 0.5 | 2.1 | 51.2 | — | — | 30.7 |
| Y8412 | | PTA-10026 | 2.5 | 0.4 | 2.6 | 4.3 | 19.0 | 2.4 | | 2.2 | 2.0 | 0.5 | 1.9 | 55.8 | — | — | 27.0 |
| Y8647 | | — | 1.3 | 0.2 | 2.1 | 4.7 | 20.3 | 1.7 | | 3.3 | 3.6 | 0.7 | 3.0 | 53.6 | — | — | 37.6 |
| Y8649 | | — | 2.4 | 0.3 | 2.9 | 3.7 | 18.8 | 2.2 | | 2.1 | 2.4 | 0.6 | 2.1 | 55.8 | — | — | 27.9 |
| Y8650 | | — | 2.2 | 0.3 | 2.9 | 3.8 | 18.8 | 2.4 | | 2.1 | 2.4 | 0.6 | 2.1 | 56.1 | — | — | 28.2 |
| Y9028 | | — | 1.3 | 0.2 | 2.1 | 4.4 | 19.8 | 1.7 | | 3.2 | 2.5 | 0.8 | 1.9 | 54.5 | — | — | 39.6 |
| Y9031 | | — | 1.3 | 0.3 | 1.8 | 4.7 | 20.1 | 1.7 | | 3.2 | 3.2 | 0.9 | 2.6 | 52.3 | — | — | 38.6 |
| Y9477 | | — | 2.6 | 0.5 | 3.4 | 4.8 | 10.0 | 0.5 | | 2.5 | 3.7 | 1.0 | 2.1 | 61.4 | — | — | 32.6 |
| Y9497 | | — | 2.4 | 0.5 | 3.2 | 4.6 | 11.3 | 0.8 | | 3.1 | 3.6 | 0.9 | 2.3 | 58.7 | — | — | 33.7 |
| Y9502 | | — | 2.5 | 0.5 | 2.9 | 5.0 | 12.7 | 0.9 | | 3.5 | 3.3 | 0.8 | 2.4 | 57.0 | — | — | 37.1 |
| Y9508 | | — | 2.3 | 0.5 | 2.7 | 4.4 | 13.1 | 0.9 | | 2.9 | 3.3 | 0.9 | 2.3 | 58.7 | — | — | 34.9 |
| Y8143 | | — | 4.2 | 1.5 | 1.4 | 3.6 | 18.1 | 2.6 | | 1.7 | 1.6 | 0.6 | 1.6 | 50.3 | — | — | 22.3 |
| Y8145 | | — | 4.3 | 1.7 | 1.4 | 4.8 | 18.6 | 2.8 | | 2.2 | 1.5 | 0.6 | 1.5 | 48.5 | — | — | 23.1 |
| Y8259 | | PTA-10027 | 3.5 | 1.3 | 1.3 | 4.8 | 16.9 | 2.3 | | 1.9 | 1.7 | 0.6 | 1.6 | 53.9 | — | — | 20.5 |
| Y8367 | | — | 3.7 | 1.2 | 1.1 | 3.4 | 14.2 | 1.1 | | 1.5 | 1.7 | 0.8 | 1.0 | 58.3 | — | — | 18.4 |
| Y8370 | | — | 3.4 | 1.1 | 1.4 | 4.0 | 15.7 | 1.9 | | 1.7 | 1.9 | 0.6 | 1.5 | 56.4 | — | — | 23.3 |
| Y8670 | | — | 1.9 | 0.4 | 3.4 | 4.3 | 17.0 | 1.5 | | 2.2 | 1.7 | 0.6 | 1.1 | 60.9 | — | — | 27.3 |
| Y8672 | | — | 2.3 | 0.4 | 2.0 | 4.0 | 16.1 | 1.4 | | 1.8 | 1.6 | 0.7 | 1.1 | 61.8 | — | — | 26.5 |

One of skill in the art will appreciate that the methodology of the present invention is not limited to the *Yarrowia lipolytica* strains described above, nor to the species (i.e., *Yarrowia lipolytica*) or genus (i.e., *Yarrowia*) in which the invention has been demonstrated, as the means to introduce a PUFA biosynthetic pathway into an oleaginous yeast are well known. Instead, any oleaginous yeast or any other suitable microbe capable of producing microbial oils (preferably comprising PUFAs, e.g., LA, GLA, EDA, DGLA, ARA, DTA, DPAn-6, ALA, STA, ETrA, ETA, EPA, DPAn-3, DHA) will be equally suitable for use in the present methodologies, as demonstrated in Example 26 (although some process optimization may be required for each new microbe handled, based on differences in, e.g., the cell wall composition of each oil-containing microbe).

A microbial species producing a lipid, preferably comprising a PUFA(s), may be cultured and grown in a fermentation medium under conditions whereby the lipid is produced by the microorganism. Typically, the microorganism is fed with a carbon and nitrogen source, along with a number of additional chemicals or substances that allow growth of the microorganism and/or production of the microbial oil (preferably comprising PUFAs). The fermentation conditions will depend on the microorganism used, as described in the above citations, and may be optimized for a high content of the PUFA(s) in the resulting biomass.

In general, media conditions may be optimized by modifying the type and amount of carbon source, the type and amount of nitrogen source, the carbon-to-nitrogen ratio, the amount of different mineral ions, the oxygen level, growth temperature, pH, length of the biomass production phase, length of the oil accumulation phase and the time and method of cell harvest. For example, *Yarrowia lipolytica* are generally grown in a complex media such as yeast extract-peptone-dextrose broth (YPD) or a defined minimal media (e.g., Yeast Nitrogen Base (DIFCO Laboratories, Detroit, Mich.) that lacks a component necessary for growth and thereby forces selection of the desired recombinant expression cassettes that enable PUFA production).

When the desired amount of microbial oil, preferably comprising PUFAs, has been produced by the microorganism, the fermentation medium may be mechanically processed to obtain untreated microbial biomass comprising the microbial oil. For example, the fermentation medium may be filtered or otherwise treated to remove at least part of the aqueous component (e.g., by drying). As will be appreciated by those in the art, the untreated microbial biomass typically includes water. Preferably, a portion of the water is removed from the untreated microbial biomass after microbial fermentation to provide a microbial biomass with a moisture level of less than 10 weight percent, more preferably a moisture level of less than 5 weight percent, and most preferably a moisture level of 3 weight percent or less. The microbial biomass moisture level can be controlled in drying. Preferably the microbial biomass has a moisture level in the range of about 1 to 10 weight percent.

Optionally, the fermentation medium and/or the microbial biomass may be pasteurized or treated via other means to reduce the activity of endogenous microbial enzymes that can harm the microbial oil and/or PUFA products.

Thus, the microbial biomass may be in the form of whole cells, whole cell lysates, homogenized cells, partially hydrolyzed cellular material, and/or disrupted cells (i.e., disrupted microbial biomass).

The microbial biomass may be mechanically processed to disrupting the biomass, for example via cellular lysing or via physical means such as bead beaters, screw extrusion, etc. to provide greater accessibility to the cell contents.

The disrupted microbial biomass will have a disruption efficiency of at least 50% of the oil-containing microbes. More preferably, the disruption efficiency is at least 75%, more preferably at least 80% and most preferably 85-90% or more, of the oil-containing microbes. Although preferred ranges are described above, useful examples of disruption efficiencies include any integer percentage from 50% to 100%, such as 51%, 52%, 53%, 54%, 55%, 56%, 57%, 58%, 59%, 60%, 61%, 62%, 63%, 64%, 65%, 66%, 67%, 68%, 69%, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98% or 99% disruption efficiency.

The disruption efficiency refers to the percent of cells walls that have been fractured or ruptured during processing, as determined qualitatively by optical visualization or as determined quantitatively according to the following formula: % disruption efficiency=(% free oil*100) divided by (% total oil), wherein % free oil and % total oil are measured for the solid pellet.

A solid pellet that has been not subjected to a process of disruption (e.g., mechanical crushing using e.g., screw extrusion, an expeller, pistons, bead beaters, mortar and pestle, Hammer-milling, air-jet milling, etc.) will typically have a low disruption efficiency since fatty acids within DAGs, MAGs and TAGs, phosphatidylcholine and phosphatidylethanolamine fractions and free fatty acids, etc. are generally not extractable from the microbial biomass until a process of disruption has broken both cell walls and internal membranes of various organelles, including membranes surrounding lipid bodies. Various processes of disruption will result in various disruption efficiencies, based on the particular shear, compression, static and dynamic forces inherently produced in the process.

Increased disruption efficiency of the microbial biomass typically leads to increased extraction yields (e.g., as measured by the weight percent of crude extracted oil), likely since more of the microbial oil is susceptible to the presence of the extraction solvent(s) with disruption of cell walls and membranes.

Although a variety of equipment may be utilized to produce the disrupted microbial biomass, preferably the disrupting is performed in a twin screw extruder. More specifically, the twin screw extruder preferably comprises: (i) a total specific energy input (SEI) in the extruder of about 0.04 to 0.4 KW/(kg/hr), more preferably 0.05 to 0.2 KW/(kg/hr) and most preferably about 0.07 to 0.15 KW/(kg/hr); (ii) a compaction zone using bushing elements with progressively shorter pitch length; and, (iii) a compression zone using flow restriction. Most of the mechanical energy required for cell disruption is imparted in the compression zone, which is created using flow restriction in the form of e.g., reverse screw elements, restriction/blister ring elements or kneading elements. The compaction zone is prior to the compression zone within the extruder. A first zone of the extruder may be present to feed and transport the biomass into the compaction zone.

The process of pelletization generally involves the following steps: (1) mixing the microbial biomass and at least one grinding agent capable of absorbing oil to provide a disrupted biomass mix comprising disrupted microbial biomass; (2) blending the disrupted biomass mix with at least one binding agent to provide a fixable mix capable of forming a solid pellet; and, (3) forming said fixable mix into solid pellets to provide a pelletized microbial biomass.

First, the microbial biomass, having a moisture level and comprising oil-containing microbes, is mixed with at least one grinding agent capable of absorbing oil, to provide a disrupted biomass mix.

The grinding agent, capable of absorbing oil, may be a particle having a Moh hardness of 2.0 to 6.0, and preferably 2.0 to about 5.0; and more preferably about 2.0 to 4.0; and an oil absorption coefficient of 0.8 or higher, preferably 1.0 or higher, and more preferably 1.3 or higher, as determined according to the American Society for Testing And Materials (ASTM) Method D1483-60. Preferred grinding agents have a median particle diameter of about 2 to 20 microns, and preferably about 7 to 10 microns; and a specific surface area of at least 1 $m^2/g$ and preferably 2 to 100 $m^2/g$ as determined with the BET method (Brunauer, S. et al., *J. Am. Chem. Soc.*, 60:309 (1938)).

Preferred grinding agents are selected from the group consisting of silica and silicate. As used herein, the term "silica" refers to a solid chemical substance consisting mostly (at least 90% and preferably at least 95% by weight) of silicon and oxygen atoms in a ratio of about two oxygen atoms to one silicon atom, thus having the empirical formula of $SiO_2$. Silicas include, for example, precipitated silicas, fumed silicas, amorphous silicas, diatomaceous silicas, also known as diatomaceous earths (D-earth) as well as silanized forms of these silicas. The term "silicate" refers to a solid chemical substance consisting mostly (at least 90% and preferably at least 95% by weight) of atoms of silicon, oxygen and at least one metal ion. The metal ion may be, for instance, lithium, sodium, potassium, magnesium, calcium, aluminum, or a mixture thereof. Aluminum silicates in the form of zeolites, natural and synthetic, may be used. Other silicates that may be useful are calcium silicates, magnesium silicates, sodium silicates, and potassium silicates.

A preferred grinding agent is diatomaceous earth (D-earth) having a specific surface area of about 10-20 $m^2/g$ and an oil absorption coefficient of 1.3 or higher. A commercial source of a suitable grinding agent capable of absorbing oil is Celite 209 D-earth available from Celite Corporation, Lompoc, Calif.

Other grinding agents may be poly(meth)acrylic acids, and ionomers derived from partial or full neutralization of poly (meth)acrylic acids with sodium or potassium bases. Herein the term (meth)acrylate means the compound may be either an acrylate, a methacrylate, or a mixture of the two.

The at least one grinding agent is present at about 1 to 20 weight percent, and more preferably 1 to 15 weight percent, and most preferably about 2 to 12 weight percent, based on the summation of components (a) microbial biomass, (b) grinding agent and (c) binding agent in the solid pellet.

Mixing a microbial biomass and a grinding agent capable of absorbing oil to provide a disrupted biomass mix [step (1)] can be performed by any method known in the art to apply energy to a mixing media. Preferably the mixing provides a disrupted biomass mix having a temperature of 90° C. or less, and more preferably 70° C. or less.

For example, the microbial biomass and grinding agent may be fed into a mixer, such as a single screw extruder or twin screw extruder, agitator, single screw or twin screw kneader, or Banbury mixer, and the addition step may be addition of all ingredients at once or gradual addition in batches.

Preferably the mixing is performed in a twin screw extruder, as described above, having a SEI of about 0.04 to 0.4 KW/(kg/hr), a compaction zone using bushing elements with progressively shorter pitch length, and a compression zone using flow restriction. Under these conditions, the initial microbial biomass may be whole dried cells and the process of cell disruption, resulting in a disrupted microbial biomass having a disruption efficiency of at least 50% of the oil-containing microbes, may occur at the beginning or during the mixing step, that is, cell disruption and step (1) may be combined and simultaneous to produce a disrupted biomass mix. The presence of the grinding agent enhances cell disruption; however, most cell disruption occurs as a result of the twin screw extruder itself.

Thus, for clarity, cell disruption of the microbial biomass can be performed in the absence of grinding agent, for instance in a twin screw extruder having a compression zone as disclosed above and then mixing of grinding agent and disrupted microbial biomass can be performed in the twin screw extruder or a variety of other mixers to provide the disrupted biomass mix. Or, cell disruption of the microbial biomass can be performed in the presence of grinding agent, for instance in a twin screw extruder having a compression zone. In either case, however, cell disruption (i.e., disruption efficiency) should be maximized if one desires to maximize the yield of extracted oil from the oil-containing microbes in subsequent process steps.

At least one binding agent is then blended with the disrupted biomass mix to provide a fixable mix capable of forming a solid pellet (i.e., the pelletized microbial biomass).

Binding agents useful in the invention include hydrophilic organic materials and hydrophilic inorganic materials that are water soluble or water dispersible. Preferred water soluble binding agents have solubility in water of at least 1 weight percent, preferably at least 2 weight percent and more preferably at least 5 weight percent, at 23° C.

The binding agent preferably has solubility in supercritical fluid carbon dioxide at 500 bar and 40° C. of less than $1 \times 10^{-3}$ mol fraction; and preferably less than $1 \times 10^{-4}$, more preferably less than $1 \times 10^{-5}$, and most preferably less than $1 \times 10^{-6}$ mol fraction. The solubility may be determined according to the methods disclosed in "Solubility in Supercritical Carbon Dioxide", Ram Gupta and Jae-Jin Shim, Eds., CRC (2007).

The binding agent acts to retain the integrity and size of pellets formed from the pelletization process and furthermore acts to reduce fines in further processing and transport of the pellets.

Suitable organic binding agents include: alkali metal carboxymethyl cellulose with degrees of substitution of 0.5 to 1; polyethylene glycol and/or alkyl polyethoxylate, preferably with an average molecular weight below 1,000; phosphated starches; cellulose and starch ethers, such as carboxymethyl starch, methyl cellulose, hydroxyethyl cellulose, hydroxypropyl cellulose and corresponding cellulose mixed ethers; proteins including gelatin and casein; polysaccharides including tragacanth, sodium and potassium alginate, guam Arabic, tapioca, partly hydrolyzed starch including maltodextrose and dextrin, and soluble starch; sugars including sucrose, invert sugar, glucose syrup and molasses; synthetic water-soluble polymers including poly(meth)acrylates, copolymers of acrylic acid with maleic acid or compounds containing vinyl groups, polyvinyl alcohol, partially hydrolyzed polyvinyl acetate and polyvinyl pyrrolidone. If the compounds mentioned above are those containing free carboxyl groups, they are normally present in the form of their alkali metal salts, more particularly their sodium salts.

Phosphated starch is understood to be a starch derivative in which hydroxyl groups of the starch anhydroglucose units are replaced by the group —O—P(O)(OH)$_2$ or water-soluble salts thereof, more particularly alkali metal salts, such as sodium and/or potassium salts. The average degree of phosphation of the starch is understood to be the number of esterified oxygen atoms bearing a phosphate group per saccharide monomer of the starch averaged over all the saccharide units. The average degree of phosphation of preferred phosphate starches is in the range from 1.5 to 2.5.

Partly hydrolyzed starches in the context of the present invention are understood to be oligomers or polymers of carbohydrates which may be obtained by partial hydrolysis of starch using conventional, for example acid- or enzyme-catalyzed processes. The partly hydrolyzed starches are preferably hydrolysis products with average molecular weights of 440 to 500,000. Polysaccharides with a dextrose equivalent (DE) of 0.5 to 40 and, more particularly, 2 to 30 are preferred, DE being a standard measure of the reducing effect of a polysaccharide by comparison with dextrose (which has a DE of 100, i.e., DE 100). Both maltodextrins (DE 3-20) and dry glucose syrups (DE 20-37) and also so-called yellow dextrins and white dextrins with relatively high average molecular weights of about 2,000 to 30,000 may be used after phosphation.

A preferred class of binding agent is water and carbohydrates selected from the group consisting of sucrose, lactose, fructose, glucose, and soluble starch. Preferred binding agents have a melting point of at least 50° C., preferably at least 80° C., and more preferably at least 100° C.

Suitable inorganic binding agents include sodium silicate, bentonite, and magnesium oxide.

Preferred binding agents are materials that are considered "food grade" or "generally recognized as safe" (GRAS).

The binding agent is present at about 0.5 to 10 weight percent, preferably 1 to 10 weight percent, and more preferably about 3 to 8 weight percent, based on the summation of components (a) microbial biomass, (b) grinding agent and (c) binding agent in the solid pellet.

As one of skill in the art will appreciate, fixable mix will have significantly higher moisture level than the moisture level of the final solid pellet, to permit ease of handling (e.g., extruding the fixable mix into a die). Thus, for example, a binding agent comprising a solution of sucrose and water can be added to the disrupted biomass mix in a manner that results in a fixable mix having within 0.5 to 20 weight percent water. However, upon drying of the fixable mix to form a solid pellet, the final moisture level of the solid pellet is less than 5 weight percent of water and the sucrose is less than 10 weight percent.

Blending the at least one binding agent with disrupted biomass mix to provide a fixable mix [step (2)] can be performed by any method that allows dissolution of the binding agent and blending with the disrupted biomass mix to provide a fixable mix. The term "fixable mix" means that the mix is capable of forming a solid pellet upon removal of solvent, for instance water, in a drying step.

The binding agent can be blended by a variety of means. One method includes dissolution of the binding agent in a solvent to provide a binder solution, following by metering the binder solution, at a controlled rate, into the disrupted biomass mix. A preferred solvent is water, but other solvents, for instance ethanol, isopropanol, and such, may be used advantageously. Another method includes adding the binding agent, as a solid or solution, to the biomass/grinding agent at the beginning or during the mixing step, that is, step (1) and (2) are combined and simultaneous. If the binding agent is added as a solid, preferably sufficient moisture is present in the disrupted biomass mix to dissolve the binding agent during the blending step. A preferred method of blending includes metering the binder solution, at a controlled rate, into the disrupted biomass mix in an extruder, preferably after the compression zone, as disclosed above. The addition of a binder solution after the compression zone allows for rapid cooling of the disrupted biomass mix.

Forming solid pellets comprising pelletized microbial biomass from the fixable mix [step (3)] can be performed by a variety of means known in the art. One method includes extruding the fixable mix into a die, for instance a dome granulator, to form strands of uniform diameter that are dried on a vibrating or fluidized bed drier to break the strands to provide pellets. The pelletized microbial biomass is suitable for downstream oil extraction, transport, or other purposes.

The solid pellets disclosed herein desirably are non-tacky at room temperature. A large plurality of the solid pellets may be packed together for many days without degradation of the pellet structure, and without binding together. A large plurality of pellets desirably is a free-flowing pelletized composition. Preferably the pellets have an average diameter of about 0.5 to about 1.5 mm and an average length of about 2.0 to about 8.0 mm. Preferably, the solid pellets have a final moisture level of about 0.1% to 5.0%, with a range about 0.5% to 3.0% more preferred. Increased moisture levels in the final solid pellets may lead to difficulties during storage due to growth of e.g., molds.

The solid pellet therefore preferably comprises: (a) about 70 to about 98.5 weight percent of disrupted biomass comprising oil-containing microbes; (b) about 1 to about 20 weight percent grinding agent capable of absorbing oil; and, (c) about 0.5 to 10 weight percent binding agent; based on the summation of (a), (b) and (c) in the solid pellet. The solid pellet may comprise 75 to 98 weight percent (a); 1 to 15 weight percent (b) and 1 to 10 weight percent (c); and, preferably the pellet comprises 80 to 95 weight percent (a); 2 to 12 weight percent (b) and 3 to 8 weight percent (c).

The pelletization methodology set forth above has proven to be effective, highly scale-able, robust and user-friendly, while allowing production at relatively high yields and at high throughput rates. Cell disruption using conventional techniques such as spray drying, use of high shear mixers, etc. was found to be inadequate for e.g., yeast cell walls comprising chitin. Incumbent wet media mill disruption process produced fines and colloidal contamination which necessitated further separation steps and resulted in significant oil loss. Additionally, wet media milling steps introduced a liquid carrier (e.g., isohexane or water) which complicated downstream processing by requiring liquid-solid separation step with oil losses. The pelletization process described herein relies on the production of a disrupted biomass mix; however, advantageously, the disruption occurs without requiring a liquid carrier. Furthermore, the presence of the grinding agent within the solid pellets appears to facilitate high levels of oil extraction. And, since the pellets remain durable throughout the extraction process, this aids operability and cycle time.

The pelletized microbial biomass is extracted with a solvent to provide an extracted oil and an extracted pellet (i.e., the "residual biomass" or "residual pellet").

Oil extraction can occur via treatment with various organic solvents (e.g., hexane, iso-hexane), enzymatic extraction, osmotic shock, ultrasonic extraction, supercritical fluid extraction (e.g., $CO_2$ extraction), saponification and combinations of these methods.

In one embodiment, extraction is performed with an organic solvent to produce an extracted oil and said extracted oil is degummed and optionally bleached prior to said step (c) distilling the extracted oil. More specifically, the crude oil can be degummed by water or acid hydration of phospholipids and other polar and neutral lipid complexes, followed by separation of the precipitated gum from the oil. Alternatively, the phospholipids and other hydratable impurities can be removed by contacting the oil with a polar solvent such as acetone or through enzymatic degumming. The degummed oil may be further bleached using bleaching clays, silica or carbons to remove color compounds and residual metals etc.

In an alternate embodiment, extraction occurs using supercritical conditions. Supercritical fluids (SCFs) exhibit properties intermediate between those of gases and liquids. A key feature of a SCF is that the fluid density can be varied continuously from liquid-like to gas-like densities by varying either the temperature or pressure, or a combination thereof. Various density-dependent physical properties likewise exhibit similar continuous variation in this region. Some of these properties include, but are not limited to, solvent strength (as evidenced by the solubilities of various substances in the SCF media), polarity, viscosity, diffusivity, heat capacity, thermal conductivity, isothermal compressibility, expandability, contractibility, fluidity, and molecular packing. The density variation in a SCF also influences the chemical potential of solutes and hence, reaction rates and equilibrium constants. Thus, the solvent environment in a SCF media can be optimized for a specific application by tuning the various density-dependent fluid properties.

A fluid is in the SCF state when the system temperature and pressure exceed the corresponding critical point values defined by the critical temperature ($T_c$) and critical pressure ($P_c$). For pure substances, the $T_c$ and $P_c$ are the highest at which vapor and liquid phases can coexist. Above the $T_c$, a liquid does not form for a pure substance, regardless of the applied pressure. Similarly, the $P_c$ and critical molar volume are defined at this $T_c$ corresponding to the state at which the vapor and liquid phases merge. Although more complex for multicomponent mixtures, a mixture critical state is similarly identified as the condition at which the properties of coexisting vapor and liquid phases become indistinguishable. For a discussion of supercritical fluids, see *Kirk-Othmer Encycl. of Chem. Technology*, 4$^{th}$ ed., Vol. 23, pg. 452-477, John Wiley & Sons, NY (1997).

Any suitable SCF or liquid solvent may be used in the oil extraction step, e.g., the contacting of the solid pellets with a solvent to separate the oil from the microbial biomass, including, but not limited to, $CO_2$, tetrafluoromethane, ethane, ethylene, propane, propylene, butane, isobutane, isobutene, pentane, hexane, cyclohexane, benzene, toluene, xylenes, and mixtures thereof, provided that it is inert to all reagents and products. Preferred solvents include $CO_2$ or a $C_3$-$C_6$ alkane. More preferred solvents are $CO_2$, pentane, butane, and propane. Most preferred solvents are supercritical fluid solvents comprising $CO_2$.

In a preferred embodiment, super-critical $CO_2$ extraction is performed, as disclosed in U.S. Pat. Pub. No. 2011-0263709-A1. By application of this particular methodology, the pelletized microbial biomass is subjected to supercritical oil extraction conditions. Phospholipids (PLs) remain within the residual biomass (i.e., the extracted residual pellet), while the resulting extract (i.e., an extract comprising a lipid fraction substantially free of phospholipids) is fractionated at least once to produce an extracted oil having a refined lipid composition that may comprise neutral lipids and/or free fatty acids (FFAs) while being substantially free of PLs. The refined lipid composition may be enriched in TAGs (preferably comprising PUFAs) relative to the oil composition of the pelletized microbial biomass that was not processed with the solvent. The refined lipid composition may undergo further purification to produce a purified oil.

In this method, the supercritical fluids comprising $CO_2$ may further comprise at least one additional solvent (i.e., a cosolvent), for example one or more of the solvents listed above, as long as the presence or amount of the additional solvent is not deleterious to the process, for example does not solubilize the PLs contained in the microbial biomass during the primary extraction step. However, a polar cosolvent such as ethanol, methanol, acetone, or the like may be added to intentionally impart polarity to the solvent phase to enable extraction of the PLs from the microbial biomass during optional secondary oil extractions to isolate the PLs.

The solid pellets comprising oil-containing disrupted microbial biomass may be contacted with liquid or supercritical $CO_2$ under suitable extraction conditions to provide an extracted oil and a residual biomass according to at least two methods. According to a first method of U.S. Pat. Appl. Pub.

No. 2011-0263709-A1, contacting the pelletized microbial biomass with $CO_2$ is performed multiple times under extraction conditions corresponding to increasing solvent density, for example under increasing pressure and/or decreasing temperature, to obtain extracts comprising a refined lipid composition wherein the lipid fractions are substantially free of PLs. The refined lipid composition of the extracts varies in the distribution of FFAs, monoacylglycerols (MAGs), diacylglycerols (DAGs), and TAGs according to their relative solubilities, which depend upon the solvent density corresponding to the selected extraction conditions of each of the multiple extractions.

Alternatively and according to the present methods, in a second method of U.S. Pat. Appl. Pub. No. 2011-0263709-A1, the pelletized microbial biomass is contacted with a solvent such as $CO_2$ under extraction conditions selected to provide an extract comprising a lipid fraction substantially free of PLs, which subsequently undergoes a series of multiple staged pressure letdown steps to provide refined lipid compositions. Each of these staged pressure letdown steps is conducted in a separator vessel at pressure and temperature conditions corresponding to decreasing solvent density to isolate a liquid-phase refined lipid composition which can be separated from the extract phase by, for example, simple decantation. The refined lipid compositions which are provided vary in the distribution of FFAs, MAGs, DAGs, and TAGs according to their relative solubilities, which depend upon the solvent density corresponding to the selected conditions of the staged separator vessels.

The extracted oils having refined lipid compositions obtained using the second method described above may correspond to the extracts obtained in the first method when extraction conditions are appropriately matched. It is thus believed possible to exemplify the refined lipid compositions obtainable as described herein through performance of the first method.

According to the present methods, the solid pellets comprising oil-containing disrupted microbial biomass may be contacted with a solvent such as liquid or SCF $CO_2$ at a temperature and pressure and for a contacting time sufficient to obtain an extract comprising a lipid fraction substantially free of PLs. The lipid fraction may comprise neutral lipids (e.g., comprising TAGs, DAGs, and MAGs) and FFAs. The contacting and fractionating temperatures may be chosen to provide liquid or SCF $CO_2$, to be within the thermal stability range of the PUFA(s), and to provide sufficient density of the $CO_2$ to solubilize the TAGs, DAGs, MAGs, and FFAs. Generally, the contacting and fractionating temperatures may be from about 20° C. to about 100° C., for example from about 35° C. to about 100° C.; the pressure may be from about 60 bar to about 800 bar, for example from about 80 bar to about 600 bar. A sufficient contacting time, as well as appropriate $CO_2$ to microbial biomass ratios, may be determined by generating extraction curves for a particular sample of solid pellets. These extraction curves are dependent upon the extraction conditions of temperature, pressure, $CO_2$ flow rate, and variables such as the extent of cell disruption and the form of the microbial biomass. In one embodiment of the present methods, the solvent comprises liquid or supercritical fluid $CO_2$ and the mass ratio of $CO_2$ to the microbial biomass is from about 20:1 to about 70:1, for example from about 20:1 to about 50:1.

The extract comprising a lipid fraction substantially free of PLs may then be fractionated to obtain an extracted oil having a refined lipid composition comprising at least one PUFA, wherein the refined lipid composition is enriched in TAGs relative to the oil composition of the pelletized microbial biomass that is not processed with solvent. The refined lipid composition may further comprise DAGs, MAGs, or a combination of these. The refined lipid composition may further comprise FFAs. Other refined lipid compositions which may be obtained separately or in combination in the fractionation step include a TAG enriched product that is depleted in FFAs, a FFA enriched product that is depleted in TAGs, a FFA enriched product that is enriched in MAGs and/or DAGs, a FFA enriched product that is depleted in MAGs and/or DAGs, a TAG enriched product that is enriched in MAGs and/or DAGs, and a TAG enriched product that is depleted in MAGs and/or DAGs. According to the fractionating conditions employed, in one embodiment of the present methods, the refined lipid composition may be depleted in FFAs relative to the oil composition of the pelletized microbial biomass. In one embodiment, the refined lipid composition may be enriched in at least one PUFA relative to the oil composition of the pelletized microbial biomass. In one embodiment, the refined lipid composition may be enriched in at least one PUFA having 20 or more carbon atoms relative to the oil composition of the pelletized microbial biomass.

The fractionation may be performed by altering the temperature, the pressure, or the temperature and the pressure of the fractionating conditions. Fractionation may be accomplished in one of several separation processes including, for example, a sequential pressure reduction of the supercritical fluid-rich extract, liquid or SCF solvent extraction in a series of mixer-settler stages or extraction column, short-path distillation, vacuum steam stripping, or melt crystallization. The step of fractionating the extract may be repeated one or more times to provide additional refined lipid compositions.

Reducing the pressure, for example, of the extract lowers the solubility of the dissolved solutes, forming a separate liquid phase in each separation vessel. The temperature of the extract being fed to each separation vessel can be adjusted, for example through the use of heat exchangers, to provide the desired solvent density and corresponding solute solubility in each separation vessel. The initial extract consists of a complex mixture of various types of lipid components (e.g., FFAs, MAGs, DAGs, and TAGs) which exhibit similar solubility parameters, so an exact separation of the various components will not be achieved, but rather each refined lipid composition obtained in the fractionation step will contain a distribution of products. However, in general, the less soluble compounds condense in the first separation vessel operating at the highest pressure, and the most soluble compounds condense in the final separation vessel operating at the lowest pressure. The final separation vessel reduces the pressure of the extract phase sufficiently to essentially remove the bulk of the remaining solute in the extract phase, and the relatively pure $CO_2$ stream from the top of this vessel may be recycled back to the initial extraction vessel(s).

FIG. 2 schematically illustrates one embodiment of the extraction methods herein. In FIG. 2, stream 10 comprising pelletized microbial biomass and stream 38 comprising $CO_2$ are shown entering vessel 14. Stream 12 comprising pelletized microbial biomass and stream 16 are shown entering vessel 18. Contacting of pelletized microbial biomass comprising at least one PUFA with $CO_2$ occurs in vessel 14 at an initial temperature $T_{14}$ and pressure $P_{14}$, and in vessel 18 at a temperature $T_{18}$ and pressure $P_{18}$. $T_{14}$ may be the same as or different from $T_{18}$; $P_{14}$ may be the same as or different from $P_{18}$. The resulting mixture of equilibrated $CO_2$ and extract leaves vessel 14 as stream 16 to enter vessel 18, in which further contacting of the biomass and the $CO_2$ occurs to provide an extract comprising a lipid fraction substantially free of PLs, shown as stream 20. The residual biomass (not shown)

remains in vessels 14 and 16. Additional extraction vessels may be included in the process, if desired (not shown). Alternatively, the process may use only one extraction vessel if desired (not shown). The use of more than one extraction vessel may be advantageous as this can enable continuous $CO_2$ flow through the process by changing the relative order of solvent addition to the extraction vessels (not shown) and while one or more extraction vessels are taken off line (not shown), for example to charge pelletized microbial biomass or to remove residual biomass.

Downstream of the extraction vessels are shown two separation vessels arranged in series, vessels 22 and 28, in which fractionation of the extract is performed through a staged pressure reduction, optionally with adjustment of the temperature, for example through the use of heat exchangers (not shown). Additional separation vessels could be included in the process, if desired (not shown). The extract comprising $CO_2$ and a lipid fraction substantially free of PLs is shown entering vessel 22 as stream 20. In vessel 22, the pressure $P_{22}$ is lower than $P_{18}$ and the temperature $T_{22}$ may be the same as or different from $T_{18}$; under the operating conditions of the process, a separate liquid phase comprising the less soluble lipid components is formed. The separate liquid phase resulting from fractionation of the extract is shown leaving vessel 22 as stream 24, which represents a first refined lipid composition. The remaining extract, shown as stream 26, is introduced to the next separation vessel 28, where the pressure $P_{28}$ is reduced compared to $P_{22}$ and the temperature $T_{28}$ may or may not be the same as $T_{22}$. The operating conditions of the process enable formation of a separate liquid phase in vessel 28, which is shown leaving separation vessel 28 as stream 30. Stream 30 represents a second refined lipid composition.

From vessel 28, the remaining extract comprising relatively pure $CO_2$, shown as stream 32, may be recycled to extraction vessel 14 and/or to another extraction vessel (not shown). Recycling the $CO_2$ typically provides economic benefits over once-through $CO_2$ usage. A purge stream, shown as stream 34, can be used to remove volatile components which may build up with continuous recycle of the $CO_2$ to the process. Make-up $CO_2$ may be added to offset the $CO_2$ loss incurred through a purge. Make-up $CO_2$ may be added to the recycle $CO_2$ stream as shown in FIG. 2 by make-up $CO_2$ stream 8 joining stream 36 to provide the combined $CO_2$ stream 38. Alternatively, additional $CO_2$ could be added to vessel 14 and/or vessel 18 as a separate feed stream (not shown).

FIG. 3 schematically illustrates one embodiment of the extraction step of the method of the invention. In FIG. 3, stream 70 comprising $CO_2$ is introduced into extraction vessel 76, which contains pelletized microbial biomass (not shown). Optionally, a cosolvent (shown as stream 72) is added to the $CO_2$ stream using a pump (not shown) to provide the combined stream 74 comprising $CO_2$ and cosolvent. In the case where a cosolvent is not used, stream 70 and stream 74 are the same and contain only $CO_2$. Contacting the $CO_2$ with the pelletized microbial biomass comprising at least one PUFA occurs in vessel 76, and the extract comprising a lipid fraction substantially free of PLs is removed from the vessel as stream 78 along with the $CO_2$ solvent and optionally the cosolvent. The residual biomass (not shown) remains in the extraction vessel. The extract comprising a lipid fraction substantially free of PLs may then be fractionated in at least one separation vessel, as described above in reference to FIG. 2, or optionally, the lipid fraction substantially free of PLs may be isolated from the extract by venting the $CO_2$ and optionally the cosolvent (not shown).

The residual biomass from the above primary extraction comprises PLs. This residual biomass may be extracted a second time with a polar extraction solvent, for example a polar organic solvent such as methylene chloride or a mixed solvent comprising $CO_2$ and a polar cosolvent such as an alcohol, to obtain a PL fraction free of neutral lipids. The polar cosolvent may comprise methanol, ethanol, 1-propanol, and/or 2-propanol, for example. The residual biomass comprising PLs and the extracted PL fraction may be suitable for use as, e.g., an aquaculture feed.

The $CO_2$-based extraction process described herein offers several advantages relative to conventional organic solvent-based processes. For example, $CO_2$ is nontoxic, nonflammable, environmentally friendly, readily available, and inexpensive. $CO_2$ ($T_c$=31.1° C.) can extract thermally labile lipids from microbial biomass at relatively low temperatures to minimize lipid degradation in the oil. The extracted lipids may be isolated from the $CO_2$ solvent by simply venting the $CO_2$ from the pressurized extract rather than through thermal processing to strip organic solvents. The refined lipid fraction may be isolated from the extract comprising a lipid fraction substantially free of PLs. The residual microbial biomass containing PLs may be a saleable co-product, for example, for aquaculture feed. The PLs may be extracted from the residual microbial biomass as a relatively pure co-product depleted in neutral lipids. The extracted neutral lipid fraction substantially free of PLs may be fractionated to produce a lipid fraction enriched in FFAs and DAGs (and depleted in TAGs) relative to the lipid fraction substantially free of PLs and a refined lipid fraction enriched in TAGs (and depleted in FFAs and DAGs) relative to the lipid fraction substantially free of PLs.

The distillation step includes at least one pass of the extracted microbial oil (e.g., the refined lipid composition) through a short path distillation (SPD) still. Commercial SPD stills are well known in the art of chemical engineering. Suitable stills are available, for example, from Pope Scientific (Saukville, Wis.). The SPD still includes an evaporator and a condenser. A typical distillation is controlled by the temperature of the evaporator, the temperature of the condenser, the feed-rate of the oil into the still and the vacuum level of the still.

As one of skill in the art will appreciate, the number of passes through a SPD still will depend on the level of moisture in the extracted oil. If the moisture content is low, a single pass through the SPD still may be sufficient.

Preferably, however, the distillation is a multi-pass process including two or more consecutive passes of the extracted oil (e.g., the refined lipid composition) through a SPD still. A first pass is typically performed under about 1 to 50 torr pressure, and preferably about 5 to 30 torr, with relatively low surface temperature of the evaporator, for instance, about 100 to 150° C. This results in a dewatered oil, as residual water and low molecular weight organic materials are distilled. The dewatered oil is then passed through the still at higher temperature of the evaporator and lower pressures to provide a distillate fraction and a TAG-containing fraction (i.e., the lipid-containing fraction).

In some embodiments, the extracted oil comprises a sterol fraction, which may removed following distillation under SPD conditions. More specifically, when the extracted oil comprises a sterol fraction, distillation at least once under short path distillation conditions results in a distillate fraction comprising the sterol and a lipid-containing fraction comprising a reduced amount of the sterol when compared to the amount of the sterol in the extracted oil that has not been subjected to short path distillation. As previously discussed, the sterol fraction may comprise one or more sterols selected from the group consisting of: stigmasterol, ergosterol, brassicasterol, campesterol, β-sitosterol and desmosterol.

Additional passes of the TAG-containing lipid fraction may be made through the still to remove further sterol. With each additional pass, the distillation temperature may be increased relative to the temperature of the immediately preceding distillation. Preferably, sufficient passes are performed such that the reduction in the amount of the sterol fraction is at least about 40%-70%, preferably at least about 70%-80%, and more preferably greater than about 80%, when compared to the sterol fraction in the sterol-containing microbial oil.

Preferably, the SPD conditions comprise at least one pass of the sterol-containing microbial oil (i.e., the refined lipid composition) at a vacuum level of not more than 30 mTorr, and preferably not more than 5 mTorr. Preferably, the SPD conditions comprise at least one pass at about 220 to 300° C., and preferably at about 240 to 280° C.

Thus, for example, in one embodiment, the extracted oil is a refined lipid composition comprising: (i) at least one PUFA and enriched in TAGs (relative to the oil composition of pelletized microbial biomass that is not processed with a solvent); and (ii) a sterol fraction of at least 300 mg/100 g. When subjected to distillation at least once under SPD conditions, the distillation produces a distillate fraction comprising the sterol and a lipid-containing fraction comprising TAGs having a reduced sterol fraction that has improved clarity when compared to the refined lipid composition that has not been subjected to SPD. Improved clarity refers to a lack of cloudiness or opaqueness in the oil. Sterol-containing microbial oil becomes cloudy upon storing at temperatures below about 10° C., due to reduced solubility of the sterol in the oil at lower temperatures. The distillation process acts to remove substantial portions of the sterol fraction, such that the resulting lipid-containing fraction has a reduced amount of sterol present, and thus, remains clear, or substantially clear upon storage at about 10° C. A test method that may be used to evaluate the clarity of the oil is the American Oil Chemists' Society (AOCS) Official Method Cc 11-53 ("Cold Test", *Official Methods and Recommended Practices of the AOCS*, 6$^{th}$ ed., Urbana, Ill., AOCS, 2009, incorporated herein by reference).

Surprisingly, the removal of sterol in the distillation process can be accomplished without significant degradation of the oil, which is rich in PUFAs, e.g., EPA. The degradation of the oil may be evaluated based on the PUFA content and chromatographic profiling (as demonstrated in Example 23, infra).

Recovering the lipid-containing fraction may be accomplished by diverting the fraction, after completion of a pass through the evaporator, to a suitable container.

The fatty acids in an extracted microbial oil or product thereof (e.g., a lipid-containing fraction) are typically in a biological form such as a triglyceride or phospholipid. Because it is difficult to enrich the fatty acid profile of these forms, the individual fatty acids of the microbial oil will usually be liberated by transesterification using techniques well known to those skilled in the art. Since the fatty acid ester mixture has substantially the same fatty acid profile as the microbial oil prior to transesterification, the product of the transesterification process is still typically considered a non-concentrated microbial oil (i.e., in ester form).

Enrichment of a microbial oil comprising 30 to 70 wt % of a desired PUFA, measured as a wt % of TFAs (wherein the microbial oil is obtained from an oil-containing microbe that accumulates in excess of 25% of its dry cell weight as oil) results in an oil concentrate which comprises at least 70 wt % of the desired PUFA, measured as a wt % of oil (i.e., an "oil concentrate"). Specifically, the ethyl or other esters of the microbial oil can be enriched in the desired PUFA (e.g., LA, EDA, GLA, DGLA, ARA, DTA, DPAn-6, ALA, STA, ETrA, ETA, EPA, DPAn-3, DHA) and separated by methods commonly used in the art, such as: fractional distillation, urea adduct formation, short path distillation, supercritical fluid fractionation with counter current column, supercritical fluid chromatography, liquid chromatography, enzymatic separation and treatment with silver salt, simulated moving bed chromatography, actual moving bed chromatography and combinations thereof.

Thus, for example, disclosed herein is a method for making an EPA concentrate comprising at least 70 wt % EPA, measured as a wt % of oil and substantially free of DHA, said method comprising:

a) transesterifying the lipid-containing fraction of the present invention comprising 30 to 70 wt % EPA, measured as a wt % of TFAs, and substantially free of DHA; and, b) enriching the transesterified oil of step (a) to obtain an EPA concentrate comprising at least 70 wt % EPA, measured as a wt % of oil, and substantially free of DHA.

For example, a non-concentrated purified microbial oil (i.e., the lipid-containing fraction) comprising 58.2% EPA, measured as a wt % of TFAs, and substantially free of DHA from *Yarrowia lipolytica* is provided in Example 27 herein. This lipid-containing fraction is enriched in Example 28 via a urea adduct formation method, such that the resulting EPA ethyl ester (EPA-EE) concentrate comprises 76.5% EPA-EE, measured as a wt % of oil, and is substantially free of DHA. Similarly, Example 29 demonstrates enrichment of the same lipid-containing fraction via liquid chromatography, wherein the resulting EPA-EE concentrate comprises 82.8% or 95.4% EPA-EE, measured as a wt % of oil, and is substantially free of DHA. Example 30 demonstrates enrichment of the same lipid-containing fraction via supercritical fluid chromatography, resulting in an EPA concentrate comprising 85% or 89.8% EPA-EE, measured as a wt % of oil, that is substantially free of DHA.

An alternate non-concentrated SPD-purified microbial oil (i.e., the lipid-containing fraction) comprising 56.1% EPA, measured as a wt % of TFAs, and substantially free of DHA from *Yarrowia lipolytica* is provided in Example 31. Enrichment of this lipid-containing fraction in Example 32 occurs via fractional distillation, thereby producing an EPA concentrate that comprises 73% EPA-EE, measured as a wt % of oil, and is substantially free of DHA. Fractional distillation advantageously removes many of the lower molecular weight ethyl esters present in the oil (i.e., predominantly C18s in the lipid-containing fraction of Example 32, but not limited thereto).

An alternate non-concentrated SPD-purified microbial oil (i.e., the lipid-containing fraction) comprising 54.7% EPA, measured as a wt % of TFAs, and substantially free of DHA, NDPA and HPA from *Yarrowia lipolytica* is provided in Example 34. Enrichment of this lipid-containing fraction occurs via fractional distillation and liquid chromatography, thereby producing an EPA concentrate that comprises 97.4% EPA-EE, measured as a wt % of oil, and is substantially free of DHA, NDPA and HPA. One of skill in the art should appreciate that other combinations of enrichment processes (e.g., fractional distillation, urea adduct formation, short path distillation, supercritical fluid fractionation with counter current column, supercritical fluid chromatography, liquid chromatography, enzymatic separation and treatment with silver salt, simulated moving bed chromatography, actual moving bed chromatography) could be utilized to produce an EPA concentrate of the present invention.

For example, it may be particularly advantageous to make an EPA concentrate comprising at least 70 wt % of EPA, measured as a wt % of oil, and substantially free of DHA, said method comprising: (a) a transesterification reaction of a lipid-containing fraction comprising 30 to 70 wt % of EPA, measured as a wt % of TFAs; (b) a first enrichment process comprising fractional distillation for removal of many of the lower molecular weight ethyl esters, i.e., comprising C14, C16 and C18 fatty acids; and, (c) at least one additional enrichment process selected from the group consisting of: urea adduct formation, liquid chromatography, supercritical fluid chromatography, simulated moving bed chromatography, actual moving bed chromatography and combinations thereof. Lower concentrations of C14, C16 and C18 fatty acids in the oil sample, as a result of fractional distillation, may facilitate subsequent enrichment processes.

As will be recognized by one of skill in the art, any of the EPA concentrates described above, in ethyl ester form, can readily be converted, if desired, to other forms such as, for example, a methyl ester, an acid or a triacylglyceride, or any other suitable form or a combination thereof. Means for chemical conversion of PUFAs from one derivative to another is well known. For example, triglycerides can be converted to sodium salts of the cleaved acids by saponification and further to free fatty acids by acidification, and ethyl esters can be re-esterified to triglycerides via glycerolysis. Thus, while it is expected that the EPA concentrate will initially be in the form of an ethyl ester, this is by no means intended as a limitation. The at least 70 wt % EPA, measured as a wt % of oil, within an EPA concentrate will therefore refer to EPA in the form of free fatty acids, triacylglycerols, esters, and combinations thereof, wherein the esters are most preferably in the form of ethyl esters.

One of ordinary skill in the art will appreciate that processing conditions can be optimized to result in any preferred level of PUFA enrichment of the lipid-containing fraction, such that the desired PUFA concentrate has at least 70 wt % desired PUFA, measured as a wt % of oil (although increased PUFA purity is often inversely related to PUFA yield). Thus, those skilled in the art will appreciate that the wt % of a desired PUFA can be any integer percentage (or fraction thereof) from 70% up to and including 100%, i.e., specifically, 70%, 71%, 72%, 73%, 74%, 75%, 76%, 77%, 78%, 79%, 80%, 81%, 82%, 83%, 84%, 85%, 86%, 87%, 88%, 89%, 90%, 91%, 92%, 93%, 94%, 95%, 96%, 97%, 98%, 99% and 100% the desired PUFA, measured as a wt % of oil.

More specifically, in one embodiment of the present invention, there is provided an EPA concentrate comprising at least 80 wt % of EPA, measured as a wt % of oil, and substantially free of DHA. In another embodiment, there is provided an EPA concentrate comprising at least 90 wt % of EPA, measured as a wt % of oil, and substantially free of DHA. And, in yet another embodiment, there is provided an EPA concentrate comprising at least 95 wt % of EPA, measured as a wt % of oil, and substantially free of DHA.

In preferred embodiments, the EPA concentrates described above, comprising at least 70 wt % EPA, measured as a wt % of oil, and substantially free of DHA can be further characterized as substantially free of NDPA and substantially free of HPA.

Although not limited to any particular application, the PUFA concentrates of the present invention are particularly well suited for use as a pharmaceutical. As is well known to one of skill in the art, PUFAs may be administered in a capsule, a tablet, a granule, a powder that can be dispersed in a beverage, or another solid oral dosage form, a liquid (e.g., syrup), a soft gel capsule, a coated soft gel capsule or other convenient dosage form such as oral liquid in a capsule. Capsules may be hard-shelled or soft-shelled and may be of a gelatin or vegetarian source. PUFAs may also be contained in a liquid suitable for injection or infusion.

Additionally, PUFAs may also be administered with a combination of one or more non-active pharmaceutical ingredients (also known generally herein as "excipients"). Non-active ingredients, for example, serve to solubilize, suspend, thicken, dilute, emulsify, stabilize, preserve, protect, color, flavor, and fashion the active ingredients into an applicable and efficacious preparation that is safe, convenient, and otherwise acceptable for use.

Excipients may include, but are not limited to, surfactants, such as propylene glycol monocaprylate, mixtures of glycerol and polyethylene glycol esters of long fatty acids, polyethoxylated castor oils, glycerol esters, oleoyl macrogol glycerides, propylene glycol monolaurate, propylene glycol dicaprylate/dicaprate, polyethylene-polypropylene glycol copolymer and polyoxyethylene sorbitan monooleate, cosolvents such as ethanol, glycerol, polyethylene glycol, and propylene glycol, and oils such as coconut, olive or safflower oils. The use of surfactants, cosolvents, oils or combinations thereof is generally known in the pharmaceutical arts, and as would be understood to one skilled in the art, any suitable surfactant may be used in conjunction with the present invention and embodiments thereof.

The dose concentration, dose schedule and period of administration of the composition should be sufficient for the expression of the intended action, and may be adequately adjusted depending on, for example, the dosage form, administration route, severity of the symptom(s), body weight, age and the like. When orally administered, the composition may be administered in three divided doses per day, although the composition may alternatively be administered in a single dose or in several divided doses.

Extracted oil compositions comprising at least one PUFA, such as EPA (or derivatives thereof), will have well known clinical and pharmaceutical value. See, e.g., U.S. Pat. Appl. Pub. No. 2009-0093543 A1. For example, lipid compositions comprising PUFAs may be used as dietary substitutes, or supplements, particularly infant formulas, for patients undergoing intravenous feeding or for preventing or treating malnutrition. Alternatively, the purified PUFAs (or derivatives thereof) may be incorporated into cooking oils, fats or margarines formulated so that in normal use the recipient would receive the desired amount for dietary supplementation. The PUFAs may also be incorporated into infant formulas, nutritional supplements or other food products and may find use as anti-inflammatory or cholesterol lowering agents. Optionally, the compositions may be used for pharmaceutical use, either human or veterinary.

Supplementation of humans or animals with PUFAs can result in increased levels of the added PUFAs, as well as their metabolic progeny. For example, treatment with EPA can result not only in increased levels of EPA, but also downstream products of EPA such as eicosanoids (i.e., prostaglandins, leukotrienes, thromboxanes), DPAn-3 and DHA. Complex regulatory mechanisms can make it desirable to combine various PUFAs, or add different conjugates of PUFAs, in order to prevent, control or overcome such mechanisms to achieve the desired levels of specific PUFAs in an individual.

Alternatively, PUFAs, or derivatives thereof, can be utilized in the synthesis of animal and aquaculture feeds, such as dry feeds, semi-moist and wet feeds, since these formulations generally require at least 1-2% of the nutrient composition to be omega-3 and/or omega-6 PUFAs.

Examples

The present invention is further defined in the following examples. It should be understood that these examples, while indicating preferred embodiments of the invention, are given by way of illustration only. From the above discussion and these examples, one skilled in the art can ascertain the essential characteristics of this invention, and without departing from the spirit and scope thereof, can make various changes and modifications of the invention to adapt it to various uses and conditions.

The following abbreviations are used: "HPLC" is High Performance Liquid Chromatography, "ASTM" is American Society for Testing And Materials, "C" is Celsius, "kPa" is kiloPascal, "mm" is millimeter, "μm" is micrometer, "4" is microliter, "mL" is milliliter, "L" is liter, "min" is minute, "mM" is millimolar, "mTorr" is milliTorr, "cm" is centimeter, "g" is gram, "wt" is weight, "h" or "hr" is hour, "temp" or "T" is temperature, "SS" is stainless steel, "in" is inch, "i.d." is inside diameter, and "o.d." is outside diameter.

Materials

Biomass Preparation

Described below are strains of *Yarrowia lipolytica* yeast producing various amounts of microbial oil comprising PUFAs. Biomass was obtained in a 2-stage fed-batch fermentation process, and then subjected to downstream processing, as described below.

*Yarrowia lipolytica* Strains:

The generation of *Yarrowia lipolytica* strain Y8672 is described in U.S. Pat. Appl. Pub. No. 2010-0317072-A1. Strain Y8672, derived from *Y. lipolytica* ATCC #20362, was capable of producing about 61.8% EPA relative to the total lipids via expression of a delta-9 elongase/delta-8 desaturase pathway.

The final genotype of strain Y8672 with respect to wild type *Yarrowia lipolytica* ATCC #20362 was Ura+, Pex3-, unknown 1-, unknown 2-, unknown 3-, unknown 4-, unknown 5-, unknown 6-, unknown 7-, unknown 8-, Leu+, Lys+, YAT1::ME3S::Pex16, GPD::ME3S::Pex20, GPD:: FmD12::Pex20, YAT1::FmD12::Oct, EXP1::FmD12S:: ACO, GPAT::EgD9e::Lip2, FBAlNm::EgD9eS::Lip2, EXP1::EgD9eS::Lip1, YAT1::EgD9eS::Lip2, FBAlNm:: EgD8M::Pex20, FBAlN::EgD8M::Lip1, EXP1::EgD8M:: Pex16, GPD::EaD8S::Pex16 (2 copies), YAT1::E389D9eS/ EgD8M::Lip1, YAT1::EgD9eS/EgD8M::Aco, FBAlN:: EgD5SM::Pex20, YAT1::EgD5SM::Aco, GPM::EgD5SM:: Oct, EXP1::EgD5M::Pex16, EXP1::EgD5SM::Lip1, YAT1:: EaD5SM::Oct, YAT1::PaD17S::Lip1, EXP1::PaD17::Pex16, FBAlNm::PaD17::Aco, GPD::YlCPT1::Aco, and YAT1:: MCS::Lip1.

The structure of the above expression cassettes are represented by a simple notation system of "X::Y::Z", wherein X describes the promoter fragment, Y describes the gene fragment, and Z describes the terminator fragment, which are all operably linked to one another. Abbreviations are as follows: FmD12 is a *Fusarium moniliforme* delta-12 desaturase gene [U.S. Pat. No. 7,504,259]; FmD12S is a codon-optimized delta-12 desaturase gene, derived from *F. moniliforme* [U.S. Pat. No. 7,504,259]; ME3S is a codon-optimized $C_{16/18}$ elongase gene, derived from *Mortierella alpina* [U.S. Pat. No. 7,470,532]; EgD9e is a *Euglena gracilis* delta-9 elongase gene [U.S. Pat. No. 7,645,604]; EgD9eS is a codon-optimized delta-9 elongase gene, derived from *E. gracilis* [U.S. Pat. No. 7,645,604]; EgD8M is a synthetic mutant delta-8 desaturase gene [U.S. Pat. No. 7,709,239], derived from *E. gracilis* [U.S. Pat. No. 7,256,033]; EaD8S is a codon-optimized delta-8 desaturase gene, derived from *Euglena anabaena* [U.S. Pat. No. 7,790,156]; E389D9eS/EgD8M is a DGLA synthase created by linking a codon-optimized delta-9 elongase gene ("E389D9eS"), derived from *Eutreptiella* sp. CCMP389 delta-9 elongase (U.S. Pat. No. 7,645,604) to the delta-8 desaturase "EgD8M" (supra) [U.S. Pat. Appl. Pub. No. 2008-0254191-A1]; EgD9ES/EgD8M is a DGLA synthase created by linking the delta-9 elongase "EgD9eS" (supra) to the delta-8 desaturase "EgD8M" (supra) [U.S. Pat. Appl. Pub. No. 2008-0254191-A1]; EgD5M and EgD5SM are synthetic mutant delta-5 desaturase genes [U.S. Pat. App. Pub. 2010-0075386-A1], derived from E. gracilis [U.S. Pat. No. 7,678,560]; EaD5SM is a synthetic mutant delta-5 desaturase gene [U.S. Pat. App. Pub. 2010-0075386-A1], derived from E. anabaena [U.S. Pat. No. 7,943,365]; PaD17 is a *Pythium aphanidermatum* delta-17 desaturase gene [U.S. Pat. No. 7,556,949]; PaD17S is a codon-optimized delta-17 desaturase gene, derived from *P. aphanidermatum* [U.S. Pat. No. 7,556,949]; YlCPT1 is a *Y. lipolytica* diacylglycerol cholinephosphotransferase gene [U.S. Pat. No. 7,932,077]; and, MCS is a codon-optimized malonyl-CoA synthetase gene, derived from *Rhizobium leguminosarum* by. viciae 3841 [U.S. Pat. App. Pub. 2010-0159558-A1].

For a detailed analysis of the total lipid content and composition in strain Y8672, a flask assay was conducted wherein cells were grown in 2 stages for a total of 7 days. Based on analyses, strain Y8672 produced 3.3 g/L dry cell weight ["DCW"], total lipid content of the cells was 26.5 ["TFAs % DCW"], the EPA content as a percent of the dry cell weight ["EPA % DCW"] was 16.4, and the lipid profile was as follows, wherein the concentration of each fatty acid is as a weight percent of TFAs ["% TFAs"]: 16:0 (palmitate)-2.3, 16:1 (palmitoleic acid)—0.4, 18:0 (stearic acid)—2.0, 18:1 (oleic acid)—4.0, 18:2 (LA)—16.1, ALA-1.4, EDA-1.8, DGLA—1.6, ARA-0.7, ETrA-0.4, ETA-1.1, EPA-61.8, other—6.4.

The generation of *Yarrowia lipolytica* strain Y9502 is described in U.S. Pat. Appl. Pub. No. 2010-0317072-A1, hereby incorporated herein by reference in its entirety. Strain Y9502, derived from *Y. lipolytica* ATCC #20362, was capable of producing about 57.0% EPA relative to the total lipids via expression of a delta-9 elongase/delta-8 desaturase pathway.

The final genotype of strain Y9502 with respect to wildtype *Y. lipolytica* ATCC #20362 was Ura+, Pex3-, unknown 1-, unknown 2-, unknown 3-, unknown 4-, unknown 5-, unknown6-, unknown 7-, unknown 8-, unknown9-, unknown 10-, YAT1::ME3S::Pex16, GPD::ME3S::Pex20, YAT1:: ME3S::Lip1, FBAlNm::EgD9eS::Lip2, EXP1::EgD9eS:: Lip1, GPAT::EgD9e::Lip2, YAT1::EgD9eS::Lip2, FBAlNm::EgD8M::Pex20, EXP1::EgD8M::Pex16, FBAlN:: EgD8M::Lip1, GPD::EaD8S::Pex16 (2 copies), YAT1:: E389D9eS/EgD8M::Lip1, YAT1::EgD9eS/EgD8M::Aco, FBAlNm::EaD9eS/EaD8S::Lip2, GPD::FmD12::Pex20, YAT1::FmD12::Oct, EXP1::FmD12S::Aco, GPDIN:: FmD12::Pex16, EXP1::EgD5M::Pex16, FBAlN::EgD5SM:: Pex20, GPDIN::EgD5SM::Aco, GPM::EgD5SM::Oct, EXP1::EgD5SM::Lip1, YAT1::EaD5SM::Oct, FBAlNm:: PaD17::Aco, EXP1::PaD17::Pex16, YAT1::PaD17S::Lip1, YAT1::YlCPT::Aco, YAT1::MCS::Lip1, FBA::MCS::Lip1, YAT1::MaLPAAT1S::Pex16.

Abbreviations not previously defined are as follows: EaD9eS/EgD8M is a DGLA synthase created by linking a codon-optimized delta-9 elongase gene ("EaD9eS"), derived from *Euglena anabaena* delta-9 elongase [U.S. Pat. No. 7,794,701] to the delta-8 desaturase "EgD8M" (supra) [U.S. Pat. Appl. Pub. No. 2008-0254191-A1]; and, MaLPAAT1S is a codon-optimized lysophosphatidic acid acyltransferase gene, derived from *Mortierella alpina* [U.S. Pat. No. 7,879,591].

For a detailed analysis of the total lipid content and composition in strain Y9502, a flask assay was conducted wherein cells were grown in 2 stages for a total of 7 days. Based on analyses, strain Y9502 produced 3.8 g/L dry cell weight ["DCW"], total lipid content of the cells was 37.1 ["TFAs % DCW"], the EPA content as a percent of the dry cell weight ["EPA % DCW"] was 21.3, and the lipid profile was as follows, wherein the concentration of each fatty acid is as a weight percent of TFAs ["% TFAs"]: 16:0 (palmitate)-2.5, 16:1 (palmitoleic acid)—0.5, 18:0 (stearic acid)—2.9, 18:1 (oleic acid)—5.0, 18:2 (LA)-12.7, ALA-0.9, EDA-3.5, DGLA-3.3, ARA-0.8, ETrA-0.7, ETA-2.4, EPA-57.0, other-7.5.

The generation of *Yarrowia lipolytica* strain Y4305F1 B1, derived from *Y. lipolytica* ATCC #20362 and capable of producing about 50-52% EPA relative to the total lipids with 28-32% total lipid content ["TFAs DCW"] via expression of a delta-9 elongase/delta-8 desaturase pathway, is described in U.S. Pat. Appl. Pub. No. 2011-0059204-A1, hereby incorporated herein by reference in its entirety. Specifically, strain Y4305F1B1 is derived from *Y. lipolytica* strain Y4305, which has been previously described in the General Methods of U.S. Pat. App. Pub. No. 2008-0254191, the disclosure of which is hereby incorporated in its entirety.

The final genotype of strain Y4305 with respect to wild type *Y. lipolytica* ATCC #20362 was SCP2-(YALI0E01298g), YALI0C18711g-, Pex10-, YALI0F24167g-, unknown 1-, unknown 3-, unknown 8-, GPD::FmD12::Pex20, YAT1::FmD12::OCT, GPM/FBAIN::FmD12S::OCT, EXP1::FmD12S::Aco, YAT1::FmD12S::Lip2, YAT1::ME3S::Pex16, EXP1::ME3S::Pex20 (3 copies), GPAT::EgD9e::Lip2, EXP1::EgD9eS::Lip1, FBAINm::EgD9eS::Lip2, FBA::EgD9eS::Pex20, GPD::EgD9eS::Lip2, YAT1::EgD9eS::Lip2, YAT1::E389D9eS::OCT, FBAINm::EgD8M::Pex20, FBAIN::EgD8M::Lip1 (2 copies), EXP1::EgD8M::Pex16, GPDIN::EgD8M::Lip1, YAT1::EgD8M::Aco, FBAIN::EgD5::Aco, EXP1::EgD5S::Pex20, YAT1::EgD5S::Aco, EXP1::EgD5S::ACO, YAT1::RD5S::OCT, YAT1::PaD17S::Lip1, EXP1::PaD17::Pex16, FBAINm::PaD17::Aco, YAT1::YICPT1::ACO, GPD::YICPT1::ACO.

Abbreviations not previously defined are as follows: EgD5 is a *Euglena gracilis* delta-5 desaturase [U.S. Pat. No. 7,678,560]; EgDSS is a codon-optimized delta-5 desaturase gene, derived from *E. gracilis* [U.S. Pat. No. 7,678,560]; and, RDSS is a codon-optimized delta-5 desaturase, derived from *Peridinium* sp. CCMP626 [U.S. Pat. No. 7,695,950].

Total lipid content of the Y4305 cells was 27.5 ["TFAs % DCW"], and the lipid profile was as follows, wherein the concentration of each fatty acid is as a weight percent of TFAs ["% TFAs"]: 16:0 (palmitate)-2.8, 16:1 (palmitoleic acid)—0.7, 18:0 (stearic acid)-1.3, 18:1 (oleic acid)-4.9, 18:2 (LA)-17.6, ALA-2.3, EDA-3.4, DGLA-2.0, ARA-0.6, ETA-1.7 and EPA-53.2.

Strain Y4305 was subjected to transformation with a dominant, non-antibiotic marker for *Y. lipolytica* based on sulfonylurea ["$SU^R$"] resistance. More specifically, the marker gene is a native acetohydroxyacid synthase ("AHAS" or acetolactate synthase; E.G. 4.1.3.18) that has a single amino acid change, i.e., W497L, that confers sulfonyl urea herbicide resistance (SEQ ID NO:292 of Intl. App. Pub. No. WO 2006/052870). The random integration of the $SU^R$ genetic marker into *Yarrowia* strain Y4305 was used to identify those cells having increased lipid content when grown under oleaginous conditions relative to the parent Y4305 strain, as described in U.S. Pat. App. Pub. No. 2011-0059204-A1.

When evaluated under 2 liter fermentation conditions, average EPA productivity ["EPA % DOW"] for strain Y4305 was 50-56, as compared to 50-52 for mutant $SU^R$ strain Y4305-F1 B1. Average lipid content ["TFAs DOW"] for strain Y4305 was 20-25, as compared to 28-32 for strain Y4305-F1 B1. Thus, lipid content was increased 29-38% in strain Y4503-F1B1, with minimal impact upon EPA productivity.

Fermentation:

Inocula were prepared from frozen cultures of *Y. lipolytica* in a shake flask. After an incubation period, the culture was used to inoculate a seed fermentor. When the seed culture reached an appropriate target cell density, it was then used to inoculate a larger fermentor. The fermentation is a 2-stage fed-batch process. In the first stage, the yeast were cultured under conditions that promote rapid growth to a high cell density; the culture medium comprised glucose, various nitrogen sources, trace metals and vitamins. In the second stage, the yeast were starved for nitrogen and continuously fed glucose to promote lipid and PUFA accumulation. Process variables including temperature (controlled between 30-32° C.), pH (controlled between 5-7), dissolved oxygen concentration and glucose concentration were monitored and controlled per standard operating conditions to ensure consistent process performance and final PUFA oil quality.

One of skill in the art of fermentation will know that variability will occur in the oil profile of a specific *Yarrowia* strain, depending on the fermentation run itself, media conditions, process parameters, scale-up, etc., as well as the particular time-point in which the culture is sampled (see, e.g., U.S. Pat. Appl. Pub. No. 2009-0093543-A1).

Downstream Processing:

Antioxidants were optionally added to the fermentation broth prior to processing to ensure the oxidative stability of the EPA oil. The yeast biomass was dewatered and washed to remove salts and residual medium, and to minimize lipase activity. Either drum-drying (typically with 80 psig steam) or spray-drying was then performed, to reduce moisture level to less than 5% to ensure oil stability during short term storage and transportation. The drum dried flakes, or spray dried powder having particle size distribution in range of about 10 to 100 micron, were used in the following Comparative Examples and Examples, as the initial "microbial biomass, comprising oil-containing microbes".

Grinding Agents:

Celite 209 D-earth is available from Celite Corporation, Lompoc, Calif. Celatom MN-4 D-earth is available from EP Minerals, An Eagle Pitcher Company, Reno, Nev.

Other Materials:

All commercial reagents were used as received. All solvents used were HPLC grade. Acetyl chloride was 99-F %. TLC plates and solvents were obtained from VWR (West Chester, Pa.). HPLC or SCF grade carbon dioxide was obtained from MG Industries (Malvern, Pa.).

Twin Screw Extrusion Method

Twin screw extrusion was used in disrupting dried yeast biomass and preparing disrupted biomass mix with grinding agents.

Dried yeast is fed into an extruder, preferably a twin screw extruder with a length, normally 21-39 L/D, suitable for accomplishing the operations described below. The first section of the extruder is used to feed and transport the materials. The second section is a compaction zone designed to compact and compress the feed using bushing elements with progressively shorter pitch length. After the compaction zone, a compression zone follows which serves to impart most of the mechanical energy required for cell disruption. This zone is created using flow restriction either in the form of reverse screw elements, restriction/blister ring elements or kneading elements. When preparing disrupted biomass, the grinding agent (e.g., D-earth) is typically co-fed with the microbial biomass feed so that both go through the compression/compaction zone, thus enhancing disruption levels. Following the compression zone, the binding agent (e.g., water/sucrose solution) is added through a liquid injection port and mixed in subsequent mixing sections comprised of various combinations of mixing elements. The final mixture (i.e., the "fixable mix") is discharged through the last barrel which is open at the end, thus producing little or no backpressure in the extruder. The fixable mix is then fed into a dome granulator and either a vibrating or a fluidized bed drier. This results in pelletized material (i.e., solid pellets) suitable for downstream oil extraction.

SCF Extraction with $CO_2$

Dried and mechanically disrupted yeast cells were generally charged to an extraction vessel packed between plugs of glass wool, flushed with $CO_2$, and then heated and pressurized to the desired operating conditions under $CO_2$ flow. The $CO_2$ was fed directly from a commercial cylinder equipped with an eductor tube and was metered with a high-pressure pump. Pressure was maintained on the extraction vessel through use of a restrictor on the effluent side of the vessel, and the oil sample was collected in a sample vessel while simultaneously venting the $CO_2$ solvent to the atmosphere. A cosolvent (e.g., ethanol) could optionally be added to the extraction solvent fed to the extraction vessel through use of a cosolvent pump (Isco Model 100D syringe pump).

Unless otherwise noted, supercritical $CO_2$ extraction of yeast samples in the examples below was conducted in a custom high-pressure extraction apparatus (FIG. 1). In general, dried and mechanically disrupted yeast cells (free flowing or pelletized) were charged to an extraction vessel (1) packed between plugs of glass wool, flushed with $CO_2$, and then heated and pressurized to the desired operating conditions under $CO_2$ flow. The 89-ml extraction vessels were fabricated from 316 SS tubing (2.54 cm o.d.×1.93 cm i.d.× 30.5 cm long) and equipped with a 2-micron sintered metal filter on the effluent end of the vessel. The extraction vessel was installed inside of a custom machined aluminum block equipped with four calrod heating cartridges which were controlled by an automated temperature controller. The $CO_2$ was fed as a liquid directly from a commercial cylinder (2) equipped with an eductor tube and was metered with a high-pressure positive displacement pump (3) equipped with a refrigerated head assembly (Jasco Model PU-1580-002). Extraction pressure was maintained with an automated back pressure regulator (4) (Jasco Model BP-1580-81) which provided a flow restriction on the effluent side of the vessel, and the extracted oil sample was collected in a sample vessel while simultaneously venting the $CO_2$ solvent to the atmosphere.

Reported oil extraction yields from the yeast samples were determined gravimetrically by measuring the mass loss from the sample during the extraction. Thus, the reported extracted oil comprises microbial oil and moisture associated with the solid pellets.

EXAMPLES

Comparative Examples C1, C2A, C2B, Example 1, Example 2 and Comparative Examples C3 And C4

Comparison of Means to Create a Disrupted Biomass Mix from Drum-Dried Flakes of *Yarrowia lipolytica*

Comparative Examples C1, C2A, C2B, C3 and C4 and Examples 1 and 2 describe a series of comparative tests performed to optimize disruption of drum dried flakes of yeast (i.e., *Yarrowia lipolytica* strain Y8672). Specifically, hammer milling with and without the addition of grinding agent was examined, as well as use of either a single screw or twin screw extruder. Results are compared based on the total free microbial oil and disruption efficiency of the microbial cells, as well as the total extraction yield (based on supercritical $CO_2$ extraction).

Comparative Example C1

Hammer-Milled Yeast Powder without Grinding Agent

Drum dried flakes of yeast (*Y. lipolytica* strain Y8672) biomass containing 24.2% total oil (dry weight) were hammer-milled (Mikropul Bantam mill at a feed rate of 12 Kg/h) at ambient temperature using a jump-gap separator at 16,000 rpm with three hammers to provide milled powder. Particle size of the milled powder was d10=3 µm; d50=16 µm and d90=108 µm, analyzed suspended in water using Frauenhofer laser diffraction.

Comparative Example C2A

Hammer-Milled Yeast Powder with Grinding Agent and Air Mill Mixing

The hammer-milled yeast powder provided by Comparative Example C1 (833 g) was mixed with Celite 209 diatomaceous earth (D-earth) (167 g) in an air (jet) mill (Fluid Energy Jet-o-mizer 0101, at a feed rate of 6 Kg/h) for about 20 min at ambient temperature.

Comparative Example C2B

Hammer-Milled Yeast Powder with Grinding Agent and Manual Mixing

Hammer-milled yeast powder provided by Comparative Example C1 (833 g) was mixed manually with Celite 209 D-earth (167 g) in a plastic bag.

Example 1

Hammer Milled Yeast Powder with Grinding Agent, Manual Mixing, and Single Screw Extruder The hammer-milled yeast powder with D-earth from Comparative Example C2B (1000 g) was mixed with a 17.6 wt % aqueous sucrose solution (62.5 g sucrose in 291.6 g water) in a Hobart mixer for about 2.5 min and then extruded (50-200 psi, torque not exceeding 550 in-lbs; 40° C. or less extrudate temperature) through a single screw dome granulator having 1 mm orifices. The extrudate was dried in a fluid bed dryer to a bed temperature of 50° C. using fluidizing air controlled at 65° C. to provide non-sticky pellets (815 g, having dimensions of 2 to 8 mm length and about 1 mm diameter) having 3.9% water remaining after about 14 min.

Example 2

Hammer Milled Yeast Powder with Grinding Agent, Air Mill Mixing, and Single Screw Extruder The hammer milled yeast powder with D-earth from Comparative Example C2A (1000 g) was processed according to Example 1 to provide pellets (855 g, having dimensions of 2 to 8 mm length and about 1 mm diameter) having 6.9% water remaining after about 10 min.

Comparative Example C3

Hammer Milled Yeast Powder without Grinding Agent and with Twin Screw Extruder

The hammer milled yeast powder provided from Comparative Example C1 was fed at 2.3 kg/hr to an 18 mm twin screw extruder (Coperion Werner Pfleiderer ZSK-18 mm MC, Stuttgart, Germany) operating with a 10 kW motor and high torque shaft, at 150 rpm and ° A) torque range of 66-68 to provide a disrupted yeast powder cooled to 26° C. in a final water cooled barrel.

Comparative Example C4

Yeast Powder without Grinding Agent and with Twin Screw Extruder

Drum dried flakes of yeast (*Y. lipolytica* strain Y8672) biomass containing 24.2% total oil were fed at 2.3 kg/hr to an 18 mm twin screw extruder (Coperion Werner Pfleiderer ZSK-18 mm MC) operating with a 10 kW motor and high torque shaft, at 150 rpm and % torque range of 71-73 to provide a disrupted yeast powder cooled to 23° C. in a final water cooled barrel.

Comparison of Free Microbial Oil and Disruption Efficiency in Disrupted Yeast Powder The free microbial oil and disruption efficiency was determined in the disrupted yeast powders of Examples 1 and 2, and Comparative Examples C1-C4 according to the following method. Specifically, free oil and total oil content of extruded biomass samples were determined using a modified version of the method reported by Troeng (*J. Amer. Oil Chemists Soc.*, 32:124-126 (1955)). In this method, a sample of the extruded biomass was weighed into a stainless steel centrifuge tube with a measured volume of hexane. Several chrome steel ball bearings were added if total oil was to be determined. The ball bearings were not used if free oil was to be determined. The tubes were then capped and placed on a shaker for 2 hr. The shaken samples were centrifuged, the supernatant was collected and the volume measured. The hexane was evaporated from the supernatant first by rotary film evaporation and then by evaporation under a stream of dry nitrogen until a constant weight was obtained. This weight was then used to calculate the percentage of free or total oil in the original sample. The oil content is expressed on a percent dry weight basis by measuring the moisture content of the sample, and correcting as appropriate.

The percent disruption efficiency (i.e., the percent of cells walls that have been fractured during processing) was quantified by optical visualization.

Table 7 summarizes the yeast cell disruption efficiency data for Examples 1 and 2, and Comparative Examples C1-C4, and reveals the following:

Comparative Example C1 shows that Hammer milling in the absence of grinding agent results in 33% disruption of the yeast cells.

Comparative Example C2A shows that air jet milling of Hammer-milled yeast in the presence of grinding agent increases the disruption of the yeast cells to 62%.

Example 1 shows that further mixing of Hammer-milled yeast (from Comparative Example C1) in a Hobart single-screw mixer in the presence of grinding agent increases the disruption of the yeast cells to 38%.

Example 2 shows that further mixing of air-milled and Hammer-milled yeast with grinding agent (from Comparative Example C2A) in a Hobart single-screw mixer increases the disruption of the yeast cells to 57%.

Comparative Examples C3 and C4 show that in the absence of grinding agent and with or without Hammer-milling (respectively), using twin screw extrusion with a compression zone, the yeast cell disruption was greater than 80%.

TABLE 7

Comparison Of Yeast Cell Disruption Efficiency

| Example | Free Oil % DWT | Disruption Efficiency, % |
|---|---|---|
| C1 | 8 | 33 |
| C2A * | 12.6 | 62 |
| 1 * | 9.2 | 38 |
| 2 * | 13.8 | 57 |
| C3 | 19.6 | 82 |
| C4 | 21 | 87 |

* The free oil liberated is normalized using the actual weight fraction of biomass in the pellet in Example 1, Example 2 and Comparative Example C2A.

SCF Extraction

The extraction vessel was charged with approximately 25 g (yeast basis) of disrupted yeast biomass from Comparative Examples C1, C2A and C4, respectively. The yeast were flushed with $CO_2$, then heated to approximately 40° C. and pressurized to approximately 311 bar. The yeast were extracted at these conditions at a flow rate of 4.3 g/min $CO_2$ for approximately 6.7 hr, giving a final solvent-to-feed (S/F) ratio of about 75 g $CO_2$/g yeast. Extraction yields are reported in the Table below.

The data show that higher cell disruption leads to significantly higher extraction yields, measured as the weight percent of crude extracted oil.

TABLE 8

Comparison Of Cell Disruption Efficiency And Oil Extraction

| Example | Yeast Charge (g Dry weight) | Cell disruption efficiency (%) | Temp. (° C.) | Pressure (bar) | Time (hr) | S/F ratio (g $CO_2$/ g yeast) | Extracted Oil Yield (wt %) |
|---|---|---|---|---|---|---|---|
| C1 | 25.1 | 33 | 40 | 310 | 6.6 | 74.7 | 7.5 |
| C2A | 25.0 | 52 | 40 | 311 | 6.8 | 76.7 | 8.9 |
| C4 | 25.2 | 87 | 41 | 310 | 6.7 | 74.4 | 18.8 |

Comparative Examples C5A, C5B, C5C, C6A, C6B And C6C

Comparison of Means to Create a Disrupted Biomass Mix from *Yarrowia lipolytica*

Comparative Examples C5A, C5B, C5C, C6A, C6B and C6C describe a series of comparative tests performed to prepare disrupted yeast powder, wherein the initial microbial biomass was either drum dried flakes or spray-dried powder of yeast, mixed with or without a grinding agent in a twin-screw extruder.

In each of Comparative Examples C5A, C5B, C5C, C6A, C6B and C6C, the initial yeast biomass was from *Yarrowia lipolytica* strain Y9502, having a moisture level of 2.8% and containing approximately 36% total oil. The dried yeast flakes or powder (with or without grinding agent) were fed to an 18 mm twin screw extruder (Coperion Werner Pfleiderer ZSK-18 mm MC) operating with a 10 kW motor and high torque shaft, at 150 rpm. The resulting disrupted yeast powder was cooled in a final water cooled barrel.

The disrupted yeast powder prepared in Comparative Examples C5A, C5B, C5C, C6A, C6B and C6C was then subjected to supercritical $CO_2$ extraction and total extraction yields were compared.

Comparative Example C5A

Drum-Dried Yeast Flakes without Grinding Agent

Drum dried flakes of yeast biomass were fed at 2.3 kg/hr to the twin screw extruder operating with a % torque range of 34-35. The disrupted yeast powder was cooled to 27° C.

Comparative Example C5B

Drum-Dried Yeast Flakes with Grinding Agent 92.5 parts of drum dried flakes of yeast biomass were premixed in a bag with 7.5 parts of Celite 209 D-earth. The resultant dry mix was fed at 2.3 kg/hr to the twin screw extruder operating with a % torque range of 44-47. The disrupted yeast powder was cooled to 29° C.

Comparative Example C5C

Drum-Dried Yeast Flakes with Grinding Agent 85 parts of drum dried flakes of yeast biomass were premixed in a bag with 15 parts of Celite 209 D-earth. The resultant dry mix was fed at 2.3 kg/hr to the twin screw extruder operating with a % torque range of 48-51. The disrupted yeast powder was cooled to 29° C.

Comparative Example C6A

Spray-Dried Yeast Powder without Grinding Agent

Spray dried powder of yeast biomass were fed at 1.8 kg/hr to the twin screw extruder operating with a % torque range of 33-34. The disrupted yeast powder was cooled to 26° C.

Comparative Example C6B

Spray-Dried Yeast Powder with Grinding Agent 92.5 parts of spray dried powder of yeast biomass were premixed in a bag with 7.5 parts of Celite 209 D-earth. The resultant dry mix was fed at 1.8 kg/hr to the twin screw extruder operating with a % torque range of 37-38. The disrupted yeast powder was cooled to 26° C.

Comparative Example C6C

Spray-Dried Yeast Powder with Grinding Agent 85 parts of spray dried powder of yeast biomass were premixed in a bag with 15 parts of D-earth (Celite 209). The resultant dry mix was fed at 1.8 kg/hr to the twin screw extruder operating with a % torque range of 38-39. The disrupted yeast powder was cooled to 27° C.

SCF Extraction

The extraction vessel was charged with 11.7 g (yeast basis) of disrupted yeast biomass from Comparative Examples C5A, C5B, C5C, C6A, C6B and C6C, respectively. The yeast was flushed with $CO_2$, then heated to approximately 40° C. and pressurized to approximately 311 bar. The yeast samples were extracted at these conditions at a flow rate of 4.3 g/min $CO_2$ for 3.2 hr, giving a final solvent-to-feed (S/F) ratio of approximately 75 g $CO_2$/g yeast. Extraction yields for various formulations are reported in Table 9.

The data show that samples having D-earth as a grinding agent (i.e., Comparative Examples C5B, C5C, C6B and C6C) lead to higher extraction yields than those wherein D-earth was not present (i.e., Comparative Examples C5A and C6A).

TABLE 9

Comparison Of Oil Extraction Of Disrupted Yeast With And Without Grinding Agent

| Example | Yeast Charge (g Dry weight) | Temp. (° C.) | Pressure (bar) | $CO_2$ Flow Rate (g/min) | Time (hr) | S/F ratio (g $CO_2$/ g yeast) | Extracted Oil Yield (wt %) |
|---|---|---|---|---|---|---|---|
| C5A | 11.7 | 40 | 311 | 4.3 | 3.2 | 76.4 | 31.8 |
| C5B | 11.7 | 41 | 312 | 4.3 | 3.2 | 76.6 | 35.4 |
| C5C | 11.7 | 40 | 312 | 4.3 | 3.2 | 76.7 | 35.1 |
| C6A | 11.7 | 40 | 311 | 4.3 | 3.2 | 76.4 | 30.5 |
| C6B | 11.7 | 40 | 311 | 4.3 | 3.2 | 76.6 | 37.9 |
| C6C | 11.7 | 40 | 311 | 4.3 | 3.2 | 76.7 | 38.8 |

Examples 3, 4, 5, 6, 7, 8, 9 and 10

Comparison of Means to Create Solid Pellets from *Yarrowia lipolytica*

Examples 3-10 describe a series of comparative tests performed to mix spray dried powder or drum-dried flakes of yeast biomass with a grinding agent and binding agent, to provide solid pellets comprising disrupted microbial biomass.

In each of Examples 3-10, the initial yeast biomass was from *Yarrowia lipolytica* strain Y9502, having a moisture level of 2.8% and containing approximately 36% total oil. Following preparation of solid pellets, approximately 1 mm diameter X 2 to 8 mm in length, the pellets were subjected to supercritical $CO_2$ extraction and total extraction yields were compared. Mechanical compression properties and attrition resistance of the solid pellets were also analyzed.

Example 3

85 parts of spray dried powder of yeast biomass were premixed in a bag with 15 parts of Celatom MN-4 D-earth. The resultant dry mix was fed at 2.3 kg/hr to an 18 mm twin screw extruder (Coperion Werner Pfleiderer ZSK-18 mm MC). Along with the dry feed, a water/sugar solution made of 14 parts water and 5.1 parts sugar was injected after the disruption zone of the extruder at a flow-rate of 8.2 ml/min. The extruder was operating with a 10 kW motor and high torque shaft, at 150 rpm and % torque range of 58-60 to provide a disrupted yeast powder cooled to 24° C. in a final water cooled barrel.

The fixable mix was then fed into a MG-55 LCI Dome Granulator assembled with 1 mm hole diameter by 1 mm thick screen and set to 70 RPM. Extrudates were formed at 67.5 kg/hr and a steady 2.7 amp current. The sample was dried in a Sherwood Dryer for 10 min to provide solid pellets having a final moisture level of 7.1%.

Example 4

A fixable mix prepared according to Example 3 was passed through a granulator at 45 RPM. Extrudates were formed at 31.7 kg/hr and dried in a Sherwood Dryer for 10 min to provide solid pellets having a final moisture level of 8.15%.

Example 5

A fixable mix prepared according to Example 3 was passed through a granulator at 90 RPM. Extrudate pellets were dried in a MDB-400 Fluid Bed Dryer for 15 min to provide solid pellets having a final moisture level of 4.53%.

Example 6

85 parts of spray dried powder of yeast biomass were premixed in a bag with 15 parts of Celatom MN-4 D-earth. The resultant dry mix was fed at 2.3 kg/hr to an 18 mm twin screw extruder (Coperion Werner Pfleiderer ZSK-18 mm MC) operating with a 10 kW motor and high torque shaft, at 150 rpm and % torque range of 70-74 to provide a disrupted yeast powder cooled to 31° C. in a final water cooled barrel.

The disrupted yeast powder was then mixed in a Kitchen Aid mixer with a 22.6% solution of sucrose and water (i.e., 17.5 parts water and 5.1 parts sugar). The total mix time was 4.5 min with the solution added over the first 2 min.

The fixable mix was fed to a MG-55 LCI Dome Granulator assembled with 1 mm hole diameter by 1 mm thick screen and set to 70 RPM. Extrudates were formed at 71.4 kg/hr and a steady 2.7 amp current. The sample was dried in a Sherwood Dryer for a total of 20 min to provide solid pellets having a final moisture level of 6.5%.

Example 7

Disrupted yeast powder prepared according to Example 6 was placed in a KDHJ-20 Batch Sigma Blade Kneader with a 22.6% solution of sucrose and water (i.e., 17.5 parts water and 5.1 parts sugar). The total mix time was 3.5 min with the solution added over the first 2 min.

The fixable mix was fed to a MG-55 LCI Dome Granulator assembled with 1 mm hole diameter by 1 mm thick screen and set to 90 RPM. Extrudates were formed at 47.5 kg/hr and a steady 2.3 amp current. The sample was dried in a Sherwood Dryer for a total of 15 min to provide solid pellets having a final moisture level of 7.4%.

Example 8

Drum dried flakes of yeast biomass were fed at 1.8 kg/hr to an 18 mm twin screw extruder (Coperion Werner Pfleiderer ZSK-18 mm MC) operating with a 10 kW motor and high torque shaft, at 150 rpm and % torque range of 38-40 to provide a disrupted yeast powder cooled to 30° C. in a final water cooled barrel.

The disrupted yeast powder (69.5 parts) was mixed in a Kitchen Aid mixer with 12.2% Celite 209 D-earth (12.2 parts) and an aqueous sucrose solution (18.3 parts) made from a 3.3 ratio of water to sugar. The total mix time was 4.5 min with the solution added over the first 2 min.

The fixable mix was fed to a MG-55 LCI Dome Granulator assembled with 1 mm hole diameter by 1 mm thick screen and set to 90 RPM. Extrudates were formed at 68.2 kg/hr and a steady 2.5 amp current. The sample was dried in a Sherwood Dryer for a total of 15 min to provide solid pellets having a final moisture level of 6.83%.

Example 9

Drum dried flakes of yeast biomass (85 parts) were premixed in a bag with 15 parts of Celite 209 D-earth. The resultant dry mix was fed at 2.3 kg/hr to an 18 mm twin screw extruder (Coperion Werner Pfleiderer ZSK-18 mm MC). Along with the dry feed, a water/sugar solution made of 14 parts water and 5.1 parts sugar was injected after the disruption zone of the extruder at a flowrate of 8.2 ml/min. The extruder was operating with a 10 kW motor and high torque shaft, at 150 rpm and % torque range of 61-65 to provide a disrupted yeast powder cooled to 25° C. in a final water cooled barrel.

The fixable mix was then fed into a MG-55 LCI Dome Granulator assembled with 1 mm hole diameter by 1 mm thick screen and set to 90 RPM. Extrudates were formed at 81.4 kg/hr and a steady 2.5 amp current. The sample was dried in a Sherwood Dryer for 15 min to provide solid pellets having a final moisture level of 8.3%.

Example 10

Drum dried flakes of yeast biomass (85 parts) were premixed in a bag with 15 parts of Celatom NM-4 D-earth. The resultant dry mix was fed at 4.6 kg/hr to an 18 mm twin screw extruder (Coperion Werner Pfleiderer ZSK-18 mm MC). Along with the dry feed, a water/sugar solution made of 14 parts water and 5.1 parts sugar was injected after the disruption zone of the extruder at a flowrate of 8.2 ml/min. The extruder was operating with a 10 kW motor and high torque shaft, at 300 rpm and % torque of about 34 to provide a disrupted yeast powder.

The fixable mix was then fed into a MG-55 LCI Dome Granulator assembled with 1 mm hole diameter by 1 mm thick screen and set to 90 RPM. Extrudate was formed at 81.4 kg/hr and a steady 2.5 amp current. The sample was dried in a Sherwood Dryer for 15 min to provide solid pellets.

Compression Testing and Attrition Resistance of Solid Pellets

Compression testing was performed as follows. The testing apparatus and protocol described in ASTM standard D-6683 was used to assess the response of solid pellets to external loads, such as that imposed by a gas pressure gradient. In the test, the volume of a known mass is measured as a function of a mechanically applied compaction stress. A semi-log graph of the results typically is a straight line with a slope, $\beta$, reflecting the compression of the sample. Higher values of $\beta$ reflect greater compression. This compression can be indicative of particle breakage, which would lead to undesirable segregation and gas flow restriction in processing.

At the conclusion of the ASTM test, the load was maintained on the pellets an additional 2 hrs, simulating extended processing time. Creep, measured after 2 hrs, is a further indication of the likelihood of the solid pellet to deform. Lower creep indicates less deformation.

The test cell containing the sample was then inverted, and the pellet sample was poured out. If necessary, the cell was gently tapped to release the contents. The ease of emptying the cell and the resultant texture (i.e., loose or agglomerated) of the pellets was noted.

The texture after the test is a qualitative observation of how hard it was to empty the test cell used in the previous measurements. The most desirable samples poured out immediately, while some required increasing amounts of tapping, and may have fallen out in large chunks (i.e., less desirable).

To determine attrition resistance, solid pellets (10 g) previously compressed in the Compression Testing ASTM test were then transferred to a 3" diameter, 500 micron sieve. The sieve was tapped by hand to remove any initial fragments of pellets smaller than 500 microns. The net weight of remaining pellets was noted. Then three cylindrical grinding media beads, each 0.50" diameter by 0.50" thick, weighing 5.3 grams each, were added to the sieve. The sieve was placed in an automatic sieve shaker (Gilson Model SS-3, with a setting of "8", with automatic tapping "on") and shaken for periods of 2, 5 or 10 min. The grinding media beads repeatedly strike the pellets from random angles. After shaking, the pan under the sieve was weighed to determine the amount of material that had been attrited and had fallen through the sieve. This test is intended to simulate very rough handling of the pellets after the oil extraction process.

Solid pellets from Examples 3-10, respectively, were analyzed to determine their compression properties and attrition resistance. Results are tabulated below in Table 10.

TABLE 10

Mechanical Compression And Attrition Of Solid Pellets

| Example | Loose Bulk Density $lb/ft^3$ | Compression Exponent $\beta$ | Creep after 2 hr at 1994 $lb/ft^2$ (%) | Texture after test | Attrition In sieving 2 min (%) | 10 min (%) |
|---|---|---|---|---|---|---|
| 10 | 28.98 | 0.06857 | 12.78 | Puck, breaks into 5 pieces | 2.9 | 11.8 |
| 3 | 31.27 | 0.05335 | 6.95 | No puck | 20.5 | 99.0 |
| 4 | 31.85 | 0.05966 | 13.07 | Many taps, 5 pieces | 8.8 | 47.4 |
| 5 | 24.66 | 0.03928 | 4.10 | Two taps, loose | 8.8 | 42.1 |
| 6 | 30.63 | 0.04746 | 8.34 | Few taps, loose | 10.0 | 48.7 |
| 7 | 28.89 | 0.04347 | 3.11 | Few taps, loose | 9.1 | 43.1 |
| 8 | 28.35 | 0.02976 | 0.00 | Loose | 5.2 | 22.4 |
| 9 | 31.66 | 0.07730 | 16.06 | Puck | 7.5 | 36.2 |

SCF Extraction

The extraction vessel was charged with solid pellets (on a dry weight basis, as listed in Table 11) from Examples 3-9, respectively. The pellets were flushed with $CO_2$, then heated to about 40° C. and pressurized to approximately 311 bar. The pellets were extracted at these conditions at a flow rate of 4.3 g/min $CO_2$ for about 6.8 hr, giving a final solvent-to-feed (S/F) ratio of approximately 150 g $CO_2$/g yeast. In some Examples a second run was performed for an additional 4.8 hrs, such that the total time for extraction was 11.6 hr. The oil extraction yields and specific parameters used for extraction are listed in Table 11.

TABLE 11

Comparison Of Oil Extraction Of Solid Pellets

| Example | Yeast Charge (g Dry weight) | Temp. (° C.) | Pressure (bar) | $CO_2$ Flow Rate (g/min) | Time (hr) | S/F ratio (g $CO_2$/ g yeast) | Extracted Oil Yield (wt %) |
|---|---|---|---|---|---|---|---|
| 3 | 12.8 | 40 | 311 | 4.3 | 6.8 | 150 | 37.3 |
| 4 | 21.5[b] | 40 | 312 | 4.3 | 11.6 | 151 | 39.3[a] |
| 5 | 12.9 | 40 | 312 | 4.3 | 6.9 | 150 | 36.4 |
| 6 | 12.8 | 41 | 311 | 4.3 | 6.8 | 149 | 36.6 |
| 7 | 21.7[b] | 40 | 312 | 4.3 | 11.6 | 150 | 37.4[a] |
| 8 | 21.8[b] | 40 | 311 | 4.3 | 11.6 | 150 | 31.0[a] |
| 9 | 12.6 | 41 | 312 | 4.3 | 6.8 | 152 | 39.1 |

[a] average result from two runs

[b] sum of two runs

Compression Testing and Attrition Resistance of Residual Pellets (Post-Extraction)

Following SCF extraction, the residual pellets from Examples 3-9, respectively, were analyzed to determine their compression properties and attrition resistance. Results are tabulated below in Table 12.

TABLE 12

Mechanical Compression And Attrition Of Residual Pellets (Post-Extraction)

| Example | Loose Bulk Density lb/ft$^3$ | Compression Exponent β | Creep after 2 hr at 1994 lb/ft$^2$ (%) | Texture after test | Attrition In sieving 2 min (%) | 5 min (%) |
|---|---|---|---|---|---|---|
| 3 | 23.64 | 0.03352 | 0.75 | Loose | n/a | 73.0* |
| 4 | 23.50 | 0.02035 | 0.78 | One tap, loose | 12.0 | 28.6 |
| 5 | 24.14 | 0.02636 | 0.71 | Loose | 10.9 | 26.4 |
| 6 | 24.66 | 0.02002 | 0.62 | Loose | 10.6 | 27.1 |
| 7 | 21.78 | 0.02897 | 0.98 | One tap, loose | 10.9 | 25.5 |
| 8 | 21.84 | 0.02821 | 0.67 | Loose | 7.7 | 18.5 |
| 9 | 23.87 | 0.02246 | 0.58 | Loose | 10.1 | 22.3 |

*The expected attrition from 5 minutes of sieving was estimated by interpolating the results of a 2 minute test and a 6.5 minute test Based on the above, it is concluded that the process described herein [i.e., comprising steps of (a) mixing a microbial biomass, having a moisture level and comprising oil-containing microbes, and at least one grinding agent capable of absorbing oil, to provide a disrupted biomass mix; (b) blending at least one binding agent with said disrupted biomass mix to provide a fixable mix capable of forming a solid pellet; and (c) forming said solid pellet from the fixable mix] can be successfully utilized to produce solid pellets comprising disrupted microbial biomass from *Yarrowia lipolytica*. Furthermore, the present Example demonstrates that the solid *Yarrowia lipolytica* pellets can be extracted with a solvent (i.e., SCF extraction) to provide an extract comprising the microbial oil.

Example 11

A. Method for determining lipid distribution for yeast cell biomass, oil, and Residual Biomass Samples Yeast cell samples and residual biomass samples (i.e., yeast cells after extraction with $CO_2$) were extracted using a modification of the method of Bligh & Dyer (based on procedures outlined in *Lipid Analysis*, W. W. Christie 2003), separated with thin-layer chromatography (TLC) and directly esterified/transesterified using methanolic hydrogen chloride. Oil samples were dissolved in chloroform/methanol, then separated with TLC and directly esterified/transesterified. The esterified/transesterified samples were analyzed by gas chromatography.

Yeast cell and residual biomass samples were received as a dry powder. A predetermined portion (100-200 mg or less, depending on the PUFA concentration) of the sample was weighed into a 13×100 mm glass test tube with a Teflon™ cap to which 3 mL volume of a 2:1 (volume:volume) methanol/chloroform solution was added. The sample was vortexed thoroughly and incubated at room temperature for one hr with gentle agitation and inversion. After the hr, 1 mL of chloroform and 1.8 mL of deionized water were added, the mixture was agitated and then centrifuged to separate the two layers that formed. Using a pasteur pipette, the bottom layer was removed into a second, tared 13 mm glass vial and the aqueous top layer was re-extracted with a second 1 mL portion of chloroform for 30 min. The two extracts were combined and considered as the "first extract". The solvent was removed using a TurboVap™ at 50° C. with dry nitrogen and the remaining oil was resuspended in the appropriate amount of 6:1 (volume:volume) chloroform/methanol to obtain a 100 mg/mL solution.

The oil obtained as described above (for yeast cell and residual biomass samples) and the oil samples from $CO_2$ extraction of the yeast cells were analyzed by TLC. The TLC was typically done using one tank, although a two tank procedure was also employed when individual PLs were to be identified. In the one tank TLC procedure, a 5×20 cm silica gel 60 plate (EMD #5724-3, obtained from VWR) was prepared by drawing a light pencil line all the way across the plate 2 cm from the bottom. An appropriate amount of sample, (~60 µL) was spotted completely across the plate on top of the pencil line without leaving any space between the spots. A second plate was spotted with known standards and the sample using 1-2 µL amounts. The plates were air dried for 5-10 min and developed using a hexane-diethyl ether-acetic acid mixture (70:30:1 by volume) that had been equilibrated in the tank for at least 30 min with a piece of blotting paper prior to running the plate.

After the plates had been developed to within a ¼ inch of the top, they were dried in a $N_2$ environment for 15 min. The second plate, with the standards and small sample spot, was then developed in a tank that had been saturated with iodine crystals to serve as a reference for the preparative plate. The bands on the preparative plate were identified by very lightly staining the edge of the bands with iodine and, using a pencil, grouping the bands according to each fraction (i.e., the PL fraction, FFA fraction, TAG fraction and DAG fraction). The DAG band can show some separation between the 1,2-DAGs, the 1,3-DAGs, and the MAG band, and typically this entire area was cut out as the DAG band. The bands were cut out of the gel and transferred to a 13 mm glass vial. The remainder of the plate was developed in the iodine tank to verify complete removal of the bands of interest.

To the glass vial containing each band, an appropriate amount of triglyceride internal standard in toluene was added. Depending on the visible concentration of each band, 100 µL of a 0.1 to 5 mg/mL internal standard was usually used. The co-solvent (in this case, toluene) was added with the internal standard. If an internal standard was not used, additional co-solvent was added to complete the esterification/transesterification of the longer chain lipids. 1 mL of a 1% methanolic hydrogen chloride solution (prepared by slowly adding 5 mL acetyl chloride to 50 mL cooled, dry methanol) was added, the sample capped, gently mixed, and placed in a heating block at 80° C. for one hr. After one hr, the sample was removed and allowed to cool. 1 mL of a 1 N sodium chloride solution and 400 µL of hexane were added, the sample then vortexed for at least 12 seconds and centrifuged to separate the two layers. The top layer was then removed, with care being taken to not contaminate it with any of the aqueous (bottom) layer. The top layer was placed into a GC vial fitted with an insert and capped.

The sample was analyzed using an Agilent Model 6890 Gas Chromatograph (Agilent Technologies, Santa Clara, Calif.), equipped with a Flame Ionization Detector (FID) and an Omegawax 320 column (30 m×0.32 mm ID×25 µm film thickness and manufactured by Supelco (Bellfonte, Pa.)). The helium carrier gas was kept constant within a range of 1-3 mL/min with a split ratio of 20:1 or 30:1. The oven conditions were as follows: initial temperature of 160° C. with an initial time of 0 min and an equilibration time of 0.5 min. The temperature ramps were 5 degrees/min to 200° C. for a final hold time of 0 min then 10 degrees/min to 240° C. for 4 min of hold time for a total of 16 min. The inlet was set to 260° C. The FID detector was also set to 260° C. A Nu-Chek Prep GLC reference standard (#461) was run for retention time verification.

The GC results were collected using Agilent's Custom Reports and the area of each fatty acid was transferred to an Excel spreadsheet for calculation of their percentages. Correction factors to convert the total amount of fatty acids in a lipid class could then be applied. Total percentages of each component were compared to the derivatized original extract prior to TLC.

B. Extraction Method

Extraction was performed according to the GENERAL METHODS. Analyses of the various lipid components in the yeast and extracted oils reported in Examples 12-20 below were determined using the thin layer and gas chromatographic methods described herein above. For yeast samples, this summary reflects analysis of the lipids extracted from the sample using the analytical procedure. The amount of lipids analyzed by this procedure for the Extracted Yeast samples is relatively small when compared to that of the comparable Feed Yeast and Oil Extract samples (typically<3% of the extractable oils in the starting feed yeast). The summary tables of results show the relative distribution of lipid components for each of the samples. For each identified lipid component shown in the horizontal row across the top of the table, the relative distribution of that component as phospholipids (PL), diacylglycerides (DAG), free fatty acids (FFA), and triacylglycerides (TAG) is shown vertically down the table columns. The first line for each sample shows analysis of the derivatized original extract prior to TLC. The following lines give the analyses of each component by TLC and GC, with the total percentages of each component presented in the last line for that sample.

In the Examples 12-20, infra, the reported extraction yield of oil was determined by the weight difference between the yeast sample before extraction and the residual biomass after extraction, expressed as a percentage. The weight difference was assumed to be due to the amount of oil extracted by contacting with $CO_2$. The actual weight of the oil obtained was generally found to be within about 85% of the weight expected based on the mass difference.

Example 12

Extraction Curve at 311 Bar and 40° C.

The purpose of this Example was to demonstrate generation of an extraction curve. An 8-mL extraction vessel fabricated from 316 SS tubing (0.95 cm o.d.×0.62 cm i.d.×26.7 cm long) was repeatedly charged with nominally 2.7 g of dried and mechanically disrupted yeast cells (i.e., *Yarrowia lipolytica* strain Y8672) for a series of extractions to determine the extraction curve for this yeast sample at 40° C. and 311 bar. For each extraction, the extraction vessel and yeast were flushed with $CO_2$ and then pressurized to 311 bar with $CO_2$ at 40° C. The yeast sample was extracted at these conditions and a $CO_2$ flow rate of 1.5 g/min for various times to give a range of solvent-to-feed ratios resulting in a corresponding extraction yield, as shown in Table 13. FIG. 4 plots these data in an extraction curve. The break in the curve at a solvent-to-feed ratio of about 40 g $CO_2$/g yeast indicates that at least this solvent ratio is required to effectively extract the available oil in this particular yeast sample at the selected temperature and pressure.

The series of extractions can be repeated at different temperature and/or pressure conditions to generate a series of extraction curves for a particular microbial biomass sample, enabling selection of the optimum extraction conditions based on economics, desired extraction yield, or total amount of $CO_2$ used, for example.

TABLE 13

Solvent To Feed Ratio And Extraction Yield Data At 311 Bar And 40° C.

| Specific Solvent Ratio (g $CO_2$/g Yeast) | Extraction Yield (wt %) |
|---|---|
| 6.0 | 5.5 |
| 6.0 | 6.2 |
| 6.0 | 4.7 |
| 10.9 | 10.3 |
| 13.6 | 9.3 |
| 14.8 | 10.9 |
| 19.5 | 13.0 |
| 19.7 | 10.6 |
| 19.7 | 15.5 |
| 24.8 | 14.3 |
| 25.1 | 17.5 |
| 25.7 | 16.8 |
| 29.9 | 18.0 |
| 39.5 | 18.7 |
| 49.5 | 18.7 |
| 54.5 | 18.8 |
| 59.8 | 18.9 |
| 80.5 | 19.0 |
| 98.5 | 18.7 |
| 109.3 | 18.7 |
| 149.8 | 19.2 |

Comparative Example C7

Extraction of Yeast Cells without Fractionation of the Extract Obtained

The purpose of this Comparative Example was to demonstrate extraction of microbial biomass with $CO_2$, without fractionation of the extract or sequential extraction of the residual biomass, and the lipid composition of the extract so obtained. An 18-mL extraction vessel fabricated from 316 SS tubing (1.27 cm o.d.×0.94 cm i.d.×26.0 cm long) was charged with 4.99 g of dried and mechanically disrupted yeast cells (i.e., *Yarrowia lipolytica* strain Y8672). The yeast sample was flushed with $CO_2$, then heated to 40° C. and pressurized to 222 bar. The yeast sample was extracted at these conditions at a flow rate of 2.3 g/min $CO_2$ for 5.5 hrs, giving a final solvent-to-feed ratio of 149 g $CO_2$/g yeast. The yield of the extract was 18.2 wt %.

The Table below summarizes lipid analyses for the starting feed yeast (the microbial biomass), the extracted yeast (the residual biomass), and the extract obtained. For the yeast cells, 50 weight percent (wt %) of the FFAs and 59.8 wt % of the TAGs were found to contain EPA, calculated respectively as the percentage of 3/6 [the wt % of FFAs comprising EPA in the feed yeast divided by the total wt % of FFAs in the feed yeast, expressed as a percentage and with both percent values taken from the TLC analysis] and as the percentage of 49/82 [the wt % of TAGs comprising EPA in the feed yeast divided by the total wt % of TAGs in the feed yeast, expressed as a percentage and with both percent values taken from the TLC analysis]. The absence (0 wt %) of PLs in the extract show that the PL fraction of the lipids present in the starting feed yeast remains in the residual biomass and does not partition with the $CO_2$ into the extract. The results also show the extract contains 90 wt % TAGs, 4 wt % FFAs, and 6 wt % DAGs. For the extract, 50% of the FFAs and 58.9% of the TAGs were found to contain EPA, calculated respectively as the percentage of 2/4 [the wt % of FFAs comprising EPA in the extract divided by the total wt % of FFAs in the extract, expressed as a percentage and with both percent values taken from the TLC analysis] and the percentage of 53/90 (the wt % of TAGs comprising EPA in the extract divided by the total wt % of TAGs in the extract, expressed as a percentage, with both percent values taken from the TLC analysis).

these conditions at a flow rate of 2.3 g/min $CO_2$ for 5 hr, at which time the pressure was increased to 150 bar. The extraction was continued for an additional 1.2 hr, giving a final solvent-to-feed ratio of 238 g $CO_2$/g yeast. The yield of Extract A was 11.7 wt %.

Extract B:

The extraction was continued with the same partially extracted yeast sample by increasing the pressure to 222 bar and continuing the $CO_2$ flow at 2.3 g/min for 4.0 hr, giving a final solvent-to-feed ratio of 153 g $CO_2$/g yeast for this fraction. The yield of Extract B was 6.2 wt % of the original yeast charged to the extraction vessel.

The Table below summarizes lipid analyses for the starting feed yeast and the two extracts. The results show that under the extraction conditions employed, the FFAs and DAGs of the microbial biomass oil selectively partitioned into Extract A (which contains 9 wt % of each), while Extract B was enriched in TAGs (and contains only 1 wt % DAGs and no measured FFAs). More specifically, Extract B was about 99% TAGs, and about 62.6% of the TAGs were found to contain

TABLE 14

Comparative Example C7: Weight Percent Distribution of Lipid Components

| Sample | 16:0 Palmitic | 18:0 Stearic | 18:1 Oleic | 18:2 Linoleic | 18:3 (n-3) ALA | 20:2 EDA | 20:3 (n-6) HGLA | 20:4 ARA | 20:4 (n-3) ETA | 20:5 EPA | other | Total |
|---|---|---|---|---|---|---|---|---|---|---|---|---|
| Feed Yeast | 3 | 2 | 4 | 15 | 1 | 2 | 2 | 1 | 2 | 55 | 11 | 100 |
| PL | 1 | 0 | 0 | 1 | 0 | 0 | 0 | 0 | 0 | 2 | 1 | 6 |
| DAG | 1 | 0 | 0 | 1 | 0 | 0 | 0 | 0 | 0 | 2 | 1 | 6 |
| FFA | 0 | 0 | 0 | 0 | 0 | 0 | 0 | 0 | 0 | 3 | 1 | 6 |
| TAG | 1 | 2 | 4 | 13 | 1 | 1 | 1 | 1 | 1 | 49 | 7 | 82 |
|  | 3 | 2 | 5 | 16 | 1 | 2 | 2 | 1 | 1 | 56 | 9 | 100 |
| Residual Biomass | 7 | 4 | 4 | 18 | 1 | 2 | 2 | 1 | 1 | 49 | 10 | 100 |
| PL | 6 | 3 | 2 | 10 | 1 | 1 | 1 | 0 | 1 | 14 | 5 | 43 |
| DAG | 0 | 0 | 0 | 1 | 0 | 0 | 0 | 0 | 0 | 2 | 1 | 4 |
| FFA | 1 | 0 | 0 | 1 | 0 | 0 | 0 | 0 | 0 | 6 | 1 | 12 |
| TAG | 1 | 1 | 2 | 7 | 1 | 1 | 1 | 1 | 0 | 23 | 4 | 41 |
|  | 8 | 4 | 4 | 18 | 1 | 2 | 2 | 1 | 2 | 45 | 11 | 100 |
| Extract | 2 | 2 | 4 | 14 | 1 | 2 | 3 | 3 | 1 | 56 | 10 | 100 |
| PL | 0 | 0 | 0 | 0 | 0 | 0 | 0 | 0 | 0 | 0 | 0 | 0 |
| DAG | 1 | 0 | 0 | 1 | 0 | 0 | 0 | 0 | 0 | 2 | 1 | 6 |
| FFA | 0 | 0 | 0 | 0 | 0 | 0 | 0 | 0 | 0 | 2 | 1 | 4 |
| TAG | 1 | 2 | 4 | 14 | 1 | 2 | 2 | 1 | 1 | 53 | 8 | 90 |
|  | 2 | 2 | 5 | 16 | 1 | 2 | 2 | 1 | 1 | 58 | 9 | 100 |

Example 13

Lipid Fractionation by Sequential Pressure Extraction

The purpose of this Example was to demonstrate sequential pressure extraction of a yeast sample and the lipid compositions of the extracts obtained. An 18-mL extraction vessel fabricated from 316 SS tubing (1.27 cm o.d.×0.94 cm i.d.× 26.0 cm long) was charged with 3.50 g of dried and mechanically disrupted yeast cells (i.e., *Yarrowia lipolytica* strain Y8672).

Extract A:

The yeast was flushed with $CO_2$, then heated to 40° C. and pressurized to 125 bar. The yeast sample was extracted at TAGs, and about 62.6% of the TAGs were found to contain EPA (calculated as the percentage of 62/99 [the wt % of TAGs comprising EPA in Extract B divided by the total wt % of TAGs in Extract B, expressed as a percentage, and with both percent values taken from the TLC analysis]. In contrast, about 59.8% of the TAGs of the yeast cells were found to contain EPA, calculated as the percentage of 49/82 (the wt % of TAGs comprising EPA in the feed yeast divided by the total wt % of TAGs in the feed yeast, expressed as a percentage, with both percent values taken from the TLC analysis). These results are expected to be similar to the results which could be obtained by SCF $CO_2$-extraction of the yeast sample to provide an extract which is subsequently fractionated via stepwise pressure reduction.

TABLE 15

Example 13: Weight Percent Distribution of Lipid Components

| Sample | 16:0 palmitic | 18:0 Stearic | 18:1 Oleic | 18:2 Linoleic | 18:3 (n-3) ALA | 20:2 EDA | 20:3 (n-6) HGLA | 20:4 ARA | 20:4 (n-3) ETA | 20:5 EPA | other | Total % |
|---|---|---|---|---|---|---|---|---|---|---|---|---|
| Feed Yeast | 3 | 2 | 4 | 15 | 1 | 2 | 2 | 1 | 2 | 55 | 11 | 100 |
| PL | 1 | 0 | 0 | 1 | 0 | 0 | 0 | 0 | 0 | 2 | 1 | 6 |
| DAG | 1 | 0 | 0 | 1 | 0 | 0 | 0 | 0 | 0 | 2 | 1 | 6 |
| FFA | 0 | 0 | 0 | 0 | 0 | 0 | 0 | 0 | 0 | 3 | 1 | 6 |
| TAG | 1 | 2 | 4 | 13 | 1 | 1 | 1 | 1 | 1 | 49 | 7 | 82 |
| Sum | 3 | 2 | 5 | 16 | 1 | 2 | 2 | 1 | 1 | 56 | 9 | 100 |
| Extract A | 3 | 2 | 5 | 16 | 1 | 2 | 2 | 1 | 1 | 56 | 10 | |
| PL | 0 | 0 | 0 | 0 | 0 | 0 | 0 | 0 | 0 | 0 | 0 | 0 |
| DAG | 1 | 0 | 0 | 2 | 0 | 0 | 0 | 0 | 0 | 3 | 1 | 9 |
| FFA | 1 | 0 | 0 | 1 | 0 | 0 | 0 | 0 | 0 | 4 | 1 | 9 |
| TAG | 2 | 2 | 5 | 15 | 1 | 1 | 1 | 1 | 1 | 44 | 7 | 82 |
| Sum | 4 | 3 | 6 | 18 | 1 | 2 | 2 | 1 | 1 | 51 | 10 | 100 |
| Extract B | 1 | 2 | 4 | 13 | 1 | 2 | 2 | 1 | 2 | 62 | 9 | |
| PL | 0 | 0 | 0 | 0 | 0 | 0 | 0 | 0 | 0 | 0 | 0 | 0 |
| DAG | 0 | 0 | 0 | 0 | 0 | 0 | 0 | 0 | 0 | 0 | 0 | 1 |
| FFA | 0 | 0 | 0 | 0 | 0 | 0 | 0 | 0 | 0 | 0 | 0 | 0 |
| TAG | 1 | 2 | 4 | 14 | 1 | 2 | 2 | 1 | 1 | 62 | 8 | 99 |
| Sum | 1 | 2 | 5 | 14 | 1 | 2 | 2 | 1 | 1 | 62 | 8 | 100 |

Example 14

Lipid Fractionation by Sequential Pressure Extraction

The purpose of this Example was to demonstrate sequential pressure extraction of a yeast sample under different extraction conditions and the lipid compositions of the extracts obtained. An 89-mL extraction vessel fabricated from 316 SS tubing (2.54 cm o.d.×1.93 cm i.d.×30.5 cm long) was charged with 15.0 g of dried and mechanically disrupted yeast cells (i.e., *Yarrowia lipolytica* strain Y8672).

Extract A:

The yeast was flushed with $CO_2$, then heated to 40° C. and pressurized to 125 bar. The yeast sample was extracted at these conditions at a flow rate of 2.3 g/min $CO_2$ for 3.9 hr, at which time the flow rate was increased to 4.7 g/min $CO_2$ and the extraction was continued for an additional 2.3 h. The pressure was then increased to 141 bar. The extraction was continued for an additional 4.1 hr at 4.7 g/min $CO_2$, giving a final solvent-to-feed ratio of 154 g $CO_2$/g yeast. The yield of Extract A was 8.7 wt %.

Extract B:

The extraction was continued with the same partially extracted yeast sample by increasing the pressure to 222 bar and continuing the $CO_2$ flow at 4.7 g/min for 8.0 hr, giving a final solvent-to-feed ratio of 150 g $CO_2$/g yeast for this extract. The yield of Extract B was 15.4 wt % of the original yeast charged to the extraction vessel.

The Table below summarizes lipid analyses for the starting feed yeast, the residual biomass after both extractions, and the two extracts. The results show that the PL fraction of the lipids present in the starting feed yeast remains in the residual biomass. Under the extraction conditions employed, the FFAs and DAGs of the microbial biomass selectively partitioned into Extract A, while Extract B was enriched in TAGs. More specifically, Extract B was about 97% TAGs with no measured FFAs, and about 61.9% of the TAGs were found to contain EPA. In contrast, about 59.8% of the TAGs of the yeast cells were found to contain EPA. These results are expected to be similar to the results which could be obtained by SCF $CO_2$-extraction of the yeast sample to provide an extract which is subsequently fractionated via stepwise pressure reduction.

TABLE 16

Example 14: Weight Percent Distribution of Lipid Components

| Sample | 16:0 palmitic | 18:0 Stearic | 18:1 Oleic | 18:2 Linoleic | 18:3 (n-3) ALA | 20:2 EDA | 20:3 (n-6) HGLA | 20:4 ARA | 20:4 (n-3) ETA | 20:5 EPA | other | Total |
|---|---|---|---|---|---|---|---|---|---|---|---|---|
| Feed Yeast | 3 | 2 | 4 | 15 | 1 | 2 | 2 | 1 | 2 | 55 | 11 | 100 |
| PL | 1 | 0 | 0 | 1 | 0 | 0 | 0 | 0 | 0 | 2 | 1 | 6 |
| DAG | 1 | 0 | 0 | 1 | 0 | 0 | 0 | 0 | 0 | 2 | 1 | 6 |
| FFA | 0 | 0 | 0 | 0 | 0 | 0 | 0 | 0 | 0 | 3 | 1 | 6 |
| TAG | 1 | 2 | 4 | 13 | 1 | 1 | 1 | 1 | 1 | 49 | 7 | 82 |
| Sum | 3 | 2 | 5 | 16 | 1 | 2 | 2 | 1 | 1 | 56 | 9 | 100 |
| Residual Biomass | 6 | 3 | 4 | 15 | 1 | 3 | 2 | 1 | 3 | 43 | 15 | 100 |
| PL | 5 | 2 | 1 | 9 | 0 | 0 | 1 | 0 | 1 | 12 | 5 | 37 |
| DAG | 0 | 0 | 0 | 1 | 0 | 0 | 0 | 0 | 0 | 2 | 1 | 5 |
| FFA | 1 | 1 | 0 | 1 | 0 | 1 | 0 | 0 | 0 | 8 | 2 | 15 |
| TAG | 1 | 1 | 2 | 7 | 1 | 1 | 1 | 0 | 1 | 24 | 4 | 42 |
| Sum | 7 | 4 | 4 | 17 | 1 | 2 | 2 | 1 | 2 | 46 | 11 | 100 |
| Extract A | 3 | 2 | 5 | 16 | 1 | 2 | 2 | 1 | 2 | 56 | 9 | 100 |
| PL | 0 | 0 | 0 | 0 | 0 | 0 | 0 | 0 | 0 | 0 | 0 | 0 |
| DAG | 1 | 1 | 0 | 2 | 0 | 0 | 0 | 0 | 0 | 4 | 1 | 11 |

TABLE 16-continued

Example 14: Weight Percent Distribution of Lipid Components

| Sample | 16:0 palmitic | 18:0 Stearic | 18:1 Oleic | 18:2 Linoleic | 18:3 (n-3) ALA | 20:2 EDA | 20:3 (n-6) HGLA | 20:4 ARA | 20:4 (n-3) ETA | 20:5 EPA | other | Total |
|---|---|---|---|---|---|---|---|---|---|---|---|---|
| FFA | 1 | 0 | 0 | 1 | 0 | 0 | 0 | 0 | 0 | 5 | 1 | 9 |
| TAG | 2 | 2 | 4 | 14 | 1 | 1 | 1 | 1 | 1 | 45 | 7 | 80 |
| Sum | 3 | 3 | 5 | 17 | 1 | 2 | 2 | 1 | 1 | 55 | 9 | 100 |
| Extract B | 1 | 2 | 5 | 14 | 1 | 2 | 2 | 1 | 1 | 61 | 9 | 100 |
| PL | 0 | 0 | 0 | 0 | 0 | 0 | 0 | 0 | 0 | 0 | 0 | 1 |
| DAG | 0 | 0 | 0 | 0 | 0 | 0 | 0 | 0 | 0 | 1 | 0 | 2 |
| FFA | 0 | 0 | 0 | 0 | 0 | 0 | 0 | 0 | 0 | 0 | 0 | 0 |
| TAG | 1 | 2 | 5 | 15 | 1 | 2 | 2 | 1 | 1 | 60 | 8 | 97 |
| Sum | 1 | 2 | 5 | 15 | 1 | 2 | 2 | 1 | 1 | 61 | 8 | 100 |

Example 15

Lipid Fractionation by Sequential Pressure Extraction

The purpose of this Example was to demonstrate sequential pressure extraction of a yeast sample under different extraction conditions and the lipid compositions of the extracts obtained. An 89-mL extraction vessel fabricated from 316 SS tubing (2.54 cm o.d.×1.93 cm i.d.×30.5 cm long) was charged with 20.0 g of dried and mechanically disrupted yeast cells (i.e., *Yarrowia lipolytica* strain Y8672).

Extract A:

The yeast was flushed with $CO_2$, then heated to 40° C. and pressurized to 110 bar. The yeast sample was extracted at these conditions at a flow rate of 4.7 g/min $CO_2$ for 7.1 hr, giving a final solvent-to-feed ratio of 100 g $CO_2$/g yeast. The yield of Extract A was 4.1 wt %.

Extract B:

The extraction was continued with the same partially extracted yeast sample by increasing the pressure to 222 bar and continuing the $CO_2$ flow at 4.7 g/min for 15.0 hr, giving a final solvent-to-feed ratio of 212 g $CO_2$/g yeast for this extract. The yield of Extract B was 14.6 wt % of the original yeast charged to the extraction vessel.

The Table below summarizes lipid analyses for the starting feed yeast, the residual biomass after both extractions, and the two extracts. The results show that the PL fraction of the lipids present in the starting feed yeast remains in the residual biomass. Under the extraction conditions employed, the FFAs and DAGs of the microbial biomass selectively partitioned into Extract A, while Extract B was enriched in TAGs (i.e., oil Fraction B was about 95% TAGs). These results are expected to be similar to the results which could be obtained by SCF $CO_2$-extraction of the yeast sample to provide an extract which is subsequently fractionated via stepwise pressure reduction.

Examples 13 though 15 herein collectively illustrate that partitioning of the lipid components of the extract can be influenced by the selection of the extraction conditions in a multi-step extraction. Such partitioning would likewise result from a sequential reduction of pressure of the oil extract obtained by a process as illustrated in FIG. 3.

TABLE 17

Example 15: Weight Percent Distribution of Lipid Components

| Sample | 16:0 palmitic | 18:0 Stearic | 18:1 Oleic | 18:2 Linoleic | 18:3 (n-3) ALA | 20:2 EDA | 20:3 (n-6) HGLA | 20:4 ARA | 20:4 (n-3) ETA | 20:5 EPA | other | Total |
|---|---|---|---|---|---|---|---|---|---|---|---|---|
| Feed Yeast | 3 | 2 | 4 | 15 | 1 | 2 | 2 | 1 | 2 | 55 | 11 | 100 |
| PL | 1 | 0 | 0 | 1 | 0 | 0 | 0 | 0 | 0 | 2 | 1 | 6 |
| DAG | 1 | 0 | 0 | 1 | 0 | 0 | 0 | 0 | 0 | 2 | 1 | 6 |
| FFA | 0 | 0 | 0 | 0 | 0 | 0 | 0 | 0 | 0 | 3 | 1 | 6 |
| TAG | 1 | 2 | 4 | 13 | 1 | 1 | 1 | 1 | 1 | 49 | 7 | 82 |
| sum | 3 | 2 | 5 | 16 | 1 | 2 | 2 | 1 | 1 | 56 | 9 | 100 |
| Residual Biomass | 6 | 3 | 4 | 15 | 1 | 2 | 3 | 5 | 2 | 43 | 13 | 100 |
| PL | 5 | 2 | 2 | 9 | 1 | 1 | 1 | 0 | 1 | 13 | 5 | 41 |
| DAG | 0 | 0 | 0 | 1 | 0 | 0 | 0 | 0 | 0 | 2 | 1 | 4 |
| FFA | 1 | 0 | 0 | 1 | 0 | 0 | 0 | 0 | 0 | 6 | 1 | 12 |
| TAG | 1 | 1 | 2 | 7 | 1 | 1 | 1 | 1 | 1 | 25 | 4 | 43 |
| sum | 7 | 4 | 4 | 18 | 1 | 2 | 2 | 1 | 2 | 46 | 11 | 100 |
| Extract A | 5 | 3 | 4 | 15 | 1 | 2 | 2 | 1 | 1 | 56 | 8 | 100 |
| PL | 0 | 0 | 0 | 0 | 0 | 0 | 0 | 0 | 0 | 0 | 0 | 0 |
| DAG | 2 | 1 | 1 | 3 | 0 | 0 | 0 | 0 | 0 | 5 | 2 | 13 |
| FFA | 2 | 1 | 1 | 3 | 0 | 1 | 1 | 1 | 1 | 22 | 3 | 37 |
| TAG | 1 | 1 | 3 | 9 | 1 | 1 | 1 | 0 | 1 | 27 | 4 | 49 |
| sum | 6 | 3 | 5 | 15 | 1 | 2 | 2 | 1 | 1 | 53 | 9 | 100 |
| Extract B | 2 | 2 | 5 | 15 | 1 | 2 | 2 | 1 | 1 | 60 | 9 | 100 |
| PL | 0 | 0 | 0 | 0 | 0 | 0 | 0 | 0 | 0 | 0 | 0 | 0 |
| DAG | 0 | 0 | 0 | 1 | 0 | 0 | 0 | 0 | 0 | 2 | 0 | 4 |
| FFA | 0 | 0 | 0 | 0 | 0 | 0 | 0 | 0 | 0 | 0 | 0 | 1 |
| TAG | 1 | 2 | 5 | 16 | 1 | 2 | 2 | 1 | 1 | 56 | 8 | 95 |
| sum | 2 | 2 | 5 | 16 | 1 | 2 | 2 | 1 | 1 | 58 | 8 | 100 |

Example 16

SCF Extraction at 500 Bar

The purpose of this Example was to demonstrate extraction of a yeast sample with $CO_2$ as a supercritical fluid at 500 bar, and the composition of the extract obtained. Such extraction conditions could be used in the first step of a method for obtaining a refined composition comprising at least one PUFA, where the method comprises contacting microbial biomass comprising at least one PUFA with $CO_2$ under suitable extraction conditions, and subsequently fractionating the extract, for example by sequential pressure reduction.

A 10-mL extraction vessel was charged with 2.01 g of dried and mechanically disrupted yeast cells (i.e., *Yarrowia lipolytica* strain Y4305-F1B1), and the vessel was mounted in an a commercially-available automated supercritical fluid extraction instrument, i.e., an Isco Model SFX3560 extractor. This instrument utilized 10-mL plastic extraction vessels equipped with a 2-micron sintered metal filter on each end of the extraction vessel. This vessel was charged with the substrate to be extracted and then loaded into a high pressure extraction chamber which equalized the pressure on the inside and outside of the extraction vessel. The $CO_2$ solvent was metered with a syringe pump (ISCO Model 260D), preheated to the specified extraction temperature, and then passed through the extraction vessel. The extraction chamber was heated with electrical resistance heaters to the desired extraction temperature. Pressure was maintained on the vessel with an automated variable restrictor, which was an integral part of the instrument.

The yeast sample was flushed with $CO_2$, then heated to 40° C. and pressurized to 500 bar. The yeast sample was extracted at these conditions at a flow rate of 0.86 g/min $CO_2$ for 5.8 hr, giving a final solvent-to-feed ratio of 150 g $CO_2$/g yeast. The yield of extracted oil was 32.8 wt %. The Table below summarizes lipid analyses for the starting feed yeast, the residual biomass after the extraction, and the oil obtained by the extraction. The results show that the PL fraction of the lipids present in the starting feed yeast remained in the residual biomass and did not partition into the $CO_2$-extracted oil, which comprised FFAs, DAGs, and TAGs.

Example 17

SCF Extraction at 310 Bar

The purpose of this Example was to demonstrate extraction of a yeast sample with $CO_2$ as a supercritical fluid at 310 bar, and the composition of the extract obtained. Such extraction conditions could be used in the first step of a method for obtaining a refined composition comprising at least one PUFA, where the method comprises contacting microbial biomass comprising at least one PUFA with $CO_2$ under suitable extraction conditions, and subsequently fractionating the extract, for example by sequential pressure reduction.

An 89-mL extraction vessel fabricated from 316 SS tubing (2.54 cm o.d.×1.93 cm i.d.×30.5 cm long) was charged with 25.1 g of dried and mechanically disrupted yeast cells (i.e., *Yarrowia lipolytica* strain Y9502). The yeast sample was flushed with $CO_2$, then heated to 40° C. and pressurized to 310 bar. The yeast sample was extracted at these conditions at a flow rate of 5.0 mL/min $CO_2$ for 4.4 hr, giving a final solvent-to-feed ratio of 50 g $CO_2$/g yeast. The yield of extracted oil was 28.8 wt %. The Table below summarizes lipid analyses for the starting feed yeast, the residual biomass after the extraction, and the oil obtained by the extraction. The results show that the PL fraction of the lipids present in the starting feed yeast remained in the residual biomass and did not partition into the $CO_2$-extracted oil, which comprised FFAs, DAGs, and TAGs.

TABLE 18

Example 16: Weight Percent Distribution of Lipid Components

| Sample | 16:0 palmitic | 18:0 Stearic | 18:1 Oleic | 18:2 Linoleic | 18:3 (n-3) ALA | 20:2 EDA | 20:3 (n-6) HGLA | 20:4 ARA | 20:4 (n-3) ETA | 20:5 EPA | other | Total |
|---|---|---|---|---|---|---|---|---|---|---|---|---|
| Feed Yeast | 3 | 3 | 6 | 21 | 4 | 4 | 2 | 1 | 2 | 44 | 9 | 100 |
| PL | 1 | 0 | 0 | 1 | 0 | 0 | 0 | 0 | 0 | 1 | 0 | 4 |
| DAG | 0 | 0 | 0 | 2 | 0 | 0 | 0 | 0 | 0 | 2 | 1 | 6 |
| FFA | 0 | 0 | 0 | 1 | 0 | 0 | 0 | 0 | 0 | 2 | 1 | 6 |
| TAG | 2 | 2 | 5 | 18 | 3 | 3 | 2 | 0 | 1 | 38 | 7 | 84 |
| Sum | 3 | 3 | 6 | 22 | 4 | 3 | 2 | 1 | 2 | 43 | 9 | 100 |
| Residual Biomass | 9 | 4 | 5 | 24 | 3 | 3 | 2 | 1 | 2 | 36 | 7 | 100 |
| PL | 7 | 3 | 2 | 14 | 1 | 1 | 1 | 0 | 1 | 11 | 3 | 48 |
| DAG | 0 | 0 | 0 | 1 | 0 | 0 | 0 | 0 | 0 | 1 | 0 | 4 |
| FFA | 1 | 1 | 0 | 2 | 0 | 1 | 0 | 0 | 0 | 4 | 2 | 12 |
| TAG | 1 | 1 | 2 | 8 | 1 | 1 | 1 | 0 | 1 | 15 | 3 | 36 |
| Sum | 9 | 5 | 5 | 25 | 3 | 3 | 2 | 1 | 2 | 32 | 9 | 100 |
| Oil | 2 | 2 | 6 | 21 | 4 | 4 | 2 | 1 | 2 | 46 | 9 | 100 |
| PL | 0 | 0 | 0 | 0 | 0 | 0 | 0 | 0 | 0 | 0 | 0 | 0 |
| DAG | 0 | 0 | 0 | 2 | 0 | 0 | 0 | 0 | 0 | 2 | 1 | 7 |
| FFA | 0 | 0 | 0 | 1 | 0 | 0 | 0 | 0 | 0 | 2 | 1 | 5 |
| TAG | 2 | 2 | 5 | 19 | 3 | 3 | 2 | 0 | 1 | 40 | 7 | 88 |
| Sum | 3 | 3 | 6 | 21 | 4 | 4 | 2 | 1 | 2 | 45 | 9 | 100 |

TABLE 19

Example 17: Weight Percent Distribution of Lipid Components

| Sample | 16:0 palmitic | 16:1 Palmitoleic | 18:1 Oleic | 18:2 Linoleic | 18:3 (n-3) ALA | 20:2 EDA | 20:3 (n-6) HGLA | 20:4 ARA | EtrA | 20:5 EPA | other | Total |
|---|---|---|---|---|---|---|---|---|---|---|---|---|
| Feed Yeast | 2 | 1 | 4 | 10 | 1 | 5 | 6 | 2 | 0 | 51 | 12 | 100 |
| PL | 0 | 0 | 0 | 1 | 0 | 0 | 0 | 0 | 0 | 2 | 1 | 7 |
| DAG | 0 | 0 | 0 | 1 | 0 | 0 | 0 | 0 | 0 | 3 | 1 | 7 |
| FFA | 1 | 0 | 0 | 1 | 0 | 2 | 1 | 0 | 0 | 8 | 1 | 15 |
| TAG | 1 | 0 | 3 | 9 | 0 | 2 | 4 | 1 | 0 | 41 | 6 | 72 |
| Sum | 2 | 1 | 4 | 11 | 1 | 5 | 6 | 1 | 1 | 53 | 9 | 100 |
| Residual Biomass | 4 | 1 | 4 | 12 | 0 | 5 | 6 | 2 | 3 | 48 | 10 | 100 |
| PL | 3 | 0 | 2 | 6 | 0 | 2 | 2 | 0 | 1 | 14 | 5 | 40 |
| DAG | 0 | 0 | 1 | 1 | 0 | 1 | 1 | 0 | 0 | 3 | 1 | 9 |
| FFA | 0 | 0 | 0 | 0 | 0 | 2 | 1 | 0 | 0 | 6 | 2 | 14 |
| TAG | 0 | 0 | 2 | 4 | 0 | 2 | 3 | 1 | 0 | 20 | 4 | 38 |
| Sum | 4 | 1 | 5 | 12 | 1 | 6 | 6 | 2 | 2 | 44 | 12 | 100 |
| Oil | 2 | 1 | 4 | 11 | 1 | 5 | 6 | 1 | 0 | 56 | 9 | 100 |
| PL | 0 | 0 | 0 | 0 | 0 | 0 | 0 | 0 | 0 | 0 | 0 | 1 |
| DAG | 1 | 0 | 0 | 1 | 0 | 0 | 0 | 0 | 0 | 2 | 1 | 6 |
| FFA | 1 | 0 | 0 | 1 | 0 | 2 | 1 | 0 | 0 | 8 | 2 | 16 |
| TAG | 1 | 1 | 4 | 10 | 1 | 2 | 4 | 1 | 0 | 43 | 7 | 77 |
| Sum | 2 | 1 | 4 | 12 | 1 | 5 | 6 | 1 | 0 | 53 | 9 | 100 |

Example 18

SCF Extraction at 222 Bar

The purpose of this Example was to demonstrate extraction of a yeast sample with $CO_2$ as a supercritical fluid at 222 bar, and the composition of the extract obtained. Such extraction conditions could be used in the first step of a method for obtaining a refined composition comprising at least one PUFA, where the method comprises contacting microbial biomass comprising at least one PUFA with $CO_2$ under suitable extraction conditions, and subsequently fractionating the extract, for example by sequential pressure reduction.

An 89-mL extraction vessel fabricated from 316 SS tubing (2.54 cm o.d.×1.93 cm i.d.×30.5 cm long) was charged with 25.1 g of dried and mechanically disrupted yeast cells (i.e., *Yarrowia lipolytica* strain Y8672). The yeast sample was flushed with $CO_2$, then heated to 40° C. and pressurized to 222 bar. The yeast sample was extracted at these conditions at a flow rate of 4.7 g/min $CO_2$ for 13.7 hr, giving a final solvent-to-feed ratio of 154 g $CO_2$/g yeast. The yield of extracted oil was 18.1 wt %. This extraction was replicated an additional four times, each time with a fresh yeast sample, and the five extracts consolidated. The residual biomass samples and the extracted oil samples were also each consolidated and mixed to provide composite samples from the five extractions. The Table below summarizes lipid analyses for the starting feed yeast, the consolidated residual biomass, and the consolidated oil obtained by the extraction. The oil was found to comprise 7 wt % FFAs, 7 wt % DAGs, and 86 wt % TAGs.

TABLE 20

Example 18: Weight Percent Distribution of Lipid Components

| Sample | 16:0 palmitic | 18:0 Stearic | 18:1 Oleic | 18:2 Linoleic | 18:3 (n-3) ALA | 20:2 EDA | 20:3 (n-6) HGLA | 20:4 ARA | 20:4 (n-3) ETA | 20:5 EPA | other | Total |
|---|---|---|---|---|---|---|---|---|---|---|---|---|
| Feed Yeast | 3 | 3 | 4 | 15 | 1 | 2 | 4 | 1 | 3 | 51 | 11 | 100 |
| PL | 1 | 0 | 0 | 2 | 0 | 0 | 0 | 0 | 0 | 2 | 1 | 8 |
| DAG | 1 | 0 | 0 | 1 | 0 | 0 | 0 | 0 | 0 | 2 | 1 | 6 |
| FFA | 0 | 0 | 0 | 0 | 0 | 0 | 0 | 0 | 0 | 3 | 1 | 7 |
| TAG | 1 | 2 | 4 | 12 | 1 | 2 | 3 | 1 | 2 | 45 | 7 | 79 |
| Sum | 3 | 3 | 5 | 16 | 1 | 2 | 3 | 1 | 3 | 53 | 9 | 100 |
| Residual Biomass | 9 | 4 | 4 | 18 | 1 | 2 | 3 | 1 | 4 | 36 | 14 | 100 |
| PL | 8 | 4 | 3 | 14 | 1 | 1 | 2 | 0 | 2 | 16 | 8 | 59 |
| DAG | 0 | 0 | 0 | 1 | 0 | 0 | 0 | 0 | 0 | 1 | 1 | 3 |
| FFA | 1 | 0 | 0 | 1 | 0 | 0 | 0 | 0 | 0 | 5 | 2 | 11 |
| TAG | 1 | 1 | 1 | 4 | 0 | 1 | 1 | 0 | 1 | 13 | 4 | 27 |
| Sum | 10 | 5 | 5 | 19 | 1 | 2 | 3 | 1 | 3 | 36 | 14 | 100 |
| Oil | 2 | 2 | 4 | 14 | 1 | 2 | 4 | 1 | 4 | 52 | 12 | 100 |
| PL | 0 | 0 | 0 | 0 | 0 | 0 | 0 | 0 | 0 | 0 | 0 | 0 |
| DAG | 1 | 0 | 0 | 1 | 0 | 0 | 0 | 0 | 0 | 3 | 1 | 7 |
| FFA | 0 | 0 | 0 | 0 | 0 | 0 | 0 | 0 | 0 | 3 | 1 | 7 |
| TAG | 2 | 2 | 4 | 13 | 1 | 2 | 3 | 1 | 2 | 48 | 7 | 86 |
| Sum | 3 | 3 | 5 | 15 | 1 | 3 | 3 | 1 | 3 | 54 | 9 | 100 |

Example 19

Liquid $CO_2$ Extraction at 85 Bar

The purpose of this Example was to demonstrate extraction of a yeast sample with $CO_2$ as a liquid at 85 bar, and the composition of the extract obtained. Such extraction conditions could be used in the first step of a method for obtaining a refined composition comprising at least one PUFA, where the method comprises contacting microbial biomass comprising at least one PUFA with $CO_2$ under suitable extraction conditions, and subsequently fractionating the extract, for example by sequential pressure reduction.

An 8-mL extraction vessel fabricated from 316 SS tubing (0.95 cm o.d.×0.62 cm i.d.×26.7 cm long) was charged with 0.966 g of dried and mechanically disrupted yeast cells (i.e., *Yarrowia lipolytica* strain Y8672). The yeast sample was flushed with $CO_2$, and then pressurized to 85 bar with liquid $CO_2$ at 22° C. The yeast sample was extracted at these conditions at a flow rate of 0.69 g/min $CO_2$ for 8.5 hr, giving a final solvent-to-feed ratio of 361 g $CO_2$/g yeast. The yield of extracted oil was 21.4 wt %. The Table below summarizes lipid analyses for the starting feed yeast, the residual biomass, and the oil obtained by the extraction. The results show that the PL fraction of the lipids present in the starting feed yeast remained in the residual biomass and did not partition into the $CO_2$-extracted oil. The oil comprised 8 wt % FFAs, 5 wt % DAGs, and 86 wt % TAGs.

TABLE 21

Example 19: Weight Percent Distribution of Lipid Components

| Sample | 16:0 palmitic | 18:0 Stearic | 18:1 Oleic | 18:2 Linoleic | 18:3 (n-3) ALA | 20:2 EDA | 20:3 (n-6) HGLA | 20:4 ARA | 20:4 (n-3) ETA | 20:5 EPA | other | Total |
|---|---|---|---|---|---|---|---|---|---|---|---|---|
| Feed Yeast | 2 | 2 | 4 | 13 | 1 | 3 | 4 | 1 | 2 | 55 | 11 | 100 |
| PL | 1 | 0 | 0 | 1 | 0 | 0 | 0 | 0 | 0 | 2 | 1 | 6 |
| DAG | 0 | 0 | 0 | 1 | 0 | 0 | 0 | 0 | 0 | 2 | 1 | 5 |
| FFA | 0 | 0 | 0 | 1 | 0 | 1 | 1 | 0 | 0 | 4 | 3 | 11 |
| TAG | 1 | 2 | 4 | 11 | 1 | 2 | 2 | 1 | 1 | 45 | 7 | 77 |
| Sum | 3 | 3 | 4 | 14 | 1 | 3 | 3 | 1 | 2 | 53 | 12 | 100 |
| Residual Biomass | 5 | 4 | 3 | 14 | 1 | 3 | 4 | 1 | 3 | 47 | 13 | 100 |
| PL | 3 | 2 | 1 | 5 | 0 | 0 | 1 | 0 | 1 | 10 | 4 | 28 |
| DAG | 0 | 0 | 0 | 0 | 0 | 0 | 0 | 0 | 0 | 1 | 0 | 2 |
| FFA | 0 | 0 | 0 | 1 | 0 | 1 | 0 | 0 | 0 | 7 | 2 | 13 |
| TAG | 1 | 2 | 3 | 8 | 1 | 1 | 2 | 1 | 1 | 31 | 6 | 57 |
| Sum | 4 | 4 | 4 | 15 | 1 | 3 | 3 | 1 | 3 | 49 | 12 | 100 |
| Oil | 2 | 2 | 4 | 14 | 1 | 3 | 3 | 1 | 2 | 56 | 11 | 100 |
| PL | 0 | 0 | 0 | 0 | 0 | 0 | 0 | 0 | 0 | 0 | 0 | 0.7 |
| DAG | 0 | 0 | 0 | 1 | 0 | 0 | 0 | 0 | 0 | 2 | 1 | 5 |
| FFA | 0 | 0 | 0 | 0 | 0 | 0 | 0 | 0 | 0 | 4 | 1 | 8 |
| TAG | 1 | 2 | 4 | 13 | 1 | 2 | 2 | 1 | 2 | 50 | 8 | 86 |
| Sum | 2 | 3 | 5 | 14 | 1 | 2 | 3 | 1 | 2 | 57 | 10 | 100 |

Example 20

Extraction of Residual Phospholipids with SCF $CO_2$/EtOH

The purpose of this Example was to demonstrate extraction of a first residual biomass sample with a mixture of supercritical $CO_2$ and ethanol as the extractant to obtain a PL fraction and a second residual biomass sample.

An 18-mL extraction vessel fabricated from 316 SS tubing (1.27 cm o.d.×0.94 cm i.d.×26.0 cm long) was charged with 6.39 g of residual biomass (extracted *Yarrowia lipolytica* strain Y8672) from Example 13, which is referred to here as the first residual biomass. The material was flushed with $CO_2$, and then pressurized to 222 bar with a $CO_2$/ethanol mixture (the extractant) at 40° C. The $CO_2$ flow rate was 2.3 g/min and the ethanol flow rate was 0.12 g/min, giving an ethanol concentration of 5.0 wt % in the solvent fed to the extraction vessel. The first residual biomass was extracted at these conditions for 5.3 hr, giving a final solvent-to-feed ratio of 120 g $CO_2$/ethanol per g residual biomass. The extraction yield of oil was 2.4 wt % from this previously-extracted material. The Table below summarizes lipid analyses for the first residual biomass (the starting sample for this Example), the second residual biomass (the first residual biomass after extraction in this Example), and the oil obtained by extraction of the first residual biomass. As can be seen from the data in the Table below, the oil was found to comprise essentially pure PLs. The extractions performed previously in Example 13 had already removed neutral lipids and free fatty acids from the yeast cells.

TABLE 22

Example 20: Weight Percent Distribution of Lipid Components

| Sample | 16:0 palmitic | 18:0 Stearic | 18:1 Oleic | 18:2 Linoleic | 18:3 (n-3) ALA | 20:2 EDA | 20:3 (n-6) HGLA | 20:4 ARA | 20:4 (n-3) ETA | 20:5 EPA | other | Total |
|---|---|---|---|---|---|---|---|---|---|---|---|---|
| First Residual Biomass | 6 | 3 | 4 | 15 | 1 | 3 | 2 | 1 | 3 | 43 | 15 | 100 |
| PL | 5 | 2 | 1 | 9 | 0 | 0 | 1 | 0 | 1 | 12 | 5 | 37 |
| DAG | 0 | 0 | 0 | 1 | 0 | 0 | 0 | 0 | 0 | 2 | 1 | 5 |
| FFA | 1 | 1 | 0 | 1 | 0 | 1 | 0 | 0 | 0 | 8 | 2 | 15 |
| TAG | 1 | 1 | 2 | 7 | 1 | 1 | 1 | 0 | 1 | 24 | 4 | 42 |
| Sum | 7 | 4 | 4 | 17 | 1 | 2 | 2 | 1 | 2 | 46 | 11 | 100 |
| Second Residual Biomass | 6 | 3 | 4 | 16 | 1 | 2 | 2 | 1 | 4 | 48 | 8 | 100 |
| PL | 5 | 2 | 1 | 8 | 0 | 0 | 1 | 0 | 1 | 10 | 5 | 35 |
| DAG | 0 | 0 | 0 | 1 | 0 | 0 | 0 | 0 | 0 | 2 | 1 | 5 |
| FFA | 1 | 1 | 0 | 1 | 0 | 1 | 0 | 0 | 0 | 7 | 2 | 14 |
| TAG | 1 | 1 | 2 | 7 | 1 | 1 | 1 | 0 | 1 | 26 | 4 | 45 |
| Sum | 7 | 4 | 4 | 17 | 1 | 2 | 2 | 1 | 2 | 45 | 12 | 100 |
| Oil Extracted from First Residual Biomass (PL) | 8 | 5 | 4 | 15 | 1 | 3 | 3 | 1 | 2 | 43 | 14 | 100 |

Example 21

The purpose of this Example is to provide alternative microbial biomass comprising at least one polyunsaturated fatty acid that could be utilized as microbial biomass in the pelletization, extraction, fractionation and distillation methods described herein.

Although numerous oleaginous yeast genetically engineered for production of omega-3/omega-6 PUFAs are suitable microbial biomass according to the invention described in the present Application, representative strains of the oleaginous yeast *Yarrowia lipolytica* are described in Table 5. These include the following strains that have been deposited with the ATCC: *Y. lipolytica* strain Y2047 (producing ARA; ATCC Accession No. PTA-7186); *Y. lipolytica* strain Y2096 (producing EPA; ATCC Accession No. PTA-7184); *Y. lipolytica* strain Y2201 (producing EPA; ATCC Accession No. PTA-7185); *Y. lipolytica* strain Y3000 (producing DHA; ATCC Accession No. PTA-7187); *Y. lipolytica* strain Y4128 (producing EPA; ATCC Accession No. PTA-8614); *Y. lipolytica* strain Y4127 (producing EPA; ATCC Accession No. PTA-8802); *Y. lipolytica* strain Y8406 (producing EPA; ATCC Accession No. PTA-10025); *Y. lipolytica* strain Y8412 (producing EPA; ATCC Accession No. PTA-10026); and *Y. lipolytica* strain Y8259 (producing EPA; ATCC Accession No. PTA-10027).

Thus, for example, Table 5 shows microbial hosts producing from 25.9% to 34% GLA of total fatty acids, from 10.9% to 14% ARA of total fatty acids, from 9% to 61.8% EPA of total fatty acids and 5.6% DHA of total fatty acids.

One of skill in the art will appreciate that the methodology of the present invention is not limited to microbial biomass demonstrating high-level EPA production but is equally suitable to microbial biomass demonstrating high-level production of alternate omega-3/omega-6 PUFAs or combinations or PUFAs thereof.

Example 22A

Preparation of Untreated Microbial Biomass Comprising EPA from *Yarrowia lipolytica* Strain Z1978

This example describes recombinant *Yarrowia lipolytica* strain Z1978, engineered for the production of EPA, and means used to culture this strain using a 2-stage fed-batch process. The microbial biomass was pretreated to result in a dried, untreated microbial biomass, having 56.1 EPA % TFAs.

Generation of *Yarrowia lipolytica* Strain Z1978 from Strain Y9502

The development of strain Z1978 from strain is described in U.S. patent application Ser. No. 13/218,591 (E.I. duPont de Nemours & Co., Inc., filed Aug. 26, 2011), hereby incorporated herein by reference.

Specifically, to disrupt the Ura3 gene in strain Y9502 (see MATERIALS, supra), construct pZKUM (FIG. 6A; SEQ ID NO:1; described in Table 15 of U.S. Pat. Appl. Pub. No. 2009-0093543-A1) was used to integrate an Ura3 mutant gene into the Ura3 gene of strain Y9502. Transformation was performed according to the methodology of U.S. Pat. Appl. Pub. No. 2009-0093543-A1, hereby incorporated herein by reference. A total of 27 transformants (selected from a first group comprising 8 transformants, a second group comprising 8 transformants, and a third group comprising 11 tranformants) were grown on 5-fluoroorotic acid ["FOA"] plates (FOA plates comprise per liter: 20 g glucose, 6.7 g Yeast Nitrogen base, 75 mg uracil, 75 mg uridine and an appropriate amount of FOA (Zymo Research Corp., Orange, Calif.), based on FOA activity testing against a range of concentrations from 100 mg/L to 1000 mg/L (since variation occurs within each batch received from the supplier)). Further experiments determined that only the third group of transformants possessed a real Ura-phenotype.

For fatty acid ["FA"] analysis, cells were collected by centrifugation and lipids were extracted as described in Bligh, E. G. & Dyer, W. J. (*Can. J. Biochem. Physiol.*, 37:911-917 (1959)). Fatty acid methyl esters ["FAMEs"] were prepared by transesterification of the lipid extract with sodium methoxide (Roughan, G., and Nishida I., *Arch Biochem Biophys.*, 276(1):38-46 (1990)) and subsequently analyzed with a Hewlett-Packard 6890 GC fitted with a 30-m×0.25 mm (i.d.) HP-INNOWAX (Hewlett-Packard) column. The oven temperature was from 170° C. (25 min hold) to 185° C. at 3.5° C./min.

For direct base transesterification, *Yarrowia* cells (0.5 mL culture) were harvested, washed once in distilled water, and dried under vacuum in a Speed-Vac for 5-10 min. Sodium methoxide (100 µl of 1%) and a known amount of C15:0 triacylglycerol (C15:0 TAG; Cat. No. T-145, Nu-Check Prep, Elysian, Minn.) was added to the sample, and then the sample was vortexed and rocked for 30 min at 50° C. After adding 3 drops of 1 M NaCl and 400 µl hexane, the sample was vortexed and spun. The upper layer was removed and analyzed by GC (supra).

Alternately, a modification of the base-catalysed transersterification method described in *Lipid Analysis*, William W. Christie, 2003 was used for routine analysis of the broth samples from either fermentation or flask samples. Specifically, broth samples were rapidly thawed in room temperature water, then weighed (to 0.1 mg) into a tarred 2 mL microcentrifuge tube with a 0.22 µm Corning® Costar® Spin-X® centrifuge tube filter (Cat. No. 8161). Sample (75-800 µl) was used, depending on the previously determined DCW. Using an Eppendorf 5430 centrifuge, samples are centrifuged for 5-7 min at 14,000 rpm or as long as necessary to remove the broth. The filter was removed, liquid was drained, and ~500 µl of deionized water was added to the filter to wash the sample. After centrifugation to remove the water, the filter was again removed, the liquid drained and the filter re-inserted. The tube was then re-inserted into the centrifuge, this time with the top open, for ~3-5 min to dry. The filter was then cut approximately ½ way up the tube and inserted into a fresh 2 mL round bottom Eppendorf tube (Cat. No. 22 36 335-2).

The filter was pressed to the bottom of the tube with an appropriate tool that only touches the rim of the cut filter container and not the sample or filter material. A known amount of C15:0 TAG (supra) in toluene was added and 500 µl of freshly made 1% sodium methoxide in methanol solution. The sample pellet was firmly broken up with the appropriate tool and the tubes were closed and placed in a 50° C. heat block (VWR Cat. No. 12621-088) for 30 min. The tubes were then allowed to cool for at least 5 min. Then, 400 µl of hexane and 500 µl of a 1 M NaCl in water solution were added, the tubes were vortexed for 2×6 sec and centrifuged for 1 min. Approximately 150 µl of the top (organic) layer was placed into a GC vial with an insert and analyzed by GC.

FAME peaks recorded via GC analysis were identified by their retention times, when compared to that of known fatty acids, and quantitated by comparing the FAME peak areas with that of the internal standard (C15:0 TAG) of known amount. Thus, the approximate amount (µg) of any fatty acid FAME ["µg FAME"] is calculated according to the formula: (area of the FAME peak for the specified fatty acid/area of the standard FAME peak)*(µg of the standard C15:0 TAG), while the amount (µg) of any fatty acid ["µg FA"] is calculated according to the formula: (area of the FAME peak for the specified fatty acid/area of the standard FAME peak)*(µg of the standard C15:0 TAG)*0.9503, since 1 µg of C15:0 TAG is equal to 0.9503 µg fatty acids. Note that the 0.9503 conversion factor is an approximation of the value determined for most fatty acids, which range between 0.95 and 0.96.

The lipid profile, summarizing the amount of each individual fatty acid as a weight percent of TFAs, was determined by dividing the individual FAME peak area by the sum of all FAME peak areas and multiplying by 100.

In this way, GC analyses showed that there were 28.5%, 28.5%, 27.4%, 28.6%, 29.2%, 30.3% and 29.6% EPA of TFAs in pZKUM-transformants #1, #3, #6, #7, #8, #10 and #11 of group 3, respectively. These seven strains were designated as strains Y9502U12, Y9502U14, Y9502U17, Y9502U18, Y9502U19, Y9502U21 and Y9502U22, respectively (collectively, Y9502U).

Construct pZKL3-9DP9N (FIG. 6B; SEQ ID NO:2) was then generated to integrate one delta-9 desaturase gene, one choline-phosphate cytidylyl-transferase gene, and one delta-9 elongase mutant gene into the *Yarrowia* YALIOF32131p locus (GenBank Accession No. XM_506121) of strain Y9502U. The pZKL3-9DP9N plasmid contained the following components:

TABLE 23

Description of Plasmid pZKL3-9DP9N (SEQ ID NO: 2)

| RE Sites And Nucleotides Within SEQ ID NO: 2 | Description Of Fragment And Chimeric Gene Components |
|---|---|
| AscI/BsiWI (887-4) | 884 bp 5' portion of YALI0F32131p locus (GenBank Accession No. XM_506121, labeled as "Lip3-5" in Figure) |
| PacI/SphI (4396-3596) | 801 bp 3' portion of YALI0F32131p locus (GenBank Accession No. XM_506121, labeled as "Lip3-3" in Figure) |
| SwaI/BsiWI (11716 - 1) | YAT1::EgD9eS-L35G::Pex20, comprising: YAT1: *Yarrowia lipolytica* YAT1 promoter (labeled as "YAT" in Figure; U.S. patent application Pub. No. 2010-0068789A1); EgD9eS-L35G: Synthetic mutant of delta-9 elongase gene (SEQ ID NO: 3; U.S patent application No. 13/218,591), derived from *Euglena gracilis* ("EgD9eS"; U.S. Pat. No. 7,645,604); Pex20: Pex20 terminator sequence from *Yarrowia* Pex20 gene (GenBank Accession No. AF054613) |
| PmeI/SwaI (8759-11716) | GPDIN::YID9::Lip1, comprising: GPDIN: *Yarrowia lipolytica* GPDIN promoter (U.S. Pat. No. 7,459,546); YID9: *Yarrowia lipolytica* delta-9 desaturase gene (GenBank Accession No. XM_501496; SEQ ID NO: 5); Lip1: Lip1 terminator sequence from *Yarrowia* Lip1 gene (GenBank Accession No. Z50020) |
| ClaI/PmeI (6501-8759) | EXP1::YIPCT::Pex16, comprising: EXP1: *Yarrowia lipolytica* export protein (EXP1) promoter (labeled as "Exp" in Figure; U.S Pat. No. 7,932,077); YIPCT: *Yarrowia lipolytica* choline-phosphate cytidylyl-transferase ["PCT"] gene (GenBank Accession No. XM_502978; SEQ ID NO: 7); Pex16: Pex16 terminator sequence from *Yarrowia* Pex16 gene (GenBank Accession No. U75433) |
| SalI/EcoRI (6501-4432) | *Yarrowia* Ura3 gene (GenBank Accession No. AJ306421) |

The pZKL3-9DP9N plasmid was digested with AscI/SphI, and then used for transformation of strain Y9502U17. The transformant cells were plated onto Minimal Media ["MM"] plates and maintained at 30° C. for 3 to 4 days (Minimal Media comprises per liter: 20 g glucose, 1.7 g yeast nitrogen base without amino acids, 1.0 g proline, and pH 6.1 (do not need to adjust)). Single colonies were re-streaked onto MM plates, and then inoculated into liquid MM at 30° C. and shaken at 250 rpm/min for 2 days. The cells were collected by centrifugation, resuspended in High Glucose Media ["HGM"] and then shaken at 250 rpm/min for 5 days (High Glucose Media comprises per liter: 80 glucose, 2.58 g $KH_2PO_4$ and 5.36 g $K_2HPO_4$, pH 7.5 (do not need to adjust)). The cells were subjected to fatty acid analysis, supra.

GC analyses showed that most of the selected 96 strains of Y9502U17 with pZKL3-9DP9N produced 50-56% EPA of TFAs. Five strains (i.e., #31, #32, #35, #70 and #80) that produced about 59.0%, 56.6%, 58.9%, 56.5%, and 57.6% EPA of TFAs were designated as Z1977, Z1978, Z1979, Z1980 and Z1981 respectively. The final genotype of these pZKL3-9DP9N transformant strains with respect to wildtype *Yarrowia lipolytica* ATCC #20362 was Ura+, Pex3-, unknown 1-, unknown 2-, unknown 3-, unknown 4-, unknown 5-, unknown 6-, unknown 7-, unknown 8-, unknown 9-, unknown 10-, unknown 11-, YAT1::ME3S::Pex16, GPD::ME3S::Pex20, YAT1::ME3S::Pex20, YAT1::ME3S::Lip1, FBAINm::EgD9eS::Lip2, EXP1::EgD9eS::Lip1, GPAT::EgD9e::Lip2, YAT1::EgD9eS::Lip2, YAT::EgD9eS-L35G::Pex20, FBAINm::EgD8M::Pex20, EXP1::EgD8M::Pex16, FBAIN::EgD8M::Lip1, GPD::EaD8S::Pex16 (2 copies), YAT1::E389D9eS/EgD8M::Lip1, YAT1::EgD9eS/EgD8M::Aco, FBAINm::EaD9eS/EaD8S::Lip2, GPDIN::YID9::Lip1, GPD::FmD12::Pex20, YAT1::FmD12::Oct, EXP1::FmD12S::Aco, GPDIN::FmD12::Pex16, EXP1::EgD5M::Pex16, FBAIN::EgD5SM::Pex20, GPDIN::EgD5SM::Aco, GPM::EgD5SM::Oct, EXP1::EgD5SM::Lip1, YAT1::EaD5SM::Oct, FBAINm::PaD17::Aco, EXP1::PaD17::Pex16, YAT1::PaD17S::Lip1, YAT1::YICPT::Aco, YAT1::MCS::Lip1, FBA::MCS::Lip1, YAT1::MaLPAAT1S::Pex16, EXP1::YIPCT::Pex16.

Knockout of the YALIOF32131p locus (GenBank Accession No. XM_50612) in strains Z1977, Z1978, Z1979, Z1980 and Z1981 was not confirmed in any of these EPA strains produced by transformation with pZKL3-9DP9N.

Cells from YPD plates of strains Z1977, Z1978, Z1979, Z1980 and Z1981 were grown and analyzed for total lipid content and composition, according to the methodology below.

For a detailed analysis of the total lipid content and composition in a particular strain of Y. lipolytica, flask assays were conducted as followed. Specifically, one loop of freshly streaked cells was inoculated into 3 mL Fermentation Medium ["FM"] medium and grown overnight at 250 rpm and 30° C. (Fermentation Medium comprises per liter: 6.70 g/L yeast nitrogen base, 6.00 g $KH_2PO_4$, 2.00 g $K_2HPO_4$, 1.50 g $MgSO_4 \cdot 7H_2O$, 20 g glucose and 5.00 g yeast extract (BBL)). The $OD_{600nm}$ was measured and an aliquot of the cells was added to a final $OD_{600nm}$ of 0.3 in 25 mL FM medium in a 125 mL flask. After 2 days in a shaker incubator at 250 rpm and at 30° C., 6 mL of the culture was harvested by centrifugation and resuspended in 25 mL HGM in a 125 mL flask. After 5 days in a shaker incubator at 250 rpm and at 30° C., a 1 mL aliquot was used for fatty acid analysis (supra) and 10 mL dried for dry cell weight ["DCW"] determination.

For DCW determination, 10 mL culture was harvested by centrifugation for 5 min at 4000 rpm in a Beckman GH-3.8 rotor in a Beckman GS-6R centrifuge. The pellet was resuspended in 25 mL of water and re-harvested as above. The washed pellet was re-suspended in 20 mL of water and transferred to a pre-weighed aluminum pan. The cell suspension was dried overnight in a vacuum oven at 80° C. The weight of the cells was determined.

Total lipid content of cells ["TFAs % DOW"] is calculated and considered in conjunction with data tabulating the concentration of each fatty acid as a weight percent of TFAs ["% TFAs"] and the EPA content as a percent of the dry cell weight ["EPA % DCW"].

Thus, Table 24 below summarizes total lipid content and composition of strains Z1977, Z1978, Z1979, Z1980 and Z1981, as determined by flask assays. Specifically, the Table summarizes the total dry cell weight of the cells ["DCW"], the total lipid content of cells ["TFAs % DCW"], the concentration of each fatty acid as a weight percent of TFAs ["% TFAs"] and the EPA content as a percent of the dry cell weight ["EPA % DCW"].

TABLE 24

Total Lipid Content And Composition In *Yarrowia* Strains Z1977, Z1978, Z1979, Z1980 and Z1981 By Flask Assay

| Strain | DCW (g/L) | TFAs % DCW | % TFAs | | | | | | | | | | | | EPA % DCW |
|---|---|---|---|---|---|---|---|---|---|---|---|---|---|---|---|
| | | | 16:0 | 16:1 | 18:0 | 18:1 | 18:2 | ALA | EDA | DGLA | ARA | EtrA | ETA | EPA | other | |
| Z1977 | 3.8 | 34.3 | 2.0 | 0.5 | 1.9 | 4.6 | 11.2 | 0.7 | 3.1 | 3.3 | 0.9 | 0.7 | 2.2 | 59.1 | 9.9 | 20.3 |
| Z1978 | 3.9 | 38.3 | 2.4 | 0.4 | 2.4 | 4.8 | 11.1 | 0.7 | 3.2 | 3.3 | 0.8 | 0.6 | 2.1 | 58.7 | 9.5 | 22.5 |
| Z1979 | 3.7 | 33.7 | 2.3 | 0.4 | 2.4 | 4.1 | 10.5 | 0.6 | 3.2 | 3.6 | 0.9 | 0.6 | 2.2 | 59.4 | 9.8 | 20.0 |
| Z1980 | 3.6 | 32.7 | 2.1 | 0.4 | 2.2 | 4.0 | 10.8 | 0.6 | 3.1 | 3.5 | 0.9 | 0.7 | 2.2 | 59.5 | 10.0 | 19.5 |
| Z1981 | 3.5 | 34.3 | 2.2 | 0.4 | 2.1 | 4.2 | 10.6 | 0.6 | 3.3 | 3.4 | 1.0 | 0.8 | 2.2 | 58.5 | 10.7 | 20.1 |

Strain Z1978 was subsequently subjected to partial genome sequencing (U.S. patent application Ser. No. 13/218, 591). This work determined that four (not six) delta-5 desaturase genes were integrated into the *Yarrowia* genome (i.e., EXP1::EgD5M::Pex16, FBAIN::EgD5SM::Pex20, EXP1::EgD5SM::Lip1, and YAT1::EaD5SM::Oct).

Fermentation Of *Yarrowia lipolytica* Strain Z1978

*Yarrowia lipolytica* strain Z1978 was grown in a 2-stage fed-batch process, as described in the MATERIALS section, supra.

After fermentation, the yeast biomass was dewatered and washed to remove salts and residual medium, and to minimize lipase activity. Drum drying followed, to reduce the moisture to less than 5% to ensure oil stability during short term storage and transportation.

Characterization of the Dried and Untreated *Yarrowia lipolytica* Strain Z1978 Biomass The fatty acid composition of the dried and untreated yeast biomass was analyzed using the following gas chromatography ["GC"] method. Specifically, the triglycerides were converted to fatty acid methyl esters ["FAMEs"] by transesterification using sodium methoxide in methanol. The resulting FAMEs were analyzed using an Agilent 7890 GC fitted with a 30-m×0.25 mm (i.d.) OMEGAWAX (Supelco) column after dilution in toluene/hexane (2:3). The oven temperature was increased from 160° C. to 200° C. at 5° C./min, and then 200° C. to 250° C. (hold for 10 min) at 10° C./min.

FAME peaks recorded via GC analysis were identified by their retention times, when compared to that of known methyl esters ["MEs"], and quantitated by comparing the FAME peak areas with that of the internal standard (C15:0 triglyceride, taken through the transesterification procedure with the sample) of known amount. Thus, the approximate amount (mg) of any fatty acid FAME ["mg FAME"] is calculated according to the formula: (area of the FAME peak for the specified fatty acid/area of the 15:0 FAME peak)*(mg of the internal standard C15:0 FAME). The FAME result can then be corrected to mg of the corresponding fatty acid by dividing by the appropriate molecular weight conversion factor of 1.042-1.052.

The lipid profile, summarizing the amount of each individual fatty acid as a weight percent of TFAs, was approximated (to within ±0.1 weight %) by dividing the individual FAME peak area by the sum of all FAME peak areas and multiplying by 100.

The dried and untreated yeast biomass from *Yarrowia lipolytica* strain Z1978 contained 56.1 EPA % TFAs, as shown in the Table below.

TABLE 25

Fatty Acid Composition Of Dried And Untreated Z1978 Biomass

| Fatty acid | Weight Percent Of Total Fatty Acids |
|---|---|
| C18:2 (omega-6) | 14.2 |
| C20:5 EPA | 56.1 |
| C22:6 DHA | non-detectable (<0.05) |
| Other components | 29.7 |

Example 22B

Preparation of a SPD-Purified Microbial Oil Having Reduced Sterol Content from Untreated *Yarrowia lipolytica* Strain Z1978 Biomass The present Example describes means used to disrupt the dried and untreated *Yarrowia lipolytica* strain Z1978 biomass of Example 22A via extrusion and pelletization, extract the oil using supercritical fluid extraction ["SCFE"], and reduce the sterol content of the oil by distillation, using short path distillation conditions to result in a lipid-containing fraction (i.e., the SPD-purified microbial oil).

Disruption and Pelletization Via Extrusion of Dried, Untreated Yeast Biomass

The dried and untreated *Y. lipolytica* strain Z1978 biomass of Example 22A was fed to a twin screw extruder. Specifically, a mixture of 84 weight percent yeast (containing approximately 39% total microbial oil) and 16% diatomaceous earth (Celatom MN-4; EP Minerals, LLC, Reno, Nev.) was fed to a 40 mm twin screw extruder (Coperion Werner Pfleiderer ZSK-40 mm MC, Stuttgart, Germany) at a rate of 23 kg/hr. A water/sucrose solution made of 26.5% sucrose was injected after the disruption zone of the extruder at a flow rate of 70 mL/min. The extruder was operated with a 37 kW motor and high torque shaft, at 140 rpm. The % torque range was 17-22. The resulting disrupted yeast powder was cooled to 35° C. in a final water cooled barrel. The moist extruded powder was fed into a LCI Multi-Granulator Model No. MG-55 (LCI Corporation, Charlotte, N.C.) assembled with a 1 mm hole diameter by 1 mm thick screen and set to 80 RPM. Extrudate was formed at 27 kg/hr with a steady 2.2 amp current draw and was dried using conventional drying equipment. Dried pellets, approximately 1 mm diameter×6 to 10 mm in length, had a final moisture content of 1.7%, as measured on a Sartorius MA35 moisture analyzer (Sartorius AG, Goettingen, Germany).

Extraction of the Extruded Yeast Biomass

The extruded yeast pellets were extracted using supercritical fluid phase carbon dioxide ($CO_2$) as the extraction solvent to produce a triglyceride-rich extracted oil containing EPA. Specifically, the yeast pellets were charged to a 320 L stainless steel extraction vessel and packed between plugs of polyester foam filtration matting (Aero-Flo Industries, Kingsbury, Ind.). The vessel was sealed, and then $CO_2$ was metered by a commercial compressor (Pressure Products Industries) through a heat exchanger (pre-heater) and fed into the vertical extraction vessel to extract the triglyceride-rich oil from the pellets of disrupted yeast. The extraction temperature was controlled by the pre-heater, and the extraction pressure was maintained with an automated control valve (Kammer) located between the extraction vessel and a separator vessel. The $CO_2$ and oil extract were expanded to a lower pressure through this control valve. The extracted oil was collected from the expanded solution as a precipitate in the separator. The temperature of the expanded $CO_2$ phase in the separator was controlled by use of an additional heat exchanger located upstream of the separator. This lower pressure $CO_2$ stream exited the top of the separator vessel and was recycled back to the compressor through a filter, a condenser, and a mass flow meter. The extracted oil was periodically drained from the separator and collected as product.

The extraction vessel was initially charged with 150 kg of the extruded yeast pellets. The triglyceride-rich oil was then extracted from the pellets with supercritical fluid $CO_2$ at 5000 psig (345 bar), 55° C., and a solvent-to-feed ratio of 32 kg $CO_2$ per kg of starting yeast pellets. A total of 39.6 kg of extracted oil was collected from the separator vessel, to which was added about 1000 ppm each of two antioxidants: Covi-ox T70 (Cognis, Ontario, Canada) and Dadex RM (Nealanders, Ontario, Canada). The extracted oil contained 661 mg ergosterol/100 g of oil, as determined by GC analysis (infra).

Specifically, ergosterol content was determined by high-performance liquid chromatography (HPLC) with ultraviolet (UV) detection. Extracted oil samples (100 mg) were diluted with 14 mL of 9:10 2-propanol:1-heptanol and mixed well. Calibration standards of 96% pure ergosterol (Alfa Aesar, Inc., Ward Hill, Mass.) were prepared in the range of 10 to 300 µg/mL in 2-propanol. Samples and standards were chromatographed on a XDB-C8 HPLC column (4.6 mm id., 150 mm length, 5 µm particle size, Agilent Technologies, Inc., Wilmington, Del.) using an 0.02% ammonium carbonate in water-acetonitrile gradient from 65 to 100% acetonitrile in 12.5 min. The injection volume was 5 µL, the flow rate was 1.2 mL/min and the column temperature was 50° C. The UV (282 nm) response of the ergosterol peak was compared with those of the calibration standards analyzed under the same conditions.

Distillation Under SPD Conditions

The extracted oil was degassed and then passed through a 6" stainless steel molecular still (POPE Scientific, Saukville, Wis.) using a feed rate of 12 kg/hr to remove residual water. The surface temperatures of the evaporator and condenser were set at 140° C. and 15° C., respectively. The vacuum was maintained at 15 torr. Approximately 3 wt. % of the extracted oil was removed as water in the distillate. The dewatered, extracted oil was substantially free of phospholipids, containing 0.5 ppm of phosphorous. Upon visual inspection, the dewatered, extracted oil was cloudy at room temperature.

The dewatered, extracted oil was passed through the 6" molecular still at a feed rate of 12 kg/hr for a second time. The vacuum was lowered to 1 mtorr, and the surface temperatures of the evaporator and condenser were maintained at 240° C. and 50° C., respectively. Approximately 7 wt. % of the dewatered, extracted oil was removed as the distillate; this fraction contained mainly free fatty acids and ergosterol. A triacylglycerol-containing fraction (i.e., the lipid-containing fraction or SPD-purified oil) was also obtained, containing 284 mg ergosterol/100 g oil (a ~57% reduction in ergosterol content, when compared to ergosterol content in the extracted oil). The SPD-purified oil was clear after being stored at 10° C. for several days.

Example 23

Preparation of a SPD-Purified Microbial Oil Having Reduced Sterol Content from Untreated *Yarrowia lipolytica* Strain Y9502 Biomass The present Example describes means used to disrupt dried and untreated *Yarrowia lipolytica* strain Y9502 biomass via extrusion, extract the oil using supercritical fluid extraction ["SCFE"], and reduce the sterol content of the oil by distillation, using short path distillation conditions to result in a lipid-containing fraction (i.e., the SPD-purified microbial oil).

Preparation of Dried and Untreated *Yarrowia lipolytica* Strain Y9502 Biomass

*Y. lipolytica* strain Y9502 was cultured in a 2-stage fed-batch process and the resulting microbial biomass was dewatered, washed and dried, according to the methodology set forth in Example 22A.

Disruption Via Extrusion of Dried, Untreated Yeast Biomass

The dried and untreated *Y. lipolytica* strain Y9502 biomass was fed to a twin screw extruder. Specifically, the yeast biomass (containing approximately 37% total microbial oil) was fed to a 70 mm twin screw extruder (Coperion Werner Pfleiderer ZSK-70 mm SCD, Stuttgart, Germany) at a rate of 270 kg/hr, in the absence of diatomaceous earth.

The extruder was operated with a 150 kW motor and high torque shaft at 150 rpm and 33 percent of the total amp range. The resulting disrupted yeast biomass was cooled to 81° C. in the final water cooled barrel. The moisture content of the disrupted biomass was 2.8 wt. %, as measured on a Sartorius MA35 moisture analyzer (Sartorius AG, Goettingen, Germany).

Extraction of the Extruded Yeast Biomass

The extruded yeast biomass was mixed with diatomaceous earth to prevent bed compaction and extracted using supercritical fluid phase $CO_2$ as the extraction solvent to produce a crude triglyceride oil containing EPA (i.e., "Extracted oil"). Specifically, a total of 82.7 kg of the extruded yeast biomass was mixed with 41 kg of diatomaceous earth (Celatom MN-4; EP Minerals, LLC, Reno, Nev.) and charged to a 320 L stainless steel extraction vessel, configured in a manner identical to that described in Example 22B, with the following exceptions: (i) the extraction temperature was controlled to 40° C. by the pre-heater; (ii) the extraction pressure was maintained at 4500 psig (310 bar); (iii) a solvent-to-feed ratio of 44 kg $CO_2$ per kg of starting yeast was used for the extraction. In this way, 23.2 kg oil was extracted from the disrupted yeast. The extracted oil contained 774 mg ergosterol/100 g oil, as determined by GC analysis according to the methodology of Example 22B.

Distillation Under SPD Conditions

The extracted oil was passed through a 2" glass molecular still to provide a dewatered, extracted oil. The flow rate was maintained at approximately 480 g/hr. The vacuum, evaporator and condenser temperatures were 0.2 mm Hg, 130° C. and 60° C., respectively. The dewatered, extracted oil was then passed through the still three times at different temperatures at a vacuum of 1 mtorr, as shown in the Table below. After each pass, the ergosterol level, EPA content (as a wt. % of TFAs) and total Omega-3 content (as a wt. % of TFAs) in the triacylglycerol-containing fraction (i.e., the lipid-containing fraction or SPD-purified oil) were determined, as previously described.

TABLE 26

Ergosterol And PUFA Content In SPD-Purified Oil

|  | Pass 1 | Pass 2 | Pass 3 |
| --- | --- | --- | --- |
| Temperature (° C.) | 210 | 240 | 270 |
| Ergosterol (mg/100 g) | 110 | 52.8 | 1.21 |
| C20:5 EPA (wt. % TFAs) | 54.9 | 55.2 | 55.4 |
| Total Omega-3 (wt. % TFAs) | 57.51 | 57.92 | 57.18 |

Thus, at 210° C., the ergosterol level in the SPD-purified oil was 110 mg/100 g of oil and it was reduced to about 53 mg/100 g of oil at 240° C. The ergosterol was almost completely removed to 1 mg/100 g of oil when the temperature was further increased to 270° C. This corresponds to a ~57%, ~86% and ~99.8% reduction in ergosterol content in Pass 1, Pass 2 and Pass 3, respectively, when compared to ergosterol content in the extracted oil.

With respect to the PUFA content in the SPD-purified oil, the data of Table 26 demonstrate that no significant degradation of EPA or total Omega-3 content occurred, even when the oil was passed through the SPD still at 270° C.

The SPD-purified oil of Pass 3 was further analyzed for the appearance of unexpected components and contaminants using chromatographic profiling. Specifically, testing was done by: (i) gas chromatography with flame ionization detection (GC/FID); (ii) thin-layer chromatography (TLC); and, (iii) liquid chromatography with mass spectrometric, light scattering and ultraviolet detection (HPLC/MS/ELSD/UV). The GC/FID profile was run on the methyl esters of the SPD-purified oil sample. The TLC and HPLC/MS/ELSD/UV profiles were run on the SPD-purified oil directly. In all cases, the SPD-purified oil profile was compared with a reference oil prepared with *Y. lipolytica* strain Y4305 biomass (MATERIALS, supra).

Specifically, the reference oil was produced from dried and untreated *Y. lipolytica* strain Y4305 biomass, according to the methodology set forth in Example 22A. The dried and untreated biomass was mechanically disrupted using a media mill with an oil to iso-hexane solvent ratio of 1 to 7. The residual biomass (i.e., cell debris) was removed using a decanter centrifuge and the solvent was evaporated to yield an extracted oil containing triglycerides. The extracted oil was degummed using cold acetone with an extracted oil to solvent ratio of 1 to 1.5, followed by acid degumming with 50% aqueous citric acid. The degummed oil was then bleached with an acid-activated clay and deodorized at 210° C. for 30 min to yield the reference oil sample.

None of the chromatographic profiles of the SPD-purified oil of Pass 3 contained any peaks that were not seen in the profile of the reference sample. Both samples were run on the same day under the same conditions. Additionally, there were no unidentified peaks in of the SPD-purified oil that had significantly higher responses than the corresponding peaks in the profile of the reference sample. Also, none of the peaks in the SPD-purified oil of Pass 3 had higher responses than the corresponding peaks in the SPD-purified oil of Pass 1 or Pass 2, which were produced at lower temperatures (i.e., 210° C. and 240° C., respectively). These analyses show that the removal of ergosterol at high temperatures using SPD does not lead to the appearance of degradation products in the oil; thus, it is hypothesized that no significant degradation of the PUFAs occurs by application of this processing technique.

Example 24

Preparation of a SPD-Purified Microbial Oil Having Reduced Sterol Content from Untreated *Yarrowia lipolytica* Strain Y8672 Biomass The present Example describes means used to disrupt dried and untreated *Yarrowia lipolytica* strain Y8672 biomass via mechanical disruption using a media mill, extract the crude oil using iso-hexane solvent, and reduce the sterol content of the acetone-degummed oil by distillation, using short path distillation conditions to result in a lipid-containing fraction (i.e., the SPD-purified microbial oil).

Preparation of Dried and Untreated *Yarrowia lipolytica* Strain Y8672 Biomass

*Y. lipolytica* strain Y8672 was cultured in a 2-stage fed-batch process and the resulting microbial biomass was dewatered, washed and dried, according to the methodology set forth in Example 22A.

Disruption and Extraction Via Media Mill and Iso-Hexane Solvent of Dried, Untreated Yeast Biomass to Produce Extracted Oil The dried and untreated *Y. lipolytica* strain Y8672 biomass was mechanically disrupted using a media mill with iso-hexane solvent. The residual biomass (i.e., cell debris) was removed using a decanter centrifuge and the solvent was evaporated to yield an extracted oil containing triglycerides.

The extracted oil was analyzed using the methodology of Example 22B. The microbial oil contained 58.1 EPA % TFAs, as shown in the Table below.

TABLE 27

Fatty Acid Composition of Extracted Y8672 Microbial Oil

| Fatty acid | Weight Percent Of Total Fatty Acids |
|---|---|
| C18:2 (omega-6) | 15.6 |
| C20:5 EPA | 58.1 |
| C22:6 DHA | non-detectable |
| Other components | 26.3 |

A portion of the extracted oil was degummed using cold acetone with a extracted oil to solvent ratio of 1 to 1.5. The acetone-degummed oil contained 880 mg ergosterol/100 g oil and 74.5 ppm of phosphorous.

Distillation Under SPD Conditions

The acetone-degummed oil was subjected to short path distillation, according to the methodology of Example 22B (except the evaporator temperature was set at 255° C.). Almost no distillate was collected during the first pass since there was very little water in the acetone-degummed oil. During the second pass, roughly 12 wt. % of distillate was collected. The final ergosterol level in the triacylglycerol-containing fraction (i.e., the lipid-containing fraction or SPD-purified oil) was 106 mg/100 g (a ~88% reduction in ergosterol content, when compared to ergosterol content in the acetone-degummed oil); the SPD-purified oil contained 66 ppm of phosphorous.

Example 25

Preparation of a Non-Concentrated Microbial Oil Comprising 56.1% EPA of Total Fatty Acids ["TFAs"]

The present Example describes the isolation of a non-concentrated microbial oil obtained from microbial biomass of recombinant *Yarrowia lipolytica* strain Z1978 cells, engineered for the production of EPA.

Specifically, *Y. lipolytica* strain Z1978 was cultured using a 2-stage fed-batch process. Microbial oil was then isolated from the biomass via drying, extracted (via a combination of extrusion, pelletization and supercritical fluid extraction), and purified via short path distillation, yielding a non-concentrated, triglyceride-rich SPD-purified oil comprising 56.1 EPA % TFAs (i.e., the lipid-containing fraction).

Fermentation and Disruption Via Extrusion and Pelletization of Dried, Untreated *Yarrowia lipolytica* Strain Z1978 Biomass A *Y. lipolytica* strain Z1978 culture was fermented and the microbial biomass was harvested and dried, as described in the MATERIALS, supra. The dried and untreated biomass was then fed to a twin screw extruder. Specifically, a mixture of the biomass and 15% of diatomaceous earth (Celatom MN-4 or Celite 209, EP Minerals, LLC, Reno, Nev.) were premixed and then fed to ZSK-40 mm MC twin screw extruder (Coperion Werner & Pfleiderer, Stuttgart, Germany) at a rate of 45.5 kg/hr. A water/sucrose solution made of 26.5% sucrose was injected after the disruption zone of the extruder at a flow rate of 147 mL/min. The extruder was operated at 280 rpm with a % torque range of 20-23. The resulting disrupted yeast powder was cooled to 35° C. in a final water cooled barrel. The moist extruded powder was then fed into a LCI Dome Granulator Model No. TDG-80 (LCI Corporation, Charlotte, N.C.) assembled with a multi-bore dome die 1 mm diameter by 1 mm thick screen and set to 82 RPM. Extrudate was formed at 455-600 kg/hr (as-dried rate). The sample was dried in a vibratory fluid bed dryer (FBP-75, Carman Industries, Inc., Jeffersonville, Ind.) with a drying zone of 0.50 $m^2$ with 1150 standard cubic feet per minute ["scfm"] of air flow maintained at 100° C. and a cooling zone of 0.24 $m^2$ operating with an air flow estimated at 500-600 scfm at 18° C. Dried pellets, approximately 1 mm diameter×6 to 10 mm in length, exited the dryer in the 25-30° C. range, having a final moisture content of 5-6% measured on an O'Haus moisture analyzer (Parsippany, N.J.).

Oil Extraction of the Extruded Yeast Biomass

The extruded yeast pellets were extracted using supercritical fluid phase $CO_2$ as the extraction solvent to produce non-concentrated triglyceride-rich extracted oil, using a 320 L stainless steel extraction vessel as described in Example 22B.

The extraction vessel was initially charged with approximately 150 kg of the extruded yeast pellets. The non-concentrated extracted oil was then extracted from the pellets with supercritical fluid $CO_2$ at 5000 psig (345 bar), 55° C., and a solvent-to-feed ratio ranging from 40 to 50 kg $CO_2$ per kg of starting yeast pellets. Roughly 37.5 kg of non-concentrated extracted oil was collected from the separator vessel, to which was added about 1000 ppm each of two antioxidants, i.e. Covi-ox T70 (Cognis, Mississauga, Canada) and Dadex RM (Nealanders, Mississauga, Canada).

Distillation Under SPD Conditions

The non-concentrated extracted oil was degassed and then passed through a 6" molecular still (POPE Scientific, Saukville, Wis.) using a feed rate of 12 kg/hr to remove residual water. The surface temperatures of the evaporator and condenser were set at 140° C. and 15° C., respectively. The vacuum was maintained at 15 torr.

The dewatered extracted oil was passed through the molecular still at a feed rate of 12 kg/hr for a second time to remove undesired lower-molecular weight compounds, such as ergosterol and free fatty acids in the distillate. The vacuum was lowered to 1 mtorr, and the surface temperatures of the evaporator were maintained between 240° C. and 270° C. A triacylglycerol-containing fraction (i.e., the SPD-purified oil) was obtained, having reduced sterols relative to the sterol content in the non-concentrated extracted oil. The non-concentrated SPD-purified oil was cooled to below 40° C. before packaging.

Characterization of Non-Concentrated SPD-Purified Oil from *Yarrowia lipolytica* Strain Z1978

The fatty acid composition of the non-concentrated SPD-purified oil (i.e., the lipid containing fraction) from strain Z1978 was analyzed, following transesterification, according to the methodology of Example 27. The SPD-purified oil contained 56.1 EPA % TFAs and DHA was non-detectable (i.e. <0.05%), as shown below in Table 28.

TABLE 28

Fatty Acid Composition Of Non-Concentrated
*Yarrowia lipolytica* Z1978 SPD-Purified Oil

| Fatty acid | Weight Percent Of Total Fatty Acids |
| --- | --- |
| C18:2 (omega-6) | 14.2 |
| C20:5 EPA | 56.1 |
| C22:6 DHA | non-detectable (<0.05%) |
| Other components | 29.7 |

Example 26

Creation of Solid Pellets from *Nannochloropsis* Algae and Oil Extraction Thereof The present example describes tests performed to demonstrate the applicability of the methodologies disclosed herein for use with a microbial biomass other than *Yarrowia*. Specifically, *Nannochloropsis* biomass was mixed with a grinding agent and binding agent, to provide solid pellets. These pellets were subjected to supercritical $CO_2$ extraction and total extraction yields were compared.

Kuehnle Agrosystems, Inc. (Honolulu, Hi.) provides a variety of axenic, unialgal stock algae for purchase. Upon request, they suggested algae strain KAS 604, comprising a *Nannochloropsis* species, as an appropriate microbial biomass having a lipid content of at least 20%. The biomass was grown under standard conditions (not optimizing conditions for oil content) and dried by Kuehnle Agrosystems, Inc. and then the microalgae powder was purchased for use below.

91.7 parts of microalgae powder were premixed in a bag with 8.3 parts of Celatom MN-4 D-earth. The resultant dry mix was fed at 0.91 kg/hr to an 18 mm twin screw extruder (Coperion Werner Pfleiderer ZSK-18 mm MC). Along with the dry feed, a 31% aqueous solution of sugar made of 10.9 parts water and 5.0 parts sugar was injected after the disruption zone of the extruder at a flow-rate of 2.5 mL/min. The extruder was operating with a 10 kW motor and high torque shaft, at 200 rpm and % torque range of 46-81 to provide a disrupted yeast powder cooled to 31° C. in a final water cooled barrel.

The fixable mix was then fed into a MG-55 LCI Dome Granulator assembled with 1.2 mm diameter holes by 1.2 mm thick screen and set to 20 RPM. Extrudates were formed at 20 kg/hr and a 6-7 amp current. The sample was dried in a Sherwood Dryer at 70° C. for 20 min to provide solid pellets having a final moisture level of 4.9%. The solid pellets, approximately 1.2 mm diameter×2 to 8 mm in length, were 82.1% algae, with the remainder of the composition being pelletization aids. The amount of total and free oil in the solid *Nannochloropsis* pellets was then determined and compared to the amount of oil extracted from the solid *Nannochloropsis* pellets by SCF.

Determination of Total Oil Content in Solid *Nannochloropsis* Pellets

Specifically, total oil was determined on the pelletized sample by gently grinding it into a fine powder using a mortar and pestle, and then weighing aliquots (in triplicate) for analysis. The fatty acids in the sample (existing primarily as triglycerides) were converted to the corresponding methyl esters by reaction with acetyl chloride/methanol at 80° C. A C15:0 internal standard was added in known amounts to each sample for calibration purposes. Determination of the individual fatty acids was made by capillary gas chromatography with flame ionization detection (GC/FID). The sum of the fatty acids (expressed in triglyceride form) was 6.1%; this was taken to be the total oil content of the sample. After normalization, since the algae in the pellets represented only 82.1% of the total mass, the total oil content in the algae was determined to be 7.4% (i.e., 6.1% divided by 0.821).

The distribution of the individual fatty acids within the total oil sample is shown in the Table below.

TABLE 29

Distribution Of Fatty Acids In Solid *Nannochloropsis* Pellets

| Fatty Acid | Percent (w/w) found (as free fatty acid) |
| --- | --- |
| Saturated fatty acids | 1.4 |
| C16:0 Palmitic acid | 1.3 |
| C18:0 Stearic acid | 0.06 |
| Monounsaturated fatty acids | 0.8 |
| C16:1 Palmitoleic acid | 0.4 |
| C18:1, n-9 Oleic acid | 0.2 |
| C18:1 Octadecanoic acid | 0.04 |
| Polyunsaturated fatty acids | 2.7 |
| C18:2, n-6 Linoleic acid | 0.8 |
| C18:3, n-3 alpha-Linolenic acid | 1.2 |
| C20:4, n-6 Arachiodonic acid | 0.1 |
| C20:5, n-3 Eicosapentaenoic acid | 0.6 |
| Unknown fatty acids | 1.2 |

Determination of Free Oil Content in Solid *Nannochloropsis* Pellets

Free oil is normally determined by stirring a sample with n-heptane, centrifuging, and then evaporating the supernatant to dryness. The resulting residual oil is then determined gravimetrically and expressed as a weight percentage of the original sample. This procedure was not found to be satisfactory for the pelletized algae sample, because the resulting residue contained significant levels of pigments. Thus, the procedure above was modified by collecting the residue as above, adding the C15:0 internal standard in known amount, and then analyzing by GC/FID using the same parameters as for total oil determination. In this way, the free oil content of the sample was determined to be 3.7%. After normalization, the free oil content in the algae was determined to be 4.5% (i.e., 3.7% divided by 0.821).

SCF Extraction of Solid *Nannochloropsis* Pellets

The extraction vessel was charged with 24.60 g of solid pellets (on a dry weight basis), resulting in about 21.24 g of algae on correcting for the grinding and binding agents. The pellets were flushed with $CO_2$, then heated to about 40° C. and pressurized to approximately 311 bar. The pellets were extracted at these conditions at a flow rate of 3.8 g/min $CO_2$ for about 6.7 hr, giving a final solvent-to-feed (S/F) ratio of approximately 71 g $CO_2$/g algae. The extraction yield was 6.2% of the charged algae.

Based on the above, it is concluded that the process described herein [i.e., comprising steps of (a) mixing a microbial biomass, having a moisture level and comprising oil-containing microbes, and at least one grinding agent capable of absorbing oil, to provide a disrupted biomass mix comprising disrupted microbial biomass; (b) blending at least one binding agent with said disrupted biomass mix to provide a fixable mix capable of forming a solid pellet; and (c) forming said solid pellet from the fixable mix] can be successfully utilized to produce solid pellets comprising disrupted microbial biomass from *Nannochloropsis*. It is hypothesized that the methodology will prove suitable for numerous other oil-containing microbes, although it is expected that optimization of the process for each particular microbe will lead to increased disruption efficiencies.

Furthermore, the present Example demonstrates that the solid *Nannochloropsis* pellets can be extracted with a solvent to provide an extract comprising the oil, in a variety of means. As is well known in the art, different extraction methods will result in different amounts of extracted oil; it is expected the extraction yields may be increased for a particular solid pellet upon optimization of the extraction process. Furthermore, it is expected that the extracted oil could be subjected to distillation, under short path distillation conditions, according to the disclosure herein.

Example 27

Preparation of a Microbial Oil Comprising 58.2% EPA of Total Fatty Acids ["TFAs"]

The present Example describes the isolation of a microbial oil obtained from microbial biomass of recombinant *Yarrowia lipolytica* cells, engineered for the production of EPA. This microbial oil was then enriched by various means, as described below in Examples 28-30.

Microbial oil was isolated from *Y. lipolytica* strain Y8672 microbial biomass via an iso-hexane solvent and purified, yielding a non-concentrated, triglyceride-rich purified oil comprising 58.2 EPA % TFAs.

Fermentation and Extraction of Microbial Oil from *Y. lipolytica* Strain Y8672 Biomass

*Y. lipolytica* strain Y8672 was grown in 2-stage fed-batch process, dewatered and washed according to the MATERIALS. Drum drying followed to reduce the moisture to less than 5% to ensure oil stability during short term storage and transportation of the untreated microbial biomass.

The microbial biomass was then subjected to mechanical disruption with iso-hexane solvent to extract the EPA-rich microbial oil from the biomass. The residual biomass (i.e., cell debris) was removed and the solvent was evaporated to yield an extracted oil. The extracted oil was degummed using phosphoric acid and refined with 20° Baume caustic to remove phospholipids, trace metals and free fatty acids. Bleaching with silica and clay was used to adsorb color compounds and minor oxidation products. The last deodorization step stripped out volatile, odorous and additional color compounds to yield a non-concentrated purified microbial oil comprising PUFAs in their natural triglyceride form.

Characterization of Microbial Oil from *Y. lipolytica* Strain Y8672

The fatty acid composition of the non-concentrated purified oil was analyzed using the GC method set forth in Example 22A.

The results obtained from the GC analyses on the non-concentrated Y8672 purified oil are shown below in Table 30. The purified oil contained 58.2 EPA % TFAs and DHA was non-detectable (i.e. <0.05%).

TABLE 30

Fatty Acid Composition Of Non-Concentrated Y8672 Purified Oil

| Fatty acid | Weight Percent Of Total Fatty Acids |
|---|---|
| C18:2 (omega-6) | 16.6 |
| C20:5 EPA | 58.2 |
| C22:6 DHA | non-detectable (<0.05%) |
| Other components | 25.2 |

One of skill in the art would expect that a microbial oil of similar composition could be obtained from *Y. lipolytica* strain Y8672, if the biomass was subjected to pelletization, extraction and then distillation uder short path distillation conditions.

Example 28

Enrichment of Microbial Oil Via Urea Adduct Formation

This example demonstrates that an EPA concentrate comprising up to 78% EPA ethyl esters, measured as a weight percent of oil, and substantially free of DHA could be obtained upon enrichment of the non-concentrated purified oil from Example 27 via urea adduct formation.

KOH (20 g) was first dissolved in 320 g of absolute ethanol. The solution was then mixed with 1 kg of the non-concentrated purified oil from Example 27 and heated to approximately 60° C. for 4 hrs. The reaction mixture was left undisturbed in a Sep funnel overnight for complete phase separation. After removing the bottom glycerol fraction, a small amount of silica was added to the upper ethyl ester fraction to remove excess soap. The ethanol was rotovapped off at about 90° C. under vacuum, which yielded clear, but light-brown, ethyl esters.

The ethyl esters (20 g) were mixed with 40 g of urea and 100 g of ethanol (90% aqueous) at approximately 65° C. The mixture was maintained at this temperature until it turned into a clear solution. The mixture was then cooled to and held at room temperature for approximately 20 hrs for urea crystals and adducts to form. The solids were then removed through filtration and the liquid fraction was rotovapped to remove ethanol. The recovered ethyl ester fraction was washed with a first and then a second wash of 200 mL of warm water. The pH of the solution was adjusted to 3-4 first before decanting off the aqueous fraction. The ethyl ester fraction was then dried to remove residual water.

To determine the fatty acid ethyl ester ["FAEE"] concentrations in the ethyl ester fraction, the FAEEs were analyzed directly after dilution in toluene/hexane (2:3), using the same GC conditions and calculations as previously described in Example 22A to determine FAME concentrations. The only modifications in methodology were: i) C23:0 EE was used as the internal standard instead of C15:0; and, ii) the molecular weight conversion factor of 1.042-1.052 was not required.

EPA ethyl ester ["EPA-EE"], however, was subjected to a slightly modified procedure from that above. Specifically, a reference EPA-EE standard of known concentration and purity was prepared to contain approximately the same amount of EPA-EE expected in the analytical samples, as well as the same amount of C23:0 EE internal standard. The exact amount of EPA-EE (mg) in a sample is calculated according to the formula: (area of EPA-EE peak/area of the C23:0 EE peak)×(area of the C23:0 EE peak in the calibration standard/area of the EPA-EE peak in the calibration standard)×(mg EPA-EE in the calibration standard). All internal and reference standards were obtained from Nu-Chek Prep, Inc.

In this way, the FAEE concentrations were determined in the enriched oil fraction, i.e., the EPA concentrate. Specifically, enrichment of the non-concentrated purified oil via urea adduct formation yielded an EPA concentrate with 77% EPA ethyl ester, measured as a weight percent of oil, and substantially free of DHA, as shown in Table 31.

TABLE 31

EPA Ethyl Ester Concentrate With Urea Adduct Method

| Fatty acid ethyl esters | Weight Percent Of Oil |
| --- | --- |
| C18:2 (omega-6) | 3.9 |
| C20:5 EPA | 76.5 |
| C22:6 DHA | non-detectable (<0.05%) |
| Other components | 19.6 |

One of ordinary skill in the art will appreciate that the EPA concentrate, comprising 77% EPA ethyl ester, measured as a weight percent of oil, and substantially free of DHA, could readily be converted to yield an EPA concentrate in an alternate form (i.e., the EPA ethyl ester could be converted to free fatty acids, triacylglycerols, methyl esters, and combinations thereof), using means well known to those of skill in the art. Thus, for example, the 77% EPA ethyl ester could be re-esterified to triglycerides via glycerolysis, to result in an EPA concentrate, in triglyceride form, comprising at least 70 wt % of EPA, measured as a wt % of oil, and substantially free of DHA.

Example 29

Enrichment of Microbial Oil Via Liquid Chromatography

This example demonstrates that an EPA concentrate comprising up to 95.4% EPA ethyl ester, measured as a weight percent of oil, and substantially free of DHA could be obtained upon enrichment of the non-concentrated purified oil from Example 27 using a liquid chromatography method.

The non-concentrated purified oil from Example 27 was transesterified to ethyl esters using a similar method as described in Example 28 but with some minor modifications (i.e., use of sodium ethoxide as a base catalyst instead of potassium hydroxide).

The ethyl esters were then enriched by Equateq (Isle of Lewis, Scotland) using their liquid chromatographic purification technology. Various degrees of enrichment were achieved (e.g., see exemplary data for Sample #1 and Sample #2, infra). Thus, enrichment of the non-concentrated purified oil via liquid chromatography yielded an EPA concentrate with up to 95.4% EPA ethyl ester, measured as a weight percent of oil, and substantially free of DHA, as shown in Table 32.

TABLE 32

EPA Ethyl Ester Concentrate With A Liquid Chromatography Enrichment Method

| | Weight Percent Of Oil | |
| --- | --- | --- |
| Fatty acid ethyl esters | Sample #1 | Sample #2 |
| C18:2 (omega-6) | 5.7 | ND |
| C20:5 EPA | 82.8 | 95.4 |
| C22:6 DHA | non-detectable (<0.05%) | non-detectable (<0.05%) |
| Other components | 11.5 | 4.6 |

One of skill in the art will appreciate that the EPA concentrate, comprising either 82.8% EPA ethyl ester or 95.4% EPA ethyl ester, measured as a weight percent of oil, and substantially free of DHA, could readily be converted to yield an EPA concentrate in an alternate form (i.e., the EPA ethyl ester could be converted to free fatty acids, triacylglycerols, methyl esters, and combinations thereof), using means well known to those of skill in the art. Thus, for example, the 82.8% EPA ethyl ester or 95.4% EPA ethyl ester could be re-esterified to triglycerides via glycerolysis, to result in an EPA concentrate, in triglyceride form, comprising at least 70 wt % of EPA, measured as a wt % of oil, and substantially free of DHA.

Example 30

Enrichment of Microbial Oil Via Supercritical Fluid Chromatography

This example demonstrates that an EPA concentrate comprising up to 89.8% EPA ethyl esters, measured as a weight percent of oil, and substantially free of DHA could be obtained upon enrichment of the non-concentrated purified oil from Example 27 using a supercritical fluid chromatographic ["SFC"] method.

The non-concentrated purified oil from Example 27 was transesterified to ethyl esters using sodium ethoxide as a base catalyst, and then processed through an adsorption column to remove compounds that were insoluble in supercritical $CO_2$. The processed ethyl ester oil was then purified by K.D. Pharma (Bexbach, Germany) using their supercritical chromatographic technology. Various degrees of enrichment were achieved (e.g., see exemplary data for Sample #1 and Sample #2, infra). Thus, enrichment of the non-concentrated purified oil via SFC yielded an EPA concentrate with 85% and 89.8% EPA ethyl esters, measured as a weight percent of oil, and substantially free of DHA, as shown in Table 33.

TABLE 33

EPA Ethyl Ester Concentrate With SFC Enrichment Method

| | Weight Percent Of Oil | |
| --- | --- | --- |
| Fatty acid ethyl esters | Sample #1 | Sample #2 |
| C18:2 (omega-6) | 0.4 | 0.2 |
| C20:5 EPA | 85 | 89.8 |
| C22:6 DHA | Non-detectable (<0.05%) | non-detectable (<0.05%) |
| Other components | 14.6 | 10 |

One of skill in the art will appreciate that the EPA concentrate, comprising either 85% EPA ethyl ester or 89.8% EPA ethyl ester, measured as a weight percent of oil, and substantially free of DHA, could readily be converted to yield an EPA concentrate in an alternate form (i.e., the EPA ethyl ester could be converted to free fatty acids, triacylglycerols, methyl esters, and combinations thereof), using means well known to those of skill in the art. Thus, for example, the 85% EPA ethyl ester or 89.8% EPA ethyl ester could be re-esterified to triglycerides via glycerolysis, to result in an EPA concentrate, in triglyceride form, comprising at least 70 wt % of EPA, measured as a wt % of oil, and substantially free of DHA.

Example 31

Preparation of a Microbial Oil Comprising 56.1% EPA of Total Fatty Acids ["TFAs"]

The present Example describes the isolation of a microbial oil obtained from microbial biomass of recombinant *Yarrowia lipolytica* cells, engineered for the production of EPA. This microbial oil was then enriched by fractional distillation, as described infra in Example 32.

Specifically, *Y. lipolytica* strain Z1978 was recombinantly engineered to enable production of about 58.7 EPA % TFAs and cultured using a 2-stage fed-batch process. Microbial oil was then isolated from the biomass via drying, extracted (via a combination of extrusion, pelletization and supercritical fluid extraction), and purified via short path distillation, yielding a non-concentrated, triglyceride-rich SPD-purified oil (i.e., a lipid-containing fraction) comprising 56.1 EPA % TFAs.

Fermentation and Disruption Via Extrusion and Pelletization of Dried, Untreated *Y. lipolytica* Strain Z1978 Biomass A *Y. lipolytica* strain Z1978 culture was fermented and the microbial biomass was harvested and dried, as described in the MATERIALS section, supra.

The dried and untreated biomass was then fed to a twin screw extruder. Specifically, a mixture of the biomass and 15% of diatomaceous earth (Celatom MN-4 or Celite 209, EP Minerals, LLC, Reno, Nev.) were premixed and then fed to a ZSK-40 mm MC twin screw extruder (Coperion Werner & Pfleiderer, Stuttgart, Germany) at a rate of 45.5 kg/hr. A water/sucrose solution made of 26.5% sucrose was injected after the disruption zone of the extruder at a flow rate of 147 mL/min. The extruder was operated at 280 rpm with a % torque range of 20-23. The resulting disrupted yeast powder was cooled to 35° C. in a final water cooled barrel. The moist extruded powder was then fed into a LCI Dome Granulator Model No. TDG-80 (LCI Corporation, Charlotte, N.C.) assembled with a multi-bore dome die 1 mm diameter by 1 mm thick screen and set to 82 RPM. Extrudate was formed at 455-600 kg/hr (as dried rate). The sample was dried in a vibratory fluid bed dryer (FBP-75, Carman Industries, Inc., Jeffersonville, Ind.) with a drying zone of 0.50 m² with 1150 standard cubic feet per minute ["scfm"] of air flow maintained at 100° C. and a cooling zone of 0.24 m² operating with an air flow estimated at 500-600 scfm at 18° C. Dried pellets, approximately 1 mm diameter×6 to 10 mm in length, exited the dryer in the 25-30° C. range, having a final moisture content of 5-6% measured on an O'Haus moisture analyzer (Parsippany, N.J.).

Oil Extraction of the Extruded Yeast Biomass

The extruded yeast pellets were extracted using supercritical fluid phase $CO_2$ as the extraction solvent to produce non-concentrated extracted oil, using the 320 L stainless steel extraction vessel and configuration described in Example 22B. The oil extract was periodically drained from the separator and collected as product.

The extraction vessel was initially charged with approximately 150 kg of the extruded yeast pellets. The non-concentrated extracted oil was then extracted from the pellets with supercritical fluid $CO_2$ at 5000 psig (345 bar), 55° C., and a solvent-to-feed ratio ranging from 40 to 50 kg $CO_2$ per kg of starting yeast pellets. Roughly 37.5 kg of non-concentrated extracted oil was collected from the separator vessel, to which was added about 1000 ppm each of two antioxidants, i.e. Covi-ox T70 (Cognis, Mississauga, Canada) and Dadex RM (Nealanders, Mississauga, Canada).

Distillation Under SPD Conditions

The non-concentrated extracted oil was degassed and then passed through a 6" molecular still (POPE Scientific, Saukville, Wis.) using a feed rate of 12 kg/hr to remove residual water. The surface temperatures of the evaporator and condenser were set at 140° C. and 15° C., respectively. The vacuum was maintained at 15 torr.

The dewatered extracted oil was passed through the molecular still at a feed rate of 12 kg/hr for a second time to remove undesired lower-molecular weight compounds, such as ergosterol and free fatty acids in the distillate. The vacuum was lowered to 1 mtorr, and the surface temperatures of the evaporator were maintained between 240° C. and 270° C. A triacylglycerol-containing fraction (i.e., the lipid-containing fraction or SPD-purified oil) was obtained, having reduced sterols relative to the sterol content in the non-concentrated extracted oil. The non-concentrated SPD-purified oil was cooled to below 40° C. before packaging.

Characterization of SPD-Purified Oil from *Yarrowia lipolytica* Strain Z1978

The fatty acid composition of the non-concentrated SPD-purified oil from strain Z1978 was analyzed, following transesterification, according to the methodology of Example 27. The SPD-purified oil contained 56.1 EPA % TFAs and DHA was non-detectable (i.e. <0.05%), as shown below in Table 34.

TABLE 34

| Fatty Acid Composition Of Non-Concentrated Z1978 SPD-Purified Oil | |
| --- | --- |
| Fatty acid | Weight Percent Of Total Fatty Acids |
| C18:2 (omega-6) | 14.2 |
| C20:5 EPA | 56.1 |
| C22:6 DHA | non-detectable (<0.05%) |
| Other components | 29.7 |

Example 32

Enrichment of Microbial Oil Via Fractional Distillation

This example demonstrates that an EPA concentrate comprising up to 74% EPA ethyl ester, measured as a weight percent of oil, and substantially free of DHA could be obtained upon enrichment of the non-concentrated SPD-purified oil from Example 31 using a fractional distillation method.

Twenty-five (25) kg of the non-concentrated microbial oil from Example 31 was added to a 50 L glass flask. 7.9 kg of absolute ethanol and 580 g of sodium ethoxide (21% in ethanol) were then added to the flask. The mixture was heated to reflux at ~85° C. for a minimum of 30 min. The reaction was monitored by a thin layer chromatography method, where a diluted sample of the oil was spotted onto a silica plate and separated using an acetic acid/hexane/ethyl ether solvent mixture. Spots consisting of unreacted TAGs were detected by iodine stain. Absent or barely detectable spots were considered to represent completion of the reaction. After the reaction end point was reached, the mixture was cooled to below 50° C. and allowed to phase separate. The glycerol-containing bottom layer was separated and discarded. The upper organic layer was washed with 2.5 L of 5% citric acid, and the recovered organic layer was then washed with 5 L of 15% aqueous sodium sulfate. The aqueous phase was again discarded, and the ethyl ester phase was distilled with ethanol in a rotavap at ~60° C. to remove residual water. Approximately 25 kg of oil in ethyl ester form was recovered.

The ethyl esters were then fed to a 4" hybrid wiped-film and fractionation system (POPE Scientific, Saukville, Wis.) at a feed rate of 5 kg/hr to enrich EPA ethyl esters. The evaporator temperature was set at approximately 275° C. under a vacuum of 0.47 torr. The head temperature of the packed column was about 146° C. The lower-molecular-weight ethyl esters, mainly C18s, were removed as a light fraction from the overhead. The extracted EPA ethyl esters were recovered as a heavy fraction and underwent a second distillation, mainly for removing color and polymerized. The second distillation was performed in a 6" molecular still (POPE Scientific, Saukville, Wis.) at a feed rate of 20 kg/hr. The evaporator was operated at about 205° C. with an internal condenser temperature setting of about 10° C. and a vacuum of 0.01 torr. Approximately 7-10 wt % of the ethyl esters was removed, yielding a clear and light color EPA concentrate. The final EPA concentrate contained 74% EPA ethyl esters, measured as a weight percent of oil, and substantially free of DHA.

One of skill in the art will appreciate that the EPA concentrate, comprising 74% EPA ethyl ester, measured as a weight percent of oil, and substantially free of DHA, could readily be converted to yield an EPA concentrate in an alternate form (i.e., the EPA ethyl ester could be converted to free fatty acids, triacylglycerols, methyl esters, and combinations thereof), using means well known to those of skill in the art. Thus, for example, the 74% EPA ethyl ester could be re-esterified to triglycerides via glycerolysis, to result in an EPA concentrate, in triglyceride form, comprising at least 70 wt % of EPA, measured as a wt % of oil, and substantially free of DHA.

Example 33

EPA Concentrates are Substantially Free of Environmental Pollutants

This example demonstrates that both an EPA concentrate comprising at least 70 wt % of EPA, measured as a wt % of oil, and substantially free of DHA, and the microbial oil comprising 30-70 wt % of EPA, measured as a wt % of TFAs, and substantially free of DHA, are substantially free of environmental pollutants.

A comparable sample of non-concentrated purified oil from *Yarrowia lipolytica* strain Y8672 was prepared, as described in Example 27. The concentration, measured as mg/g World Health Organization International Toxicity Equivalent ["WHO TEQ"], of polychlorinated biphenyls ["PCBs"] (CAS No. 1336-36-3), polychlorinated dibenzodioxins ["PCDDs"] and polychlorinated dibenzofurans ["PCDFs"] in the non-concentrated extracted oil was determined according to EPA method 1668 Rev A. Extremely low or non-detectable levels of the environmental pollutants were detected.

Based on the results above, it is assumed herein that the concentration of PCBs, PCDDs, and PCDFs in the non-concentrated extracted oil of Example 27 and the non-concentrated SPD-purified oil of Example 31 will also contain extremely low or non-detectable levels of environmental pollutants. Similarly, it is hypothesized herein that the EPA ethyl ester concentrates in Examples 28, 29, and 32, enriched via urea adduct formation, liquid chromatography, SFC and fractional distillation, respectively, should also contain extremely low or non-detectable levels of environmental pollutants since they were produced from non-concentrated oils that are themselves substantially free of environmental pollutants.

More specifically, Table 35 describes the expected TEQ levels of PCBs, PCDDs, and PCDFs within the EPA concentrates in Examples 28, 29, 30 and 32. For comparison, the concentrations of the same compounds in a pollutant-stripped marine oil described in U.S. Pat. No. 7,732,488 are also included. It is noted that U.S. Pat. No. 7,732,488 provides special processing methods to reduce these environmental pollutants to acceptable levels.

TABLE 35

Expected Environmental Pollutant Concentration (pg/g WHO TEQ) In EPA Concentrates

| | EPA ethyl ester concentrates | FIG. 2 from U.S. Pat. No. 7,732,488 |
|---|---|---|
| Polychlorinated Biphenyls (PCBs) | <0.1 | 0.17 |
| Polychlorinated Dibenzodioxins (PCDDs, dioxins) | <0.1 | 0.26 |
| Polychlorinated Dibenzofurans (PCDFs, furans) | non-detectable (<0.03) | 0.2 |

As shown above, the EPA ethyl ester concentrates in Examples 28, 29, 30 and 32 will have lower levels of PCBs, PCDDs and PCDFs than the pollutant-stripped marine oil in U.S. Pat. No. 7,732,488. In fact, the pollutant level of PCDFs is expected to be below the detection limit of the analytical method used.

Example 34

Enrichment of Microbial Oil Via Fractional Distillation and Liquid Chromatography This example demonstrates that an EPA concentrate comprising up to 97.4% EPA ethyl ester, measured as a weight percent of oil, and substantially free of DHA, NDPA and HPA could be obtained upon enrichment of a non-concentrated purified oil using a combination of fractional distillation and liquid chromatography methods.

A lipid-containing fraction was obtained from *Yarrowia lipolytica* strain Y9502 (supra, Example 31; see also U.S. Pat. Appl. Pub. No. 2010-0317072-A1). Specifically, the strain was cultured, harvested, disrupted via extrusion and pelletization, and extracted using supercritical fluid phase $CO_2$ as described in Example 31. The non-concentrated extracted oil was then purified under SPD conditions (Example 31).

Characterization of SPD-Purified Oil from *Yarrowia lipolytica* Strain Y9502

The fatty acid composition of the non-concentrated SPD-purified oil from strain Y9502 was analyzed according to the methodology of Example 27. The SPD-purified oil contained 54.7 EPA % TFAs and DHA, NDPA and HPA were non-detectable (i.e., <0.05%), as shown below in Table 36.

TABLE 36

Fatty Acid Composition Of Non-Concentrated Y9502 SPD-Purified Oil

| Fatty acid | Weight Percent Of Total Fatty Acids |
|---|---|
| C18:2 (omega-6) | 15 |
| C19:5 (omega-2) | non-detectable (<0.05%) |
| C20:5 EPA | 54.7 |
| C21:5 HPA | Non-detectable (<0.05%) |
| C22:6 DHA | non-detectable (<0.05%) |
| Other components | 30.3 |

Enrichment of SPD-Purified Oil from *Yarrowia lipolytica* Strain Y9502

The SPD-purified oil was transesterified to ethyl esters using a similar method as described in Example 29 and further subjected to fractional distillation as described in Example 31. The fractionally distilled EPA concentrate contained 71.9% EPA ethyl esters, measured as a weight percent of oil, and was substantially free of DHA, NDPA and HPA (see the column titled "Fractionally Distilled" below in Table 37).

The fractionally distilled ethyl esters were then enriched by Equateq (Isle of Lewis, Scotland) using their liquid chromatographic purification technology. The enrichment of the fractionally distilled EPA concentrate via liquid chromatography yielded a final EPA concentrate with up to 97.4% EPA ethyl ester, measured as a weight percent of oil, and substantially free of DHA, NDPA and HPA (see the column titled "Liquid Chromatography Enriched" below in Table 37).

TABLE 37

EPA Ethyl Ester Concentrate With A Liquid Chromotography Enrichment Method

| | Weight Percent Of Oil | |
|---|---|---|
| Fatty acid ethyl esters | Fractionally Distilled | Liquid Chromatography Enriched |
| C18:2 (omega-6) | 0.8 | 0.05 |
| C19:5 NDPA (omega-2) | Non-detectable (<0.05%) | Non-detectable (<0.05%) |
| C20:5 EPA | 71.9 | 97.4 |
| C21:5 HPA | Non-detectable (<0.05%) | Non-detectable (<0.05%) |
| C22:6 DHA | Non-detectable (<0.05%) | Non-detectable (<0.05%) |
| Other components | 27.3 | 2.1 |

One of skill in the art will appreciate that the EPA concentrate, comprising 97.4% EPA ethyl ester, measured as a weight percent of oil, and substantially free of DHA, NPDA and HPA, could readily be converted to yield an EPA concentrate in an alternate form (i.e., the EPA ethyl ester could be converted to free fatty acids, triacylglycerols, methyl esters, and combinations thereof), using means well known to those of skill in the art. Thus, for example, the 97.4% EPA ethyl ester could be re-esterified to triglycerides via glycerolysis, to result in an EPA concentrate, in triglyceride form, comprising at least 70 wt % of EPA, measured as a wt % of oil, and substantially free of DHA, NPDA and HPA.

Additionally, it is noted that EPA concentrates prepared according to the methods of the invention herein from any microbial biomass of recombinant *Yarrowia* cells, engineered for the production of EPA, are expected to be substantially free of DHA, NDPA and HPA. The results obtained above based on microbial oil obtained from *Y. lipolytica* strain Y9502, wherein the final EPA concentrate is substantially free of DHA, NDPA and HPA, would be expected from EPA concentrates prepared from microbial oils obtained from Example 27 and Example 31. Since DHA, NDPA and HPA impurities are not present in the initial microbial oil comprising 30 to 70 wt % of EPA, measured as a wt % of TFAs, obtained from a *Yarrowia* that accumulates in excess of 25% of its dry cell weight as oil, the fatty acid impurities will also not be present in an EPA concentrate produced therefrom.

What is claimed is:

1. A method comprising:
   (a) pelletizing a microbial biomass having a moisture level and comprising oil-containing microbes, wherein said pelletizing comprises:
      (1) mixing the microbial biomass and at least one grinding agent capable of absorbing oil to provide a disrupted biomass mix;
      (2) blending the disrupted biomass mix with at least one binding agent to provide a fixable mix capable of forming a solid pellet; and
      (3) forming said fixable mix into solid pellets to provide a pelletized microbial biomass;
   (b) extracting the pelletized microbial biomass of step (a) to produce an extracted oil; and
   (c) distilling the extracted oil of step (b) at least once under short path distillation conditions, wherein said distillation produces a distillate fraction and a lipid-containing fraction.

2. The method of claim 1, wherein the oil-containing microbes are selected from the group consisting of yeast, algae, fungi, bacteria, euglenoids, stramenopiles, and oomycetes.

3. The method of claim 1, wherein the oil-containing microbes comprise at least one polyunsaturated fatty acid.

4. The method of claim 1, wherein the moisture level of the microbial biomass is in the range of about 1 to 10 weight percent.

5. The method of claim 1, wherein the mixing of step (a)(1) is done in a twin screw extruder comprising:
   (a) a total specific energy input (SEI) of about 0.04 to 0.4 KW/(kg/hr);
   (b) a compaction zone using bushing elements with progressively shorter pitch length; and
   (c) a compression zone using flow restriction;
   wherein the compaction zone is prior to the compression zone within the extruder.

6. The method of claim 1, wherein:
   (a) said at least one grinding agent has a property selected from the group consisting of:
      (i) said at least one grinding agent is a particle having a Moh hardness of 2.0 to 6.0 and an oil absorption coefficient of 0.8 or higher as determined according to ASTM Method D1483-60;
      (ii) said at least one grinding agent is of silica, or silicate; and
      (iii) said at least one grinding agent is present at about 1 to 20 weight percent, based on the summation of the weights of microbial biomass, grinding agent and binding agent in the solid pellet; and/or
   (b) said at least one binding agent has a property selected from the group consisting of:
      (iv) said at least one binding agent is water, or a carbohydrate selected from the group consisting of sucrose, lactose, fructose, glucose, and soluble starch; and (v) said at least one binding agent is present at about 0.5 to 10 weight percent, based on the summation of the weights of microbial biomass, grinding agent and binding agent in the solid pellet.

7. The method of claim 1, wherein:
steps (a)(1) and (a)(2) are performed in an extruder, are performed simultaneously, or are performed simultaneously in an extruder; and/or
step (a)(3) comprises a step selected from the group consisting of:
(i) extruding said fixable mix through a die to form strands,
(ii) drying and breaking said strands, and
(iii) a combination of step (i) and step (ii).

8. The method of claim 1, wherein:
said solid pellets have an average diameter of about 0.5 to about 1.5 mm and an average length of about 2.0 to about 8.0 mm,
said solid pellets have a moisture level of about 0.1 to 5.0 weight percent, or
said solid pellets comprise about 70 to about 98.5 weight percent of microbial biomass comprising oil-containing microbes, about 1 to about 20 weight percent of at least one grinding agent capable of absorbing oil, and about 0.5 to 10 weight percent of at least one binding agent, based on the summation of the weights of microbial biomass, grinding agent and binding agent in the solid pellets.

9. The method of claim 1, wherein said extracting of step (b) is performed with an organic solvent to produce an extracted oil, and said extracted oil is degummed and optionally bleached prior to said step (c) distilling of step (c) the extracted oil.

10. The method of claim 1, wherein said extracting of step (b) comprises:
(1) processing the pelletized microbial biomass with a solvent comprising liquid or supercritical fluid carbon dioxide, wherein said pelletized microbial biomass further comprises at least one polyunsaturated fatty acid in the oil, to obtain:
(i) an extract comprising a lipid fraction substantially free of phospholipids; and
(ii) a residual biomass comprising phospholipids; and
(2) fractionating the extract obtained in step (1) at least once to obtain an extracted oil having a refined lipid composition comprising at least one polyunsaturated fatty acid, wherein the refined lipid composition is enriched in triacylglycerols relative to the oil composition of pelletized microbial biomass that is not processed with a solvent.

11. The method of claim 1, wherein:
(i) said extracted oil of step (b) comprises a sterol fraction;
(ii) said distillate fraction of step (c) comprises the sterol; and
(iii) said lipid-containing fraction of step (c) comprises a reduced amount of the sterol when compared to the amount of the sterol in the extracted oil that has not been subjected to short path distillation.

12. The method of claim 11, wherein the sterol fraction comprises one or more sterols selected from the group consisting of: stigmasterol, ergosterol, brassicasterol, campesterol, beta-sitosterol, and desmosterol.

13. The method of claim 10, wherein said extracted oil having a refined lipid composition comprising at least one polyunsaturated fatty acid and enriched in triacylglycerols relative to the oil composition of pelletized microbial biomass that is not processed with a solvent further comprises a sterol fraction of at least 300 mg/100 g.

14. The method of claim 13, wherein said extracted oil having a refined lipid composition is distilled at least once under short path distillation conditions, wherein said distillation produces a distillate fraction comprising the sterol and a lipid-containing fraction comprising triacylglycerols and a reduced amount of sterol when compared to the amount of sterol in the extracted oil having a refined lipid composition that has not been subjected to short path distillation.

15. The method of claim 2, wherein the oil-containing microbe is a *Yarrowia* yeast.

16. The method of claim 15, wherein the *Yarrowia* yeast is recombinantly engineered for the production of a polyunsaturated fatty acid selected from the group consisting of: linoleic acid, gamma-linolenic acid, eicosadienoic acid, dihomo-gamma-linolenic acid, arachidonic acid, docosatetraenoic acid, omega-6 docosapentaenoic acid, alpha-linolenic acid, stearidonic acid, eicosatrienoic acid, eicosatetraenoic acid, eicosapentaenoic acid, omega-3 docosapentaenoic acid, and docosahexaenoic acid.

17. The method of claim 1, further comprising:
(d) transesterifying the lipid-containing fraction of step (c), thereby providing a transesterified lipid-containing fraction; and
(e) enriching the transesterified lipid-containing fraction of step (d) to obtain an oil concentrate.

18. The method of claim 17, wherein:
(i) the oil-containing microbes accumulate in excess of 25% of their dry cell weight as microbial oil;
(ii) said microbial oil comprises 30 to 70 weight percent of eicosapentaenoic acid, measured as a weight percent of total fatty acids, and is substantially free of docosahexaenoic acid;
(iii) the enriching of step (e) is by a combination of at least first and second processes, said first process comprising fractional distillation, and said second process is selected from the group consisting of: urea adduct formation, liquid chromatography, supercritical fluid chromatography, simulated moving bed chromatography, actual moving bed chromatography, and combinations thereof; and
(iv) the oil concentrate is an eicosapentaenoic acid concentrate comprising at least 70 weight percent of eicosapentaenoic acid, measured as a weight percent of oil, and is substantially free of docosahexaenoic acid.

19. The method of claim 10, wherein the residual biomass comprising phospholipids is further extracted to isolate the phospholipids.

20. A method comprising:
(a) pelletizing a microbial biomass having a moisture level and comprising oil-containing microbes, thereby providing a pelletized microbial biomass;
(b) extracting the pelletized microbial biomass of step (a) to produce an extracted oil;
(c) distilling the extracted oil of step (b) at least once under short path distillation conditions, wherein said distillation produces a distillate fraction and a lipid-containing fraction;
(d) transesterifying the lipid-containing fraction of step (c), thereby providing a transesterified lipid-containing fraction; and
(e) enriching the transesterified lipid-containing fraction of step (d) to obtain an oil concentrate;
wherein:
(i) the oil-containing microbes accumulate in excess of 25% of their dry cell weight as microbial oil;

(ii) said microbial oil comprises 30 to 70 weight percent of eicosapentaenoic acid, measured as a weight percent of total fatty acids, and is substantially free of docosahexaenoic acid;

(iii) the enriching of step (e) is by a combination of at least first and second processes, said first process comprising fractional distillation, and said second process is selected from the group consisting of: urea adduct formation, liquid chromatography, supercritical fluid chromatography, simulated moving bed chromatography, actual moving bed chromatography, and combinations thereof; and (iv) the oil concentrate is an eicosapentaenoic acid concentrate comprising at least 70 weight percent of eicosapentaenoic acid, measured as a weight percent of oil, and is substantially free of docosahexaenoic acid.

\* \* \* \* \*